(12) United States Patent
Lee

(10) Patent No.: US 11,838,533 B2
(45) Date of Patent: *Dec. 5, 2023

(54) VIDEO SIGNAL ENCODING AND DECODING METHOD, AND APPARATUS THEREFOR

(71) Applicant: GUANGDONG OPPO MOBILE TELECOMMUNICATIONS CORP., LTD., Guangdong (CN)

(72) Inventor: Bae Keun Lee, Seongnam-si (KR)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 20 days.

This patent is subject to a terminal disclaimer.

(21) Appl. No.: 17/455,198

(22) Filed: Nov. 16, 2021

(65) Prior Publication Data

US 2022/0078468 A1 Mar. 10, 2022

Related U.S. Application Data

(63) Continuation of application No. 17/205,515, filed on Mar. 18, 2021, now Pat. No. 11,218,720, which is a
(Continued)

(30) Foreign Application Priority Data

Sep. 21, 2018 (KR) .................. 10-2018-0114348
Sep. 21, 2018 (KR) .................. 10-2018-0114349
Nov. 27, 2018 (KR) .................. 10-2018-0148858

(51) Int. Cl.
*H04N 19/513* (2014.01)
*H04N 19/107* (2014.01)
*H04N 19/176* (2014.01)

(52) U.S. Cl.
CPC ......... *H04N 19/513* (2014.11); *H04N 19/107* (2014.11); *H04N 19/176* (2014.11)

(58) Field of Classification Search
None
See application file for complete search history.

(56) References Cited

U.S. PATENT DOCUMENTS 9,729,873 B2  8/2017  Wang et al.
10,075,733 B2  9/2018  Yamamoto et al.
(Continued)

FOREIGN PATENT DOCUMENTS

CN  107079161 A  8/2017
CN  107404651 A  11/2017
(Continued)

OTHER PUBLICATIONS

First Office Action of the Chilean application No. 202100686, dated Jan. 20, 2022. 18 pages with English translation.
(Continued)

*Primary Examiner* — Christopher G Findley
(74) *Attorney, Agent, or Firm* — PERKINS COIE LLP

(57) ABSTRACT

A video decoding method includes the steps of: generating a merge candidate list for a first block; selecting one among merge candidates included in the merge candidate list; and performing motion compensation for the first block based on motion information of the selected merge candidate. At this point, an inter-region merge candidate included in an inter-region motion information list may be added to the merge candidate list based on the number of spatial merge candidates and temporal merge candidates included in the merge candidate list.

20 Claims, 36 Drawing Sheets

Related U.S. Application Data continuation of application No. PCT/KR2019/012292, filed on Sep. 20, 2019.

(56) References Cited

U.S. PATENT DOCUMENTS

| | | | |
|---|---|---|---|
| 10,110,891 | B2 | 10/2018 | Yamamoto et al. |
| 10,187,657 | B2 | 1/2019 | Park et al. |
| 10,194,169 | B2 | 1/2019 | Yamamoto et al. |
| 11,218,720 | B2 * | 1/2022 | Lee ................ H04N 19/513 |
| 2012/0263235 | A1 | 10/2012 | Sugio |
| 2013/0101042 | A1 | 4/2013 | Sugio et al. |
| 2013/0188720 | A1 | 7/2013 | Wang et al. |
| 2014/0226719 | A1 | 8/2014 | Yamamoto et al. |
| 2015/0312588 | A1 | 10/2015 | Yamamoto et al. |
| 2017/0078699 | A1 | 3/2017 | Park et al. |
| 2017/0310991 | A1 | 10/2017 | Yamamoto et al. |
| 2018/0316934 | A1 | 11/2018 | Nam et al. |
| 2018/0376155 | A1 | 12/2018 | Yamamoto et al. |
| 2019/0110070 | A1 | 4/2019 | Yamamoto et al. |
| 2019/0200040 | A1 | 6/2019 | Lim et al. |
| 2020/0154135 | A1 | 5/2020 | Lee |
| 2020/0162743 | A1 | 5/2020 | Park et al. |
| 2021/0211708 | A1 | 7/2021 | Lee |
| 2022/0078469 | A1 * | 3/2022 | Lee ................ H04N 19/513 |

FOREIGN PATENT DOCUMENTS

| | | |
|---|---|---|
| EP | 3806472 A1 | 4/2021 |
| EP | 3833021 A1 | 6/2021 |
| EP | 3840376 A1 | 6/2021 |
| JP | 2016195452 A | 11/2016 |
| KR | 20160132859 A | 11/2016 |
| KR | 20180114348 A | 10/2018 |
| KR | 20180114349 A | 10/2018 |
| RU | 2577779 C2 | 3/2016 |
| WO | 2017069505 A1 | 4/2017 |
| WO | 2018012886 A1 | 1/2018 |
| WO | 2018026222 A1 | 2/2018 |
| WO | 2020060325 A1 | 3/2020 |

OTHER PUBLICATIONS

First Office Action of the Chinese application No. 202110444343.7, dated Apr. 6, 2022. 20 pages with English translation.

Lee H et al: "Non-CE4: HMVP unification between the Merge and MVP list", 14. JVET Meeting; Mar. 19, 2019-Mar. 27, 2019; Geneva; JVET ISO/IEC JTC1/SC29/WG11 and ITU-T SG.16, No. JVET-N0373 Mar. 21, 2019 (Mar. 21, 2019 ), XP030204233. 6 pages.

M-S Chiang et al: "CE10.1.1: Multi-hypothesis prediction for improving AMVP mode, skip or merge mode, and intra mode", 12. JVET Meeting; Oct. 3, 2018-Oct. 12, 2018; Macao; JVET ISO/IEC JTC1/SC29/WG11 and ITU-T SG.16 ), No. JVET-L0100, XP030251657. 15 pages.

Office Action of the Indian application No. 202117017663, dated Feb. 14, 2022. 6 pages with English translation.

Supplementary European Search Report in European application No. 19861621.1, dated Feb. 15, 2022. 15 pages.

Zhang (Bytedance) L et al: "CE4: History-based Motion Vector Prediction (Test 4.4.7)", 12. JVET Meeting; Oct. 3, 2018-Oct. 12, 2018; Macao; JVET ISO/IEC JTC1/SC29/WG11 and ITU-T SG.16, No. JVET-L0266 Oct. 4, 2018 (Oct. 4, 2018), XP030194670. 6 pages.

Zhao (LGE) Jet al: "CE4-related: Simplification to History Based Motion Vector Prediction", 12. JVET Meeting; Oct. 3, 2018-Oct. 12, 2018; Macao; JVET ISO/IEC JTC1/SC29/WG11 and ITUT SG.16 ), No. JVET-L0309, Sep. 26, 2018 (Sep. 26, 2018), XP030193944. 5 pages.

First Office Action of the Australian application No. 2019344274, dated Aug. 12, 2022. 3 pages.

First Office Action of the European application No. 19861621.1, dated Aug. 18, 2022. 5 pages.

First Office Action of the Canadian application No. 3113585, dated May 19, 2022. 4 pages.

Written Opinion of the International Search Authority in the international application PCT/KR2019/012292, dated Dec. 24, 2019 (9 pages).

International Search Report in the international application No. PCT/KR2019/012292, dated Dec. 24, 2019.

Yang, Haitao ct al. Description of Core Experiment 4 (CE4): Inter prediction and motion vector coding, Joint Video Experts Team (JVET) of ITU-T SG 16 WP 3 and ISO/IEC JTC 1/SC 29/WG 11. JVET-K1024_v4. 11th Meeting. Ljubljana, SI. pp. 1-44, Jul. 18, 2018, See sections 2.3.5, 4.3.3-4.3.10.

Zhang (Bytedance) L et al: "CE4-related: History-based Motion Vector Prediction", 11. JVET Meeting; Jul. 11, 2018-Jul. 18, 2018; Ljubljana; (The Joint Video Exploration Team of ISO/IEC JTC1/SC29/WG11 and ITUT SG.16), No. JVET-K0104 Jul. 3, 2018 (Jul. 3, 2018), XP030198784.

An (Hisilicon) J et al: "Enhanced Merge Mode based on JEM7.0", 10. JVET Meeting; Apr. 10, 2018-Apr. 20, 2018; San Diego; (The Joint Video Exploration Team of ISO/IEC JTC1/SC29/WG11 and ITU-T SG.16), No. JVET-J0059 Apr. 3, 2018 (Apr. 3, 2018), XP030151245.

Li Zhang et al: "CE4: History-based Motion Vector Prediction (Test 4.4.7)", 12. JVET Meeting; Oct. 3, 2018-Oct. 12, 2018; Macao; (The Joint Video Exploration Team of ISO/IEC JTC1/SC29/WG11 and ITU-T SG.16), No. JVET-L0266-v1; JVET-L0266 Sep. 25, 2018 (Sep. 25, 2018), pp. 1-4, XP030193803.

Zhang (Bytedance) L et al: "Non-CE4: shared merge list without double HMVP tables", 14. JVET Meeting; Mar. 19, 2019-Mar. 27, 2019; Geneva; (The Joint Video Exploration Team of ISO/IEC JTC1/SC29/WG11 and ITUT SG.16), No. JVET-N0267 Mar. 13, 2019 (Mar. 13, 2019), XP030202934.

Zhou (Ti) M: "Parallelized merge/skip mode for HEVC", 6. JCT-VC Meeting; 97. MPEG Meeting; Jul. 14, 2011-Jul. 22, 2011; Torino; (Joint Collaborative Team on Video Coding of ISO/IEC JTC1/SC29/WG11 and ITU-T SG.16); URL: http://wftp3.itu.int/av-arch/jctvc-site/, No. JCTVC-F069, Jul. 1, 2011 (Jul. 1, 2011 ), XP030009092.

Partial Supplementary European Search Report in the European application No. 19861621.1, dated Sep. 13, 2021.

Corrected Partial Supplementary European Search Report in the European application No. 19861621.1, dated Oct. 26, 2021.

First Office Action of the U.S. Appl. No. 17/205,515, dated May 27, 2021.

Notice of Allowance of the U.S. Appl. No. 17/205,515, dated Aug. 11, 2021.

Non-Final Office Action of the U.S. Appl. No. 17/455,171, dated Mar. 2, 2023. 32 pages.

Second Office Action of the European application No. 19861621.1, dated Jan. 26, 2023. 3 pages.

First Office Action of the Russian application No. 2021111108, dated Feb. 9, 2023. 13 pages with English translation.

Notice of Allowance of the U.S. Appl. No. 17/455,204, dated Mar. 20, 2023. 28 pages.

Notice of corrected Allowance of the U.S. Appl. No. 17/455,204, dated Apr. 11, 2023. 7 pages.

First Office Action of the Indonesian application No. P00202102864, dated Jul. 13, 2023. 5 pages with English translation.

Second Office Action of the Canadian application No. 3113585, dated Jul. 5, 2023. 5 pages.

Notice of Allowance of the U.S. Appl. No. 17/455,171, dated Jul. 13, 2023. 13 pages.

First Office Action of the Malaysian application No. PI2021001527, dated Jul. 26, 2023. 4 pages.

Oral Proceedings of the European application No. 19861621.1, dated Sep. 1, 2023. 8 pages.

Joint Video Exploration Team (JVET) of ITU-T SG 16 WP 3 and ISO/IEC JTC 1/SC 29/WG 11, 3rd Meeting: Geneva, CH, May 26-Jun. 1, 2016, Document: JVET-C0047, Title: Generalized bi-prediction for inter coding, Author(s) or Contact(s): Chun-Chi

(56) References Cited

OTHER PUBLICATIONS

Chen, Xiaoyu Xiu, Yuwen He, Yan Ye, Source: InterDigital Communications, Inc. pp. 1-4. 4 pages.

Joint Video Experts Team (JVET) of ITU-T SG 16 WP 3 and ISO/IEC JTC 1/SC 29/WG 11, 11th Meeting: Ljubljana, SI, Jul. 10-18, 2018, Document: JVET-K0257-v1, Title: CE10.1: Combined and multi-hypothesis prediction, Author(s) or Contact(s): Man-Shu Chiang, Chih-Wei Hsu, Yu-Wen Huang, Shaw-Min Lei, Source: MediaTek Inc. pp. 1-6. 6 pages.

First Office Action of the Japanese application No. 2021-515146, dated Sep. 8, 2023. 12 pages with English translation.

Joint Video Experts Team (JVET) of ITU-T SG 16 WP 3 and ISO/IEC JTC 1/SC 29/WG 11, 11th Meeting: Ljubljana, SI, Jul. 10-18, 2018, Document: JVET-K0104-v5, Title: CE4-related: History-based Motion Vector Prediction, Author(s) or Contact(s): Li Zhang, Kai Zhang, Hongbin Liu Yue Wang, Pengwei Zhao, Dingkun Hong, Source: Bytedance Inc. pp.1-7. 7 pages.

\* cited by examiner

VIDEO SIGNAL ENCODING AND DECODING METHOD, AND APPARATUS THEREFOR

CROSS-REFERENCE

This is a continuation application of U.S. patent application Ser. No. 17/205,515, filed on Mar. 18, 2021, which is a continuation application of International Patent Application No. PCT/KR2019/012292, filed on Sep. 20, 2019, which claims priorities to Korean Patent Application No. 10-2018-0114348, filed on Sep. 21, 2018, Korean Patent Application No. 10-2018-0114349, filed on Sep. 21, 2018, and Korean Patent Application No. 10-2018-0148858, filed Nov. 27, 2018, the entire contents of which are incorporated herein by reference in their entireties.

TECHNICAL FIELD

The present disclosure relates to a video signal encoding and decoding method and an apparatus therefor.

BACKGROUND

As display panels are getting bigger and bigger, video services of further higher quality are required more and more. The biggest problem of high-definition video services is significant increase in data volume, and to solve this problem, studies for improving the video compression rate are actively conducted. As a representative example, the Motion Picture Experts Group (MPEG) and the Video Coding Experts Group (VCEG) under the International Telecommunication Union-Telecommunication (ITU-T) have formed the Joint Collaborative Team on Video Coding (JCT-VC) in 2009. The JCT-VC has proposed High Efficiency Video Coding (HEVC), which is a video compression standard having a compression performance about twice as high as the compression performance of H.264/AVC, and it is approved as a standard on Jan. 25, 2013. With rapid advancement in the high-definition video services, performance of the HEVC gradually reveals its limitations.

SUMMARY

Technical Problem

An object of the present disclosure is to provide a method of deriving a merge candidate other than merge candidates derived from candidate blocks adjacent to a current block, and an apparatus for performing the method, in encoding/decoding a video signal.

Another object of the present disclosure is to provide a method of deriving merge candidates using an inter-region motion information list, and an apparatus for performing the method, in encoding/decoding a video signal.

Another object of the present disclosure is to provide a method of deriving merge candidates of blocks included in a merge processing area, and an apparatus for performing the method, in encoding/decoding a video signal.

The technical problems to be achieved in the present disclosure are not limited to the technical problems mentioned above, and unmentioned other problems may be clearly understood by those skilled in the art from the following description.

Solution to Problem

A method of decoding/encoding a video signal according to the present disclosure includes the steps of: generating a merge candidate list for a first block; selecting any one among merge candidates included in the merge candidate list; and performing motion compensation for the first block based on motion information of the selected merge candidate. At this point, an inter-region merge candidate included in an inter-region motion information list is added to the merge candidate list based on the number of spatial merge candidates and temporal merge candidates included in the merge candidate list.

In the video signal encoding and decoding method according to the present disclosure, the inter-region motion information list may include an inter-region merge candidate derived based on motion information of a block decoded before the first block. At this point, the inter-region motion information list may not be updated based on motion information of a second block included in a merge processing area the same as that of the first block.

In the video signal encoding and decoding method according to the present disclosure, when the first block is included in a merge processing area, a temporary merge candidate derived based on motion information of the first block is added to a temporary motion information list, and when decoding of all blocks included in the merge processing area is completed, the temporary merge candidate may be updated in the inter-region motion information list.

In the video signal encoding and decoding method according to the present disclosure, based on a result of determining whether a first inter-region merge candidate included in the inter-region motion information list is the same as at least one merge candidate included in the merge candidate list, whether or not to add the first inter-region merge candidate to the merge candidate list may be determined.

In the video signal encoding and decoding method according to the present disclosure, the determination may be performed by comparing at least one merge candidate of which the index value is smaller than or equal to a threshold value with the first inter-region merge candidate.

In the video signal encoding and decoding method according to the present disclosure, when it is determined that there is a merge candidate the same as the first inter-region merge candidate, the first inter-region merge candidate is not added to the merge candidate list, and based on a result of determining whether a second inter-region merge candidate included in the inter-region motion information list is the same as at least one merge candidate included in the merge candidate list, whether or not to add the second inter-region merge candidate to the merge candidate list may be determined. At this point, a determination as to whether the second inter-region merge candidate is the same as the merge candidate that is the same as the first inter-region merge candidate may be omitted.

Features briefly summarized above with respect to the present disclosure are merely exemplary aspects of the detailed description of the present disclosure that will be described below, and do not limit the scope of the present disclosure.

Advantageous Effects

According to the present disclosure, inter prediction efficiency can be improved by providing a method of deriving a merge candidate other than merge candidates derived from candidate blocks adjacent to a current block.

According to the present disclosure, inter prediction efficiency can be improved by providing a method of deriving merge candidates using an inter-region motion information list.

According to the present disclosure, inter prediction efficiency can be improved by providing a method of deriving merge candidates of blocks included in a merge processing area.

The effects that can be obtained from the present disclosure are not limited to the effects mentioned above, and unmentioned other effects may be clearly understood by those skilled in the art from the following description.

DETAILED DESCRIPTION OF THE PREFERRED EMBODIMENT

Hereafter, an embodiment of the present disclosure will be described in detail with reference to the accompanying drawings.

Encoding and decoding of a video is performed by the unit of block. For example, an encoding/decoding process such as transform, quantization, prediction, in-loop filtering, reconstruction or the like may be performed on a coding block, a transform block, or a prediction block.

Hereinafter, a block to be encoded/decoded will be referred to as a 'current block'. For example, the current block may represent a coding block, a transform block or a prediction block according to a current encoding/decoding process step.

In addition, it may be understood that the term 'unit' used in this specification indicates a basic unit for performing a specific encoding/decoding process, and the term 'block' indicates a sample array of a predetermined size. Unless otherwise stated, the 'block' and 'unit' may be used to have the same meaning. For example, in an embodiment described below, it may be understood that a coding block and a coding unit have the same meaning.

Figure 1:
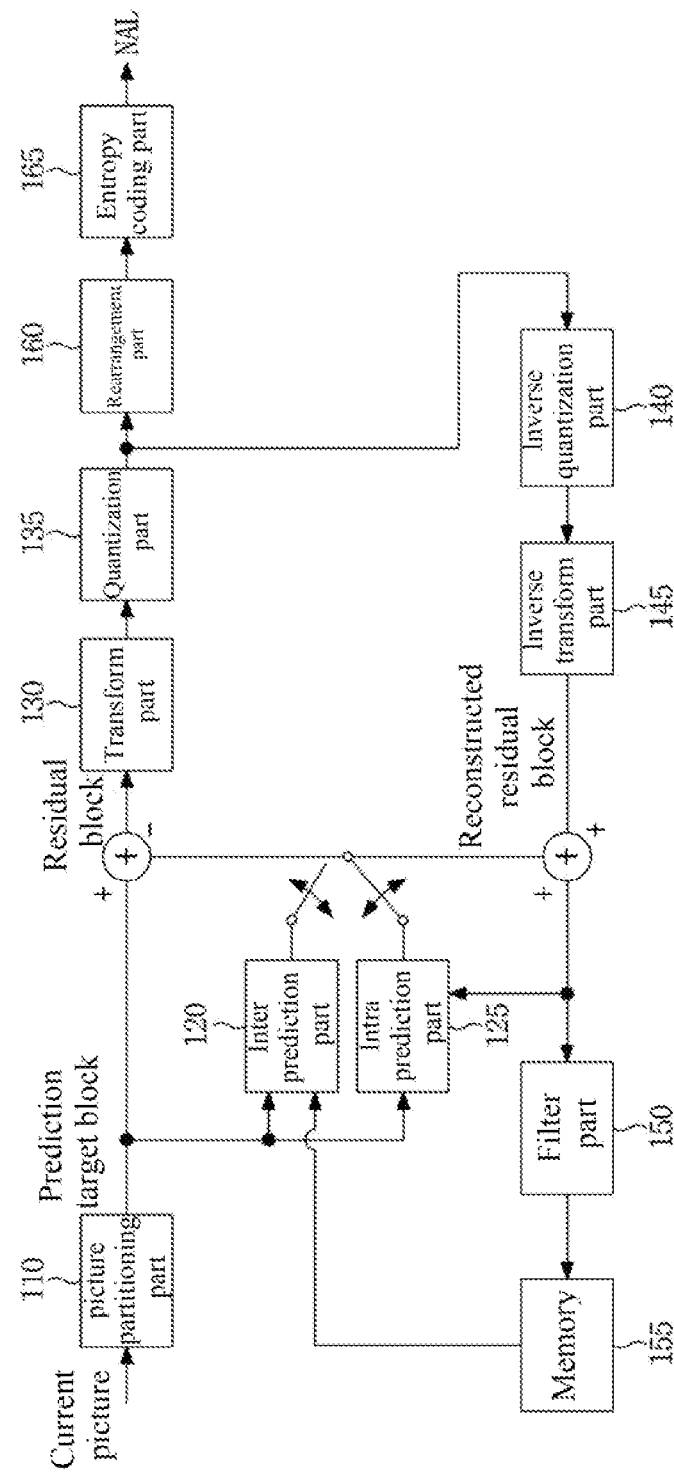
FIG. 1 is a block diagram showing a video encoder according to an embodiment of the present disclosure.

FIG. 1 is a block diagram showing a video encoder according to an embodiment of the present disclosure.

Referring to FIG. 1, a video encoding apparatus 100 may include a picture partitioning part 110, a prediction part 120 and 125, a transform part 130, a quantization part 135, a rearrangement part 160, an entropy coding part 165, an inverse quantization part 140, an inverse transform part 145, a filter part 150, and a memory 155.

Each of the components shown in FIG. 1 is independently shown to represent characteristic functions different from each other in a video encoding apparatus, and it does not mean that each component is formed by the configuration unit of separate hardware or single software. That is, each component is included to be listed as a component for convenience of explanation, and at least two of the components may be combined to form a single component, or one component may be divided into a plurality of components to perform a function. Integrated embodiments and separate embodiments of the components are also included in the scope of the present disclosure if they do not depart from the essence of the present disclosure.

In addition, some of the components are not essential components that perform essential functions in the present disclosure, and may be optional components only for improving performance. The present disclosure may be implemented to include only the components essential to implement the essence of the present disclosure excluding the components used only for improving performance, and a structure including only essential components excluding the optional components used only for improving performance is also included in the scope of the present disclosure.

The picture partitioning part 110 may partition an input picture into at least one processing unit. At this point, the processing unit may be a prediction unit (PU), a transform unit (TU), or a coding unit (CU). The picture partitioning part 110 may partition a picture into a combination of a plurality of coding units, prediction units, and transform units, and encode a picture by selecting a combination of a coding unit, a prediction unit, and a transform unit based on a predetermined criterion (e.g., a cost function).

For example, one picture may be partitioned into a plurality of coding units. In order to partition the coding units in a picture, a recursive tree structure such as a quad tree structure may be used. A video or a coding unit partitioned into different coding units using the largest coding unit as a root may be partitioned to have as many child nodes as the number of partitioned coding units. A coding unit that is not partitioned any more according to a predetermined restriction becomes a leaf node. That is, when it is assumed that only square partitioning is possible for one coding unit, the one coding unit may be partitioned into up to four different coding units.

Hereinafter, in an embodiment of the present disclosure, the coding unit may be used as a meaning of a unit performing encoding or a meaning of a unit performing decoding.

The prediction unit may be one that is partitioned in a shape of at least one square, rectangle or the like of the same size within one coding unit, or it may be any one prediction unit, among the prediction units partitioned within one coding unit, that is partitioned to have a shape and/or size different from those of another prediction unit.

If the coding unit is not a smallest coding unit when a prediction unit that performs intra prediction based on the coding unit is generated, intra prediction may be performed without partitioning a picture into a plurality of prediction units N×N.

The prediction part 120 and 125 may include an inter prediction part 120 that performs inter prediction and an intra prediction part 125 that performs intra prediction. It may be determined whether to use inter prediction or to perform intra prediction for a prediction unit, and determine specific information (e.g., intra prediction mode, motion vector, reference picture, etc.) according to each prediction method. At this point, a processing unit for performing prediction may be different from a processing unit for determining a prediction method and specific content. For example, a prediction method and a prediction mode may be determined in a prediction unit, and prediction may be performed in a transform unit. A residual coefficient (residual block) between the reconstructed prediction block and the original block may be input into the transform part 130. In addition, prediction mode information, motion vector information and the like used for prediction may be encoded by the entropy coding part 165 together with the residual coefficient and transferred to a decoder. When a specific encoding mode is used, an original block may be encoded as it is and transmitted to a decoder without generating a prediction block through the prediction part 120 and 125.

The inter prediction part 120 may predict a prediction unit based on information on at least one picture among pictures before or after the current picture, and in some cases, it may predict a prediction unit based on information on a partial area that has been encoded in the current picture. The inter prediction part 120 may include a reference picture interpolation part, a motion prediction part, and a motion compensation part.

The reference picture interpolation part may receive reference picture information from the memory 155 and generate pixel information of an integer number of pixels or less from the reference picture. In the case of a luminance pixel, a DCT-based 8-tap interpolation filter with a varying filter coefficient may be used to generate pixel information of an integer number of pixels or less by the unit of ¼ pixels. In the case of a color difference signal, a DCT-based 4-tap interpolation filter with a varying filter coefficient may be used to generate pixel information of an integer number of pixels or less by the unit of ⅛ pixels.

The motion prediction part may perform motion prediction based on the reference picture interpolated by the reference picture interpolation part. Various methods such as a full search-based block matching algorithm (FBMA), a three-step search (TSS), and a new three-step search algorithm (NTS) may be used as a method of calculating a motion vector. The motion vector may have a motion vector value of a unit of ½ or ¼ pixels based on interpolated pixels. The motion prediction part may predict a current prediction unit by varying the motion prediction. Various methods such as a skip mode, a merge mode, an advanced motion vector prediction (AMVP) mode, an intra-block copy mode and the like may be used as the motion prediction mode.

The intra prediction part 125 may generate a prediction unit based on the information on reference pixels in the neighborhood of the current block, which is pixel information in the current picture. When a block in the neighborhood of the current prediction unit is a block on which inter prediction has been performed and thus the reference pixel is a pixel on which inter prediction has been performed, the reference pixel included in the block on which inter prediction has been performed may be used in place of reference pixel information of a block in the neighborhood on which intra prediction has been performed. That is, when a reference pixel is unavailable, at least one reference pixel among available reference pixels may be used in place of unavailable reference pixel information.

In the intra prediction, the prediction mode may have an angular prediction mode that uses reference pixel information according to a prediction direction, and a non-angular prediction mode that does not use directional information when performing prediction. A mode for predicting luminance information may be different from a mode for predicting color difference information, and intra prediction mode information used to predict luminance information or predicted luminance signal information may be used to predict the color difference information.

If the size of the prediction unit is the same as the size of the transform unit when intra prediction is performed, the intra prediction may be performed for the prediction unit based on a pixel on the left side, a pixel on the top-left side, and a pixel on the top of the prediction unit. However, if the size of the prediction unit is different from the size of the transform unit when the intra prediction is performed, the intra prediction may be performed using a reference pixel based on the transform unit. In addition, intra prediction using N×N partitioning may be used only for the smallest coding unit.

The intra prediction method may generate a prediction block after applying an Adaptive Intra Smoothing (AIS) filter to the reference pixel according to a prediction mode. The type of the AIS filter applied to the reference pixel may vary. In order to perform the intra prediction method, the intra prediction mode of the current prediction unit may be predicted from the intra prediction mode of the prediction unit existing in the neighborhood of the current prediction unit. When a prediction mode of the current prediction unit is predicted using the mode information predicted from the neighboring prediction unit, if the intra prediction modes of the current prediction unit is the same as the prediction unit in the neighborhood, information indicating that the prediction modes of the current prediction unit is the same as the prediction unit in the neighborhood may be transmitted using predetermined flag information, and if the prediction modes of the current prediction unit and the prediction unit in the neighborhood are different from each other, prediction mode information of the current block may be encoded by performing entropy coding.

In addition, a residual block including a prediction unit that has performed prediction based on the prediction unit generated by the prediction part 120 and 125 and residual coefficient information, which is a difference value of the prediction unit with the original block, may be generated. The generated residual block may be input into the transform part 130.

The transform part 130 may transform the residual block including the original block and the residual coefficient information of the prediction unit generated through the prediction part 120 and 125 using a transform method such as Discrete Cosine Transform (DCT), Discrete Sine Transform (DST), or KLT. Whether to apply the DCT, the DST or the KLT to transform the residual block may be determined based on intra prediction mode information of a prediction unit used to generate the residual block.

The quantization part 135 may quantize values transformed into the frequency domain by the transform part 130. Quantization coefficients may vary according to the block or the importance of a video. A value calculated by the quantization part 135 may be provided to the inverse quantization part 140 and the rearrangement part 160.

The rearrangement part 160 may rearrange coefficient values for the quantized residual coefficients.

The rearrangement part 160 may change coefficients of a two-dimensional block shape into a one-dimensional vector shape through a coefficient scanning method. For example, the rearrangement part 160 may scan DC coefficients up to high-frequency domain coefficients using a zig-zag scan method, and change the coefficients into a one-dimensional vector shape. According to the size of the transform unit and the intra prediction mode, a vertical scan of scanning the coefficients of a two-dimensional block shape in the column direction and a horizontal scan of scanning the coefficients of a two-dimensional block shape in the row direction may be used instead of the zig-zag scan. That is, according to the size of the transform unit and the intra prediction mode, a scan method that will be used may be determined among the zig-zag scan, the vertical direction scan, and the horizontal direction scan.

The entropy coding part 165 may perform entropy coding based on values calculated by the rearrangement part 160. Entropy coding may use various encoding methods such as Exponential Golomb, Context-Adaptive Variable Length Coding (CAVLC), Context-Adaptive Binary Arithmetic Coding (CABAC), and the like.

The entropy coding part 165 may encode various information such as residual coefficient information and block type information of a coding unit, prediction mode information, partitioning unit information, prediction unit information and transmission unit information, motion vector information, reference frame information, block interpolation information, and filtering information input from the rearrangement part 160 and the prediction parts 120 and 125.

The entropy coding part 165 may entropy-encode the coefficient value of a coding unit input from the rearrangement part 160.

The inverse quantization part 140 and the inverse transform part 145 inverse-quantize the values quantized by the quantization part 135 and inverse-transform the values transformed by the transform part 130. The residual coefficient generated by the inverse quantization part 140 and the inverse transform part 145 may be combined with the prediction unit predicted through a motion estimation part, a motion compensation part, and an intra prediction part included in the prediction part 120 and 125 to generate a reconstructed block.

The filter part 150 may include at least one among a deblocking filter, an offset compensation unit, and an adaptive loop filter (ALF).

The deblocking filter may remove block distortion generated by the boundary between blocks in the reconstructed picture. In order to determine whether or not to perform deblocking, whether or not to apply the deblocking filter to the current block may be determined based on the pixels included in several columns or rows included in the block. A strong filter or a weak filter may be applied according to the deblocking filtering strength needed when the deblocking filter is applied to a block. In addition, when vertical direction filtering and horizontal direction filtering are performed in applying the deblocking filter, horizontal direction filtering and vertical direction filtering may be processed in parallel.

The offset correction unit may correct an offset to the original video by the unit of pixel for a video on which the deblocking has been performed. In order to perform offset correction for a specific picture, it is possible to use a method of dividing pixels included in the video into a certain number of areas, determining an area to perform offset, and applying the offset to the area, or a method of applying an offset in consideration of edge information of each pixel.

Adaptive Loop Filtering (ALF) may be performed based on a value obtained by comparing the reconstructed and filtered video with the original video. After dividing the pixels included in the video into predetermined groups, one filter to be applied to a corresponding group may be determined, and filtering may be performed differently for each group. A luminance signal, which is the information related to whether or not to apply ALF, may be transmitted for each coding unit (CU), and the shape and filter coefficient of an ALF filter to be applied may vary according to each block. In addition, an ALF filter of the same type (fixed type) may be applied regardless of the characteristic of a block to be applied.

The memory 155 may store the reconstructed block or picture calculated through the filter part 150, and the reconstructed and stored block or picture may be provided to the prediction part 120 and 125 when inter prediction is performed.

Figure 2:
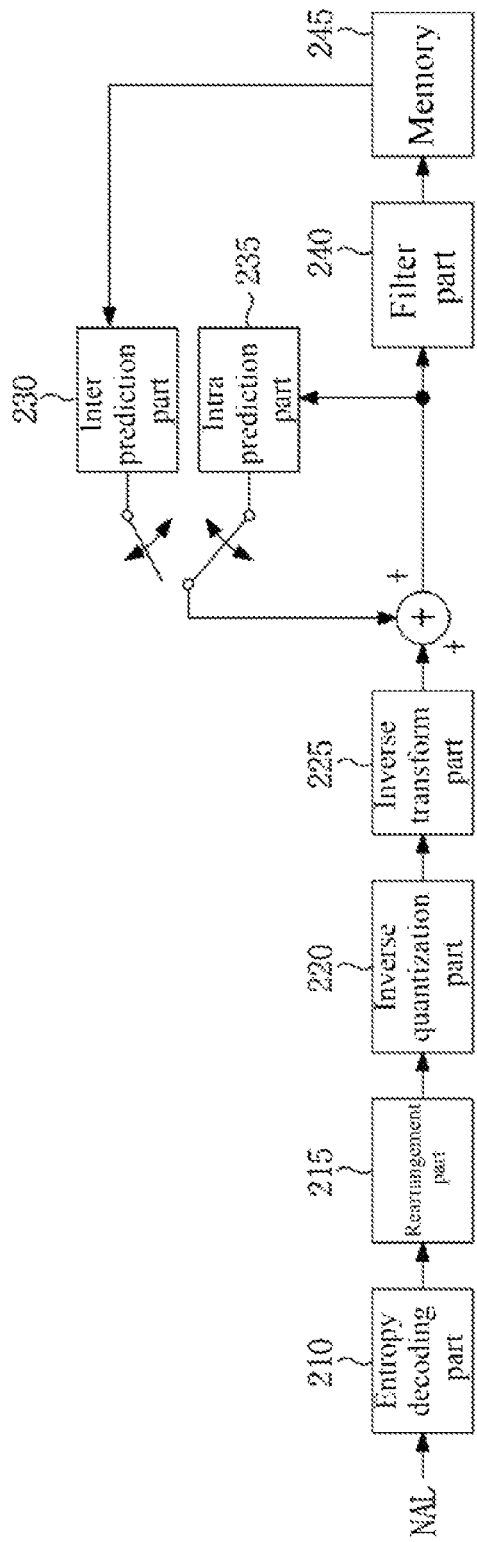
FIG. 2 is a block diagram showing a video decoder according to an embodiment of the present disclosure.

FIG. 2 is a block diagram showing a video decoder according to an embodiment of the present disclosure.

Referring to FIG. 2, a video decoder 200 may include an entropy decoding part 210, a rearrangement part 215, an inverse quantization part 220, an inverse transform part 225, a prediction part 230 and 235, a filter part 240, and a memory 245.

When a video bitstream is input from a video encoder, the input bitstream may be decoded in a procedure opposite to that of the video encoder.

The entropy decoding part 210 may perform entropy decoding in a procedure opposite to that of performing entropy coding in the entropy decoding part of the video encoder. For example, various methods corresponding to the method performed by the video encoder, such as Exponential Golomb, Context-Adaptive Variable Length Coding (CAVLC), and Context-Adaptive Binary Arithmetic Coding (CABAC), may be applied.

The entropy decoding part 210 may decode information related to intra prediction and inter prediction performed by the encoder.

The rearrangement part 215 may perform rearrangement on the bitstream entropy-decoded by the entropy decoding part 210 based on the rearrangement method performed by the encoder. The coefficients expressed in a one-dimensional vector shape may be reconstructed and rearranged as coefficients of two-dimensional block shape. The rearrangement part 215 may receive information related to coefficient scanning performed by the encoding part and perform reconstruction through a method of inverse-scanning based on the scanning order performed by the corresponding encoding part.

The inverse quantization part 220 may perform inverse quantization based on a quantization parameter provided by the encoder and a coefficient value of the rearranged block.

The inverse transform part 225 may perform inverse transform, i.e., inverse DCT, inverse DST, or inverse KLT, for the transform, i.e., DCT, DST, or KLT, performed by the transform part on a result of the quantization performed by the video encoder. The inverse transform may be performed based on a transmission unit determined by the video encoder. The inverse transform part 225 of the video decoder may selectively perform a transform technique (e.g., DCT, DST, KLT) according to a plurality of pieces of information such as a prediction method, a size of a current block, a prediction direction and the like.

The prediction part 230 and 235 may generate a prediction block based on information related to generation of a prediction block provided by the entropy decoder 210 and information on a previously decoded block or picture provided by the memory 245.

As described above, if the size of the prediction unit and the size of the transform unit are the same when intra prediction is performed in the same manner as the operation of the video encoder, intra prediction is performed on the prediction unit based on the pixel existing on the left side, the pixel on the top-left side, and the pixel on the top of the prediction unit. However, if the size of the prediction unit and the size of the transform unit are different when intra prediction is performed, intra prediction may be performed using a reference pixel based on a transform unit. In addition, intra prediction using N×N partitioning may be used only for the smallest coding unit.

The prediction part 230 and 235 may include a prediction unit determination part, an inter prediction part, and an intra prediction part. The prediction unit determination part may receive various information such as prediction unit information input from the entropy decoding part 210, prediction mode information of the intra prediction method, information related to motion prediction of an inter prediction method, and the like, identify the prediction unit from the current coding unit, and determine whether the prediction unit performs inter prediction or intra prediction. The inter prediction part 230 may perform inter prediction on the current prediction unit based on information included in at least one picture among pictures before or after the current picture including the current prediction unit by using information necessary for inter prediction of the current prediction unit provided by the video encoder. Alternatively, the inter prediction part 230 may perform inter prediction based on information on a partial area previously reconstructed in the current picture including the current prediction unit.

In order to perform inter prediction, it may be determined, based on the coding unit, whether the motion prediction method of the prediction unit included in a corresponding coding unit is a skip mode, a merge mode, a motion vector prediction mode (AMVP mode), or an intra-block copy mode.

The intra prediction part 235 may generate a prediction block based on the information on the pixel in the current picture. When the prediction unit is a prediction unit that has performed intra prediction, the intra prediction may be performed based on intra prediction mode information of the prediction unit provided by the video encoder. The intra prediction part 235 may include an Adaptive Intra Smoothing (AIS) filter, a reference pixel interpolation part, and a DC filter. The AIS filter is a part that performs filtering on the reference pixel of the current block, and may determine whether or not to apply the filter according to the prediction mode of the current prediction unit and apply the filter. AIS filtering may be performed on the reference pixel of the current block by using the prediction mode and AIS filter information of the prediction unit provided by the video encoder. When the prediction mode of the current block is a mode that does not perform AIS filtering, the AIS filter may not be applied.

When the prediction mode of the prediction unit is a prediction unit that performs intra prediction based on a pixel value obtained by interpolating the reference pixel, the reference pixel interpolation part may generate a reference pixel of a pixel unit having an integer value or less by interpolating the reference pixel. When the prediction mode of the current prediction unit is a prediction mode that generates a prediction block without interpolating the reference pixel, the reference pixel may not be interpolated. The DC filter may generate a prediction block through filtering when the prediction mode of the current block is the DC mode.

The reconstructed block or picture may be provided to the filter part 240. The filter part 240 may include a deblocking filter, an offset correction unit, and an ALF.

Information on whether a deblocking filter is applied to a corresponding block or picture and information on whether a strong filter or a weak filter is applied when a deblocking filter is applied may be provided by the video encoder. The deblocking filter of the video decoder may be provided with information related to the deblocking filter provided by the video encoder, and the video decoder may perform deblocking filtering on a corresponding block.

The offset correction unit may perform offset correction on the reconstructed video based on the offset correction type and offset value information applied to the video when encoding is performed.

The ALF may be applied to a coding unit based on information on whether or not to apply the ALF and information on ALF coefficients provided by the encoder. The ALF information may be provided to be included in a specific parameter set.

The memory 245 may store the reconstructed picture or block and use it as a reference picture or a reference block and may provide the reconstructed picture to an output unit.

Figure 3:
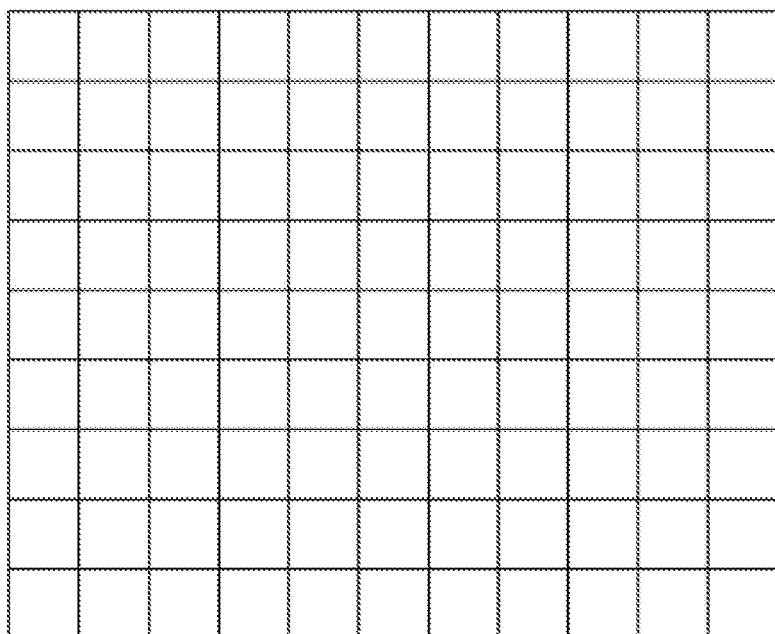
FIG. 3 is a view showing a basic coding tree unit according to an embodiment of the present disclosure.

FIG. 3 is a view showing a basic coding tree unit according to an embodiment of the present disclosure.

A coding block of a maximum size may be defined as a coding tree block. A picture is partitioned into a plurality of coding tree units (CTUs). The coding tree unit is a coding unit having a maximum size and may be referred to as a Large Coding Unit (LCU). FIG. 3 shows an example in which a picture is partitioned into a plurality of coding tree units.

The size of the coding tree unit may be defined at a picture level or a sequence level. To this end, information indicating the size of the coding tree unit may be signaled through a picture parameter set or a sequence parameter set.

For example, the size of the coding tree unit for the entire picture in a sequence may be set to 128×128. Alternatively, at the picture level, any one among 128×128 and 256×256 may be determined as the size of the coding tree unit. For example, the size of the coding tree unit may be set to 128×128 in a first picture, and the size of the coding tree unit may be set to 256×256 in a second picture.

Coding blocks may be generated by partitioning a coding tree unit. The coding block indicates a basic unit for performing encoding/decoding. For example, prediction or transform may be performed for each coding block, or a prediction encoding mode may be determined for each coding block. Here, the prediction encoding mode indicates a method of generating a prediction picture. For example, the prediction encoding mode may include prediction within a picture (intra prediction), prediction between pictures (inter prediction), current picture referencing (CPR) or intra-block copy (IBC), or combined prediction. For the coding block, a prediction block may be generated by using at least one prediction encoding mode among the intra prediction, the inter prediction, the current picture referencing, and the combined prediction.

Information indicating the prediction encoding mode of the current block may be signaled through a bitstream. For example, the information may be a 1-bit flag indicating whether the prediction encoding mode is an intra mode or an inter mode. Only when the prediction encoding mode of the current block is determined as the inter mode, the current picture referencing or the combined prediction may be used.

The current picture reference is for setting the current picture as a reference picture and obtaining a prediction block of the current block from an area that has already been encoded/decoded in the current picture. Here, the current picture means a picture including the current block. Information indicating whether the current picture reference is applied to the current block may be signaled through a bitstream. For example, the information may be a 1-bit flag. When the flag is true, the prediction encoding mode of the current block may be determined as the current picture reference, and when the flag is false, the prediction mode of the current block may be determined as inter prediction.

Alternatively, the prediction encoding mode of the current block may be determined based on a reference picture index. For example, when the reference picture index indicates the current picture, the prediction encoding mode of the current block may be determined as the current picture reference. When the reference picture index indicates a picture other than the current picture, the prediction encoding mode of the current block may be determined as inter prediction. That is, the current picture reference is a prediction method using information on an area in which encoding/decoding has been completed in the current picture, and inter prediction is a prediction method using information on another picture in which the encoding/decoding has been completed.

The combined prediction represents an encoding mode in which two or more among the intra prediction, the inter prediction, and the current reference picture are combined. For example, when the combined prediction is applied, a first prediction block may be generated based on one among the intra prediction, the inter prediction, and the current picture referencing, and a second prediction block may be generated based on another one. When the first prediction block and the second prediction block are generated, a final prediction block may be generated through an average operation or a weighted sum operation of the first prediction block and the second prediction block. Information indicating whether or not the combined prediction is applied may be signaled through a bitstream. The information may be a 1-bit flag.

Figure 4:
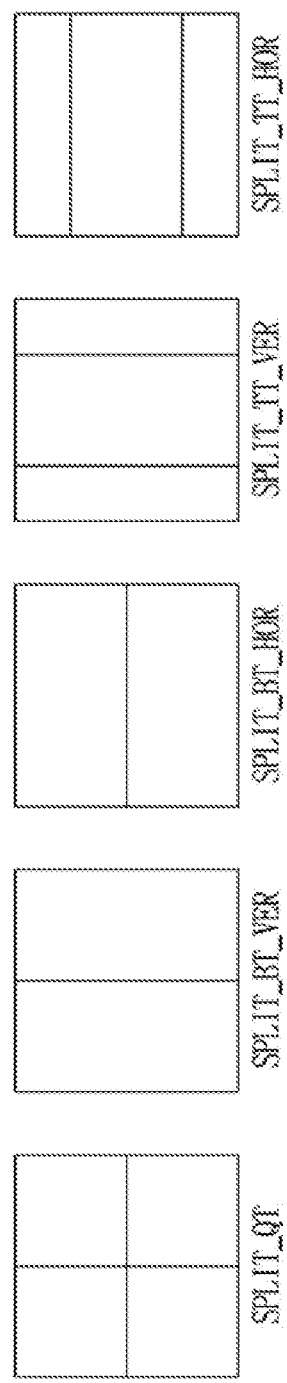
FIG. 4 is a view showing various partition types of a coding block.

FIG. 4 is a view showing various partition types of a coding block.

The coding block may be partitioned into a plurality of coding blocks based on quad tree partitioning, binary tree partitioning, or ternary tree partitioning. The partitioned coding block may be partitioned again into a plurality of coding blocks based on the quad tree partitioning, the binary tree partitioning, or the ternary tree partitioning.

The quad tree partitioning refers to a partitioning technique that partitions a current block into four blocks. As a result of the quad tree partitioning, the current block may be partitioned into four square-shaped partitions (see 'SPLIT_QT' of FIG. 4 (*a*)).

The binary tree partitioning refers to a partitioning technique that partitions a current block into two blocks. Partitioning a current block into two blocks along the vertical direction (i.e., using a vertical line crossing the current block) may be referred to as vertical direction binary tree partitioning, and partitioning a current block into two blocks along the horizontal direction (i.e., using a horizontal line crossing the current block) may be referred to as horizontal direction binary tree partitioning. As a result of the binary tree partitioning, the current block may be partitioned into two non-square shaped partitions. 'SPLIT_BT_VER' of FIG. 4 (b) shows a result of the vertical direction binary tree partitioning, and 'SPLIT_BT_HOR' of FIG. 4 (c) shows a result of the horizontal direction binary tree partitioning.

The ternary tree partitioning refers to a partitioning technique that partitions a current block into three blocks. Partitioning a current block into three blocks along the vertical direction (i.e., using two vertical lines crossing the current block) may be referred to as vertical direction ternary tree partitioning, and partitioning a current block into three blocks along the horizontal direction (i.e., using two horizontal lines crossing the current block) may be referred to as horizontal direction ternary tree partitioning. As a result of the ternary tree partitioning, the current block may be partitioned into three non-square shaped partitions. At this point, the width/height of a partition positioned at the center of the current block may be twice as large as the width/height of the other partitions. 'SPLIT_TT_VER' of FIG. 4 (d) shows a result of the vertical direction ternary tree partitioning, and 'SPLIT_TT_HOR' of FIG. 4 (e) shows a result of the horizontal direction ternary tree partitioning.

The number of times of partitioning a coding tree unit may be defined as a partitioning depth. The maximum partitioning depth of a coding tree unit may be determined at the sequence or picture level. Accordingly, the maximum partitioning depth of a coding tree unit may be different for each sequence or picture.

Alternatively, the maximum partitioning depth for each partitioning technique may be individually determined. For example, the maximum partitioning depth allowed for the quad tree partitioning may be different from the maximum partitioning depth allowed for the binary tree partitioning and/or the ternary tree partitioning.

The encoder may signal information indicating at least one among the partitioning type and the partitioning depth of the current block through a bitstream. The decoder may determine the partitioning type and the partitioning depth of a coding tree unit based on the information parsed from the bitstream.

Figure 5:
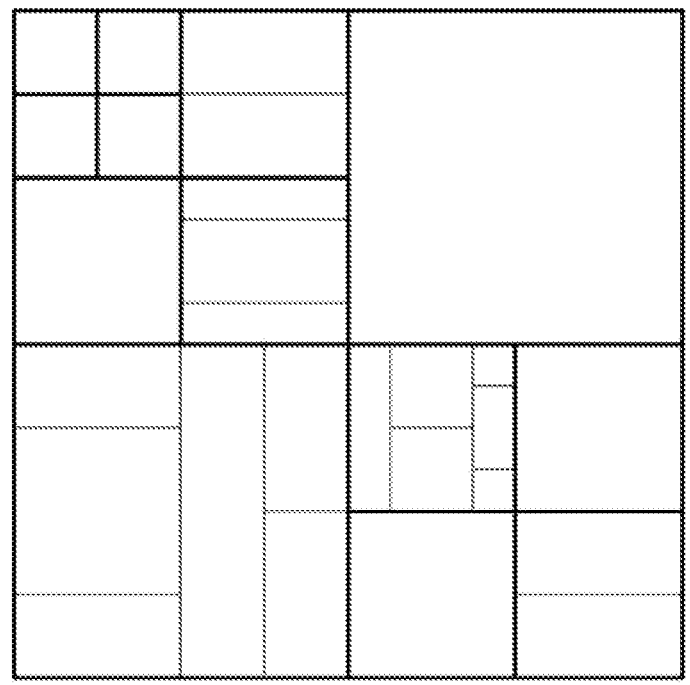
FIG. 5 is a view showing a result of partitioning a coding tree unit.

FIG. 5 is a view showing a result of partitioning a coding tree unit.

Partitioning a coding block using a partitioning technique such as quad tree partitioning, binary tree partitioning, and/or ternary tree partitioning may be referred to as multi-tree partitioning.

Coding blocks generated by applying the multi-tree partitioning to a coding block may be referred to as lower coding blocks. When the partitioning depth of a coding block is k, the partitioning depth of the lower coding blocks is set to k+1.

Contrarily, for coding blocks having a partitioning depth of k+1, a coding block having a partitioning depth of k may be referred to as an upper coding block.

The partitioning type of the current coding block may be determined based on at least one among a partitioning type of an upper coding block and a partitioning type of a neighboring coding block. Here, the neighboring coding block is a coding block adjacent to the current coding block and may include at least one among a top neighboring block and a left neighboring block of the current coding block, and a neighboring block adjacent to the top-left corner. Here, the partitioning type may include at least one among whether or not a quad tree partitioning, whether or not a binary tree partitioning, binary tree partitioning direction, whether or not a ternary tree partitioning, and ternary tree partitioning direction.

In order to determine a partitioning type of a coding block, information indicating whether or not the coding block can be partitioned may be signaled through a bitstream. The information is a 1-bit flag of 'split_cu_flag', and when the flag is true, it indicates that the coding block is partitioned by a quad tree partitioning technique.

When split_cu_flag is true, information indicating whether the coding block is quad-tree partitioned may be signaled through a bitstream. The information is a 1-bit flag of split_qt_flag, and when the flag is true, the coding block may be partitioned into four blocks.

For example, in the example shown in FIG. 5, as a coding tree unit is quad-tree partitioned, four coding blocks having a partitioning depth of 1 are generated. In addition, it is shown that quad tree partitioning is applied again to the first and fourth coding blocks among the four coding blocks generated as a result of the quad tree partitioning. As a result, four coding blocks having a partitioning depth of 2 may be generated.

In addition, coding blocks having a partitioning depth of 3 may be generated by applying the quad tree partitioning again to a coding block having a partitioning depth of 2.

When quad tree partitioning is not applied to the coding block, whether binary tree partitioning or ternary tree partitioning is performed on the coding block may be determined in consideration of at least one among the size of the coding block, whether the coding block is positioned at the picture boundary, the maximum partitioning depth, and the partitioning type of a neighboring block. When it is determined to perform binary tree partitioning or ternary tree partitioning on the coding block, information indicating the partitioning direction may be signaled through a bitstream. The information may be a 1-bit flag of mtt_split_cu_vertical_flag. Based on the flag, whether the partitioning direction is a vertical direction or a horizontal direction may be determined. Additionally, information indicating whether binary tree partitioning or ternary tree partitioning is applied to the coding block may be signaled through a bitstream. The information may be a 1-bit flag of mtt_split_cu_binary_flag. Based on the flag, whether binary tree partitioning or ternary tree partitioning is applied to the coding block may be determined.

For example, in the example shown in FIG. 5, it is shown that vertical direction binary tree partitioning is applied to a coding block having a partitioning depth of 1, vertical direction ternary tree partitioning is applied to the left-side coding block among the coding blocks generated as a result of the partitioning, and vertical direction binary tree partitioning is applied to the right-side coding block.

Inter prediction is a prediction encoding mode that predicts a current block by using information of a previous picture. For example, a block at the same position as the current block in the previous picture (hereinafter, a collocated block) may be set as the prediction block of the current block. Hereinafter, a prediction block generated based on a block at the same position as the current block will be referred to as a collocated prediction block.

Contrarily, when an object existing in the previous picture has moved to another position in the current picture, the current block may be effectively predicted by using a motion of the object. For example, when the moving direction and the size of an object can be known by comparing the previous picture and the current picture, a prediction block (or a prediction picture) of the current block may be generated in consideration of motion information of the object. Hereinafter, the prediction block generated using motion information may be referred to as a motion prediction block.

A residual block may be generated by subtracting the prediction block from the current block. At this point, when there is a motion of an object, the energy of the residual block may be reduced by using the motion prediction block instead of the collocated prediction block, and therefore, compression performance of the residual block can be improved.

As described above, generating a prediction block by using motion information may be referred to as motion compensation prediction. In most inter prediction, a prediction block may be generated based on the motion compensation prediction.

The motion information may include at least one among a motion vector, a reference picture index, a prediction direction, and a bidirectional weight index. The motion vector represents the moving direction and the size of an object. The reference picture index specifies a reference picture of the current block among reference pictures included in a reference picture list. The prediction direction indicates any one among unidirectional L0 prediction, unidirectional L1 prediction, and bidirectional prediction (L0 prediction and L1 prediction). According to the prediction direction of the current block, at least one among motion information in the L0 direction and motion information in the L1 direction may be used. The bidirectional weight index specifies a weighting value applied to a L0 prediction block and a weighting value applied to a L1 prediction block.

Figure 6:
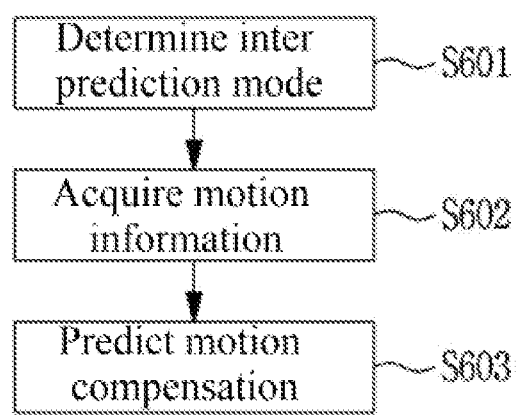
FIG. 6 is a flowchart illustrating an inter prediction method according to an embodiment of the present disclosure.

FIG. 6 is a flowchart illustrating an inter prediction method according to an embodiment of the present disclosure.

Referring to FIG. 6, the inter prediction method includes the steps of determining an inter prediction mode of a current block (S601), acquiring motion information of the current block according to the determined inter prediction mode (S602), and performing motion compensation prediction for the current block based on the acquired motion information (S603).

Here, the inter prediction mode represents various techniques for determining motion information of the current block, and may include an inter prediction mode that uses translational motion information and an inter prediction mode that uses affine motion information. For example, the inter prediction mode using translational motion information may include a merge mode and a motion vector prediction mode, and the inter prediction mode using affine motion information may include an affine merge mode and an affine motion vector prediction mode. The motion information of the current block may be determined based on a neighboring block adjacent to the current block or information parsed from a bitstream according to the inter prediction mode.

Hereinafter, the inter prediction method using affine motion information will be described in detail.

Figure 7:
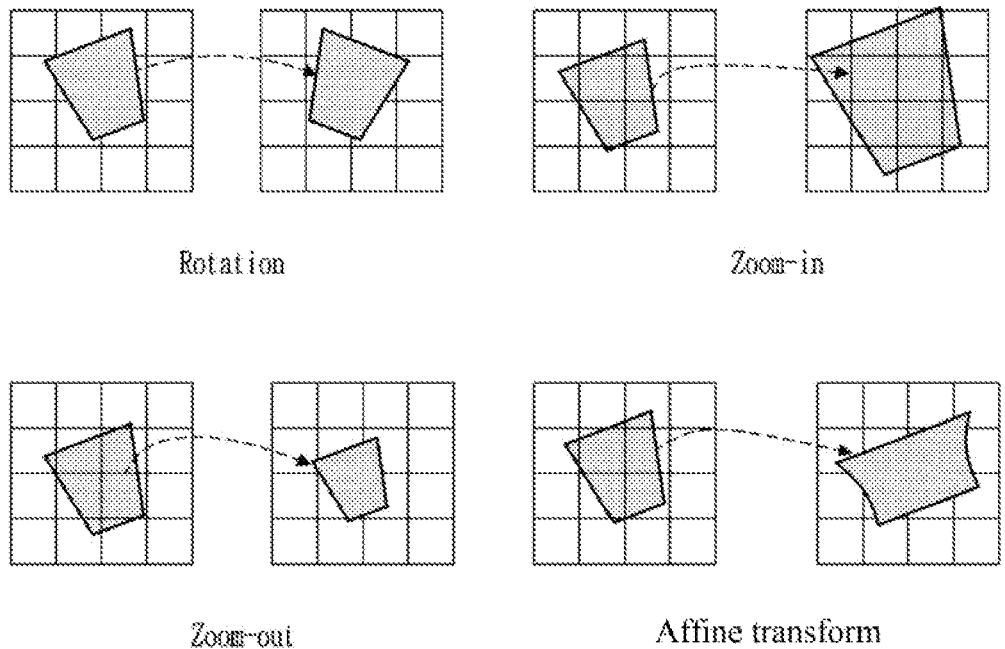
FIG. 7 is a view showing a nonlinear motion of an object.

FIG. 7 is a view showing a nonlinear motion of an object.

A nonlinear motion of an object may be generated in a video. For example, as shown in the example of FIG. 7, a nonlinear motion of an object, such as zoom-in, zoom-out, rotation, affine transform or the like of a camera, may occur. When a nonlinear motion of an object occurs, the motion of the object cannot be effectively expressed with a translational motion vector. Accordingly, encoding efficiency can be improved by using an affine motion instead of a translational motion in an area where a nonlinear motion of an object occurs.

Figure 8:
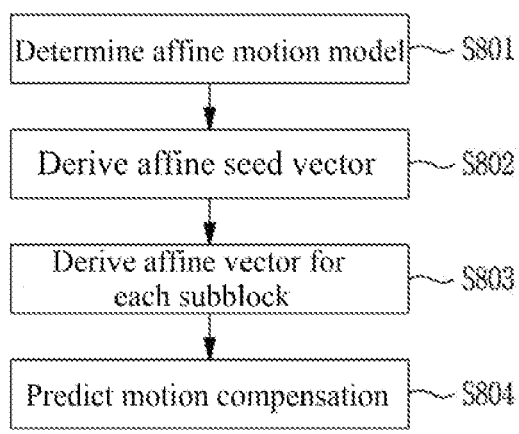
FIG. 8 is a flowchart illustrating an inter prediction method based on an affine motion according to an embodiment of the present disclosure.

FIG. 8 is a flowchart illustrating an inter prediction method based on an affine motion according to an embodiment of the present disclosure.

Whether an inter prediction technique based on an affine motion is applied to the current block may be determined based on the information parsed from a bitstream. Specifically, whether the inter prediction technique based on an affine motion is applied to the current block may be determined based on at least one among a flag indicating whether the affine merge mode is applied to the current block and a flag indicating whether the affine motion vector prediction mode is applied to the current block.

When the inter prediction technique based on an affine motion is applied to the current block, an affine motion model of the current block may be determined (S801). The affine motion model may be determined as at least one among a six-parameter affine motion model and a four-parameter affine motion model. The six-parameter affine motion model expresses an affine motion using six parameters, and the four-parameter affine motion model expresses an affine motion using four parameters.

Equation 1 expresses an affine motion using six parameters. The affine motion represents a translational motion for a predetermined area determined by affine seed vectors.

$$v_x = ax - by + e$$
$$v_y = cx + dy + f \quad \text{[Equation 1]}$$

When an affine motion is expressed using six parameters, a complicated motion can be expressed. However, as the number of bits required for encoding each of the parameters increases, encoding efficiency may be lowered. Accordingly, the affine motion may be expressed using four parameters. Equation 2 expresses an affine motion using four parameters.

$$v_x = ax - by + e$$
$$v_y = bx + ay + f \quad \text{[Equation 2]}$$

Information for determining an affine motion model of the current block may be encoded and signaled through a bitstream. For example, the information may be a 1-bit flag of 'affine_type_flag'. When the value of the flag is 0, it may indicate that a 4-parameter affine motion model is applied, and when the value of the flag is 1, it may indicate that a 6-parameter affine motion model is applied. The flag may be encoded by the unit of slice, tile, or block (e.g., by the unit of coding block or coding tree). When a flag is signaled at the slice level, an affine motion model determined at the slice level may be applied to all blocks belonging to the slice.

Alternatively, an affine motion model of the current block may be determined based on an affine inter prediction mode of the current block. For example, when the affine merge mode is applied, the affine motion model of the current block may be determined as a 4-parameter motion model. Contrarily, when the affine motion vector prediction mode is applied, information for determining the affine motion model of the current block may be encoded and signaled through a bitstream. For example, when the affine motion vector prediction mode is applied to the current block, the affine motion model of the current block may be determined based on the 1-bit flag of 'affine_type_flag'.

Next, an affine seed vector of the current block may be derived (S802). When a 4-parameter affine motion model is selected, motion vectors at two control points of the current block may be derived. Contrarily, when a 6-parameter affine motion model is selected, motion vectors at three control points of the current block may be derived. The motion vector at a control point may be referred to as an affine seed vector. The control point may include at least one among the top-left corner, the top-right corner, and the bottom-left corner of the current block.

Figure 9:
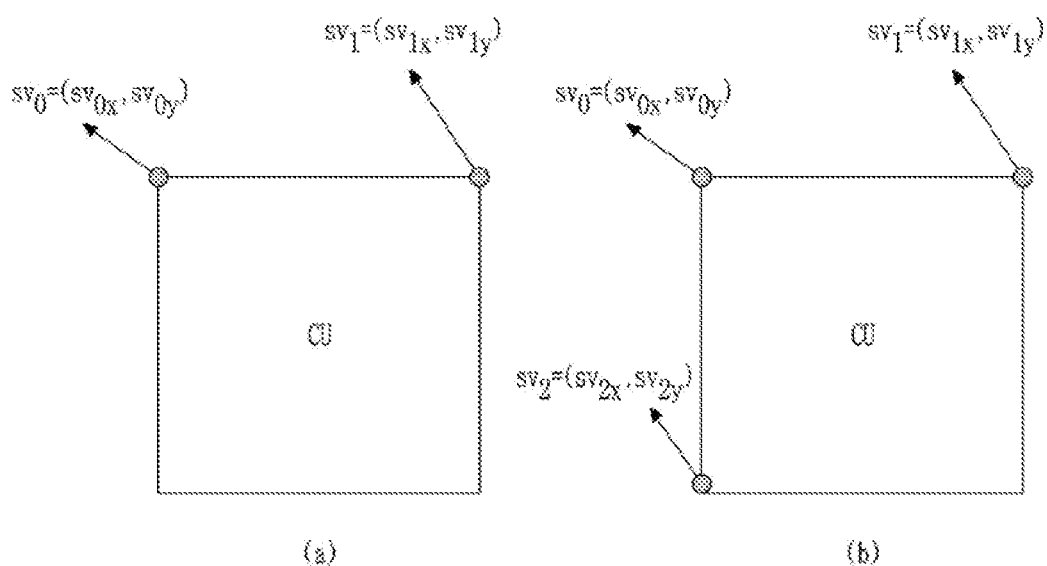
FIG. 9 is a view showing an example of affine seed vectors of each affine motion model.

FIG. 9 is a view showing an example of affine seed vectors of each affine motion model.

In the 4-parameter affine motion model, affine seed vectors may be derived for two among the top-left corner, the top-right corner, and the bottom-left corner. For example, as shown in the example of FIG. 9 (*a*), when a 4-parameter affine motion model is selected, an affine vector may be derived using the affine seed vector $sv_0$ for the top-left corner of the current block (e.g., top-left sample (x1, y1)) and the affine seed vector $sv_1$ for the top-right corner of the current block (e.g., the top-right sample (x1, y1)). It is also possible to use an affine seed vector for the bottom-left corner instead of the affine seed vector for the top-left corner, or use an affine seed vector for the bottom-left corner instead of the affine seed vector for the top-right corner.

In the 6-parameter affine motion model, affine seed vectors may be derived for the top-left corner, the top-right corner, and the bottom-left corner. For example, as shown in the example of FIG. 9 (*b*), when a 6-parameter affine motion model is selected, an affine vector may be derived using the affine seed vector $sv_0$ for the top-left corner of the current block (e.g., top-left sample (x1, y1)), the affine seed vector $sv_1$ for the top-right corner of the current block (e.g., the top-right sample (x1, y1)), and the affine seed vector $sv_2$ for the top-left corner of the current block (e.g., top-left sample (x2, y2)).

In the embodiment described below, in the 4-parameter affine motion model, the affine seed vectors of the top-left control point and the top-right control point will be referred to as a first affine seed vector and a second affine seed vector, respectively. In the embodiments using the first affine seed vector and the second affine seed vector described below, at least one among the first affine seed vector and the second affine seed vector may be replaced by the affine seed vector of the bottom-left control point (a third affine seed vector) or the affine seed vector of the bottom-right control point (a fourth affine seed vector).

In addition, in the 6-parameter affine motion model, the affine seed vectors of the top-left control point, the top-right control point, and the bottom-left control point will be referred to as a first affine seed vector, a second affine seed vector, and a third affine seed vector, respectively. In the embodiments using the first affine seed vector, the second affine seed vector, and the third affine seed vector described below, at least one among the first affine seed vector, the second affine seed vector, and the third affine seed vector may be replaced by the affine seed vector of the bottom-right control point (a fourth affine seed vector).

An affine vector may be derived for each subblock by using the affine seed vectors (S803). Here, the affine vector represents a translational motion vector derived based on the affine seed vectors. The affine vector of a subblock may be referred to as an affine subblock motion vector or a subblock motion vector.

Figure 10:
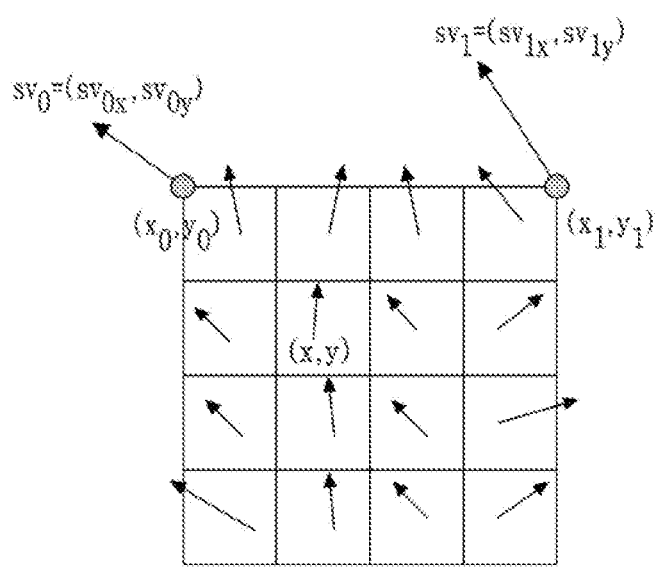
FIG. 10 is a view showing an example of affine vectors of subblocks in a 4-parameter motion model.

FIG. 10 is a view showing an example of affine vectors of subblocks in a 4-parameter motion model.

The affine vector of the subblock may be derived based on the position of the control point, the position of the subblock, and the affine seed vector. For example, Equation 3 shows an example of deriving an affine subblock vector.

$$v_x = \frac{(sv_{1x} - sv_{0x})}{(x_1 - x_0)}(x - x_0) - \frac{(sv_{1y} - sv_{0y})}{(x_1 - x_0)}(y - y_0) + sv_{0x} \quad \text{[Equation 3]}$$

-continued
$$v_y = \frac{(sv_{1y} - sv_{0y})}{(x_1 - x_0)}(x - x_0) - \frac{(sv_{1x} - sv_{0x})}{(x_1 - x_0)}(y - y_0) + sv_{0y}$$

In Equation 3, (x, y) denotes the position of a subblock. Here, the position of a subblock indicates the position of a reference sample included in the subblock. The reference sample may be a sample positioned at the top-left corner of the subblock, or a sample of which at least one among the x-axis and y-axis coordinates is a center point. $(x_0, y_0)$ denotes the position of the first control point, and $(sv_{0x}, sv_{0y})$ denotes the first affine seed vector. In addition, $(x_1, y_1)$ denotes the position of the second control point, and $(sv_{1x}, sv_{1y})$ denotes the second affine seed vector.

When the first control point and the second control point correspond to the top-left corner and the top-right corner of the current block respectively, $x_1-x_0$ may be set to a value equal to the width of the current block.

Thereafter, motion compensation prediction for each subblock may be performed using the affine vector of each subblock (S804). As a result of performing the motion compensation prediction, a prediction block for each subblock may be generated. The prediction blocks of the subblocks may be set as the prediction blocks of the current block.

Next, an inter prediction method using translational motion information will be described in detail.

Motion information of the current block may be derived from motion information of another block. Here, another block may be a block encoded/decoded by inter prediction before the current block. Setting the motion information of the current block to be equal to the motion information of another block may be defined as a merge mode. In addition, setting the motion vector of another block as the prediction value of the motion vector of the current block may be defined as a motion vector prediction mode.

Figure 11:
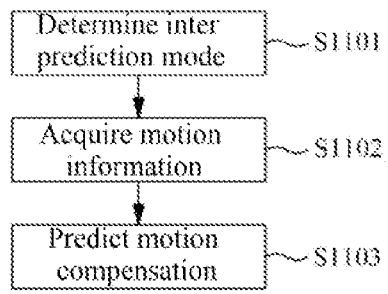
FIG. 11 is a flowchart illustrating a process of deriving motion information of a current block using a merge mode.

FIG. 11 is a flowchart illustrating a process of deriving motion information of a current block using a merge mode.

A merge candidate of the current block may be derived (S1101). The merge candidate of the current block may be derived from a block encoded/decoded by inter prediction before the current block.

Figure 12:
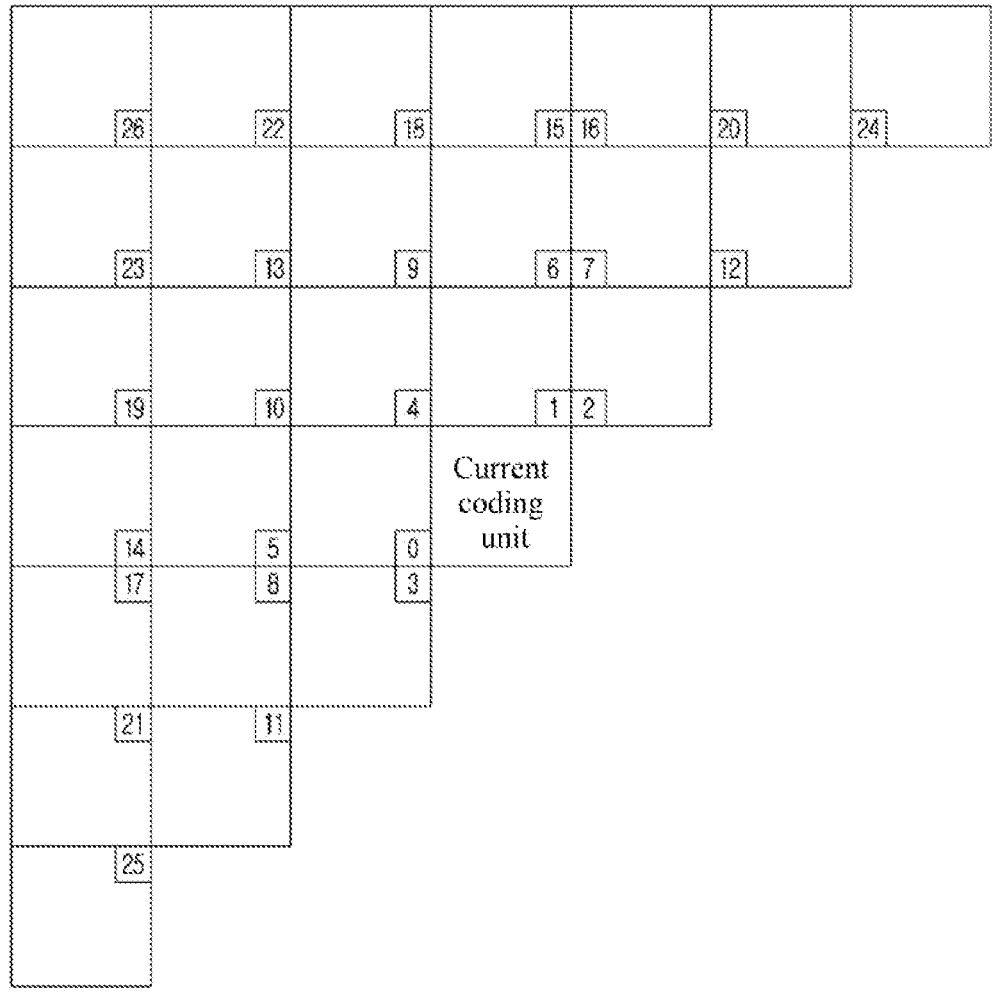
FIG. 12 is a view showing an example of candidate blocks used for deriving a merge candidate.

FIG. 12 is a view showing an example of candidate blocks used for deriving a merge candidate.

The candidate blocks may include at least one among neighboring blocks including a sample adjacent to the current block or non-neighboring blocks including a sample not adjacent to the current block. Hereinafter, samples for determining candidate blocks are defined as reference samples. In addition, a reference sample adjacent to the current block is referred to as a neighboring reference sample, and a reference sample not adjacent to the current block is referred to as a non-neighboring reference sample.

The neighboring reference sample may be included in a neighboring column of the leftmost column of the current block or a neighboring row of the uppermost row of the current block. For example, when the coordinates of the top-left sample of the current block is (0, 0), at least one among a block including a reference sample at the position of (−1, H−1), a block including a reference sample at the position of (W−1, −1), a block including a reference sample at the position of (W, −1), a block including a reference sample at the position of (−1, H), and a block including a reference sample at the position of (−1, −1) may be used as a candidate block. Referring to the drawing, neighboring blocks of index 0 to 4 may be used as candidate blocks.

The non-neighboring reference sample represents a sample of which at least one among an x-axis distance and a y-axis distance from a reference sample adjacent to the current block has a predefined value. For example, at least one among a block including a reference sample of which the x-axis distance from the left reference sample is a predefined value, a block including a non-neighboring sample of which the y-axis distance from the top reference sample is a predefined value, and a block including a non-neighboring sample of which the x-axis distance and the y-axis distance from the top-left reference sample are predefined values may be used as a candidate block. The predefined values may be a natural number such as 4, 8, 12, 16 or the like. Referring to the drawing, at least one among the blocks of index 5 to 26 may be used as a candidate block.

A sample not positioned on the same vertical line, horizontal line, or diagonal line as the neighboring reference sample may be set as a non-neighboring reference sample.

Figure 13:
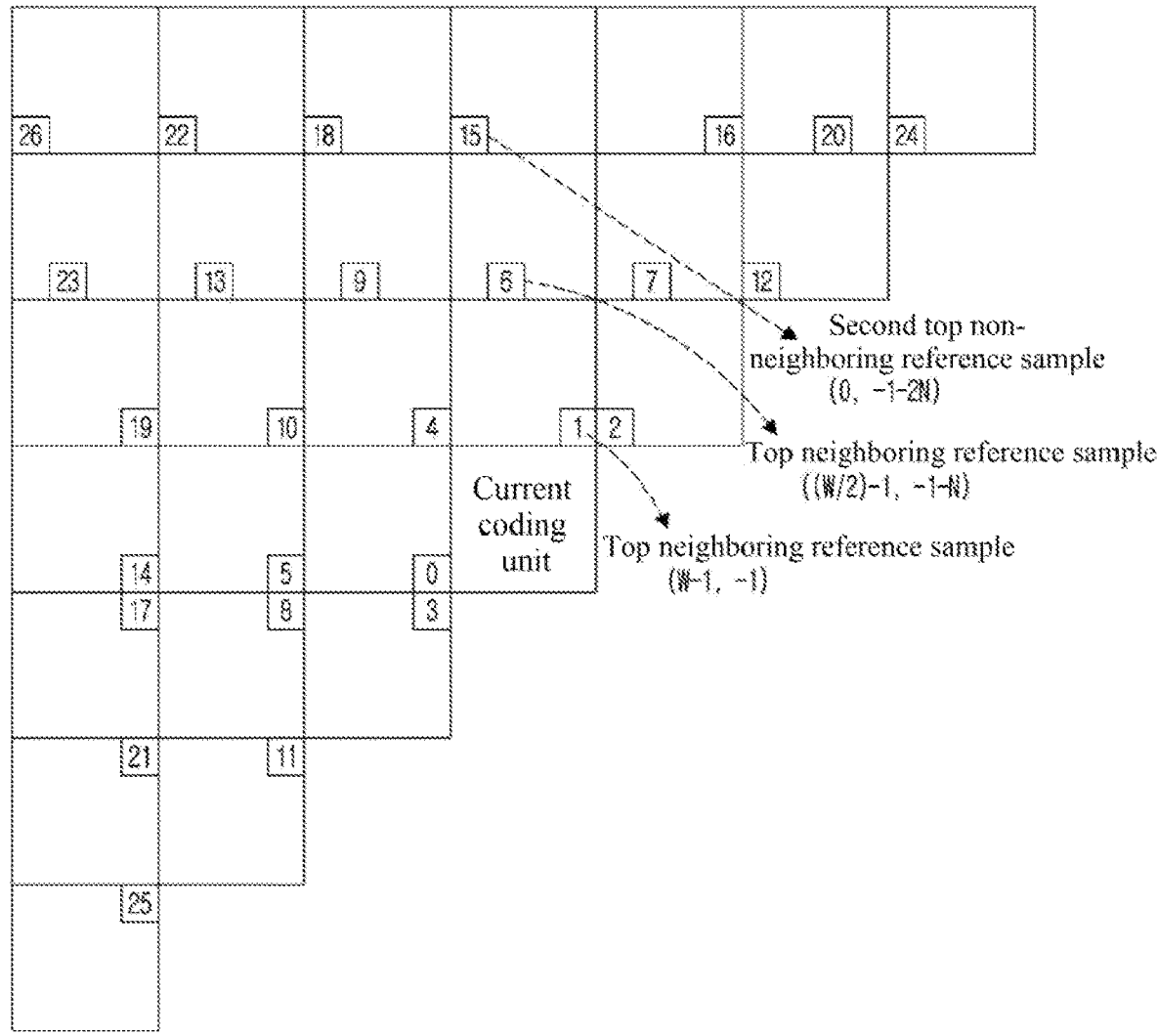
FIG. 13 is a view showing positions of reference samples.

FIG. 13 is a view showing positions of reference samples.

As shown in the example of FIG. 13, the x coordinates of the top non-neighboring reference samples may be set to be different from the x coordinates of the top neighboring reference samples. For example, when the position of the top neighboring reference sample is (W−1, −1), the position of a top non-neighboring reference sample separated as much as N from the top neighboring reference sample on the y-axis may be set to ((W/2)−1, −1−N), and the position of a top non-neighboring reference sample separated as much as 2N from the top neighboring reference sample on the y-axis may be set to (0, −1−2N). That is, the position of a non-neighboring reference sample may be determined based on the position of a neighboring reference sample and a distance from the neighboring reference sample.

Hereinafter, a candidate block including a neighboring reference sample among the candidate blocks is referred to as a neighboring block, and a block including a non-neighboring reference sample is referred to as a non-neighboring block.

When the distance between the current block and the candidate block is greater than or equal to a threshold value, the candidate block may be set to be unavailable as a merge candidate. The threshold value may be determined based on the size of the coding tree unit. For example, the threshold value may be set to the height (ctu_height) of the coding tree unit or a value obtained by adding or subtracting an offset to or from the height (e.g., ctu_height±N) of the coding tree unit. The offset N is a value predefined in the encoder and the decoder, and may be set to 4, 8, 16, 32 or ctu_height.

When the difference between the y-axis coordinate of the current block and the y-axis coordinate of a sample included in a candidate block is greater than the threshold value, the candidate block may be determined to be unavailable as a merge candidate.

Alternatively, a candidate block that does not belong to the same coding tree unit as the current block may be set to be unavailable as a merge candidate. For example, when a reference sample deviates from the top boundary of a coding tree unit to which the current block belongs, a candidate block including the reference sample may be set to be unavailable as a merge candidate.

When the top boundary of the current block is adjacent to the top boundary of the coding tree unit, a plurality of candidate blocks is determined to be unavailable as a merge candidate, and thus the encoding/decoding efficiency of the current block may decrease. To solve this problem, candidate blocks may be set so that the number of candidate blocks positioned on the left side of the current block is greater than the number of candidate blocks positioned on the top of the current block.

Figure 14:
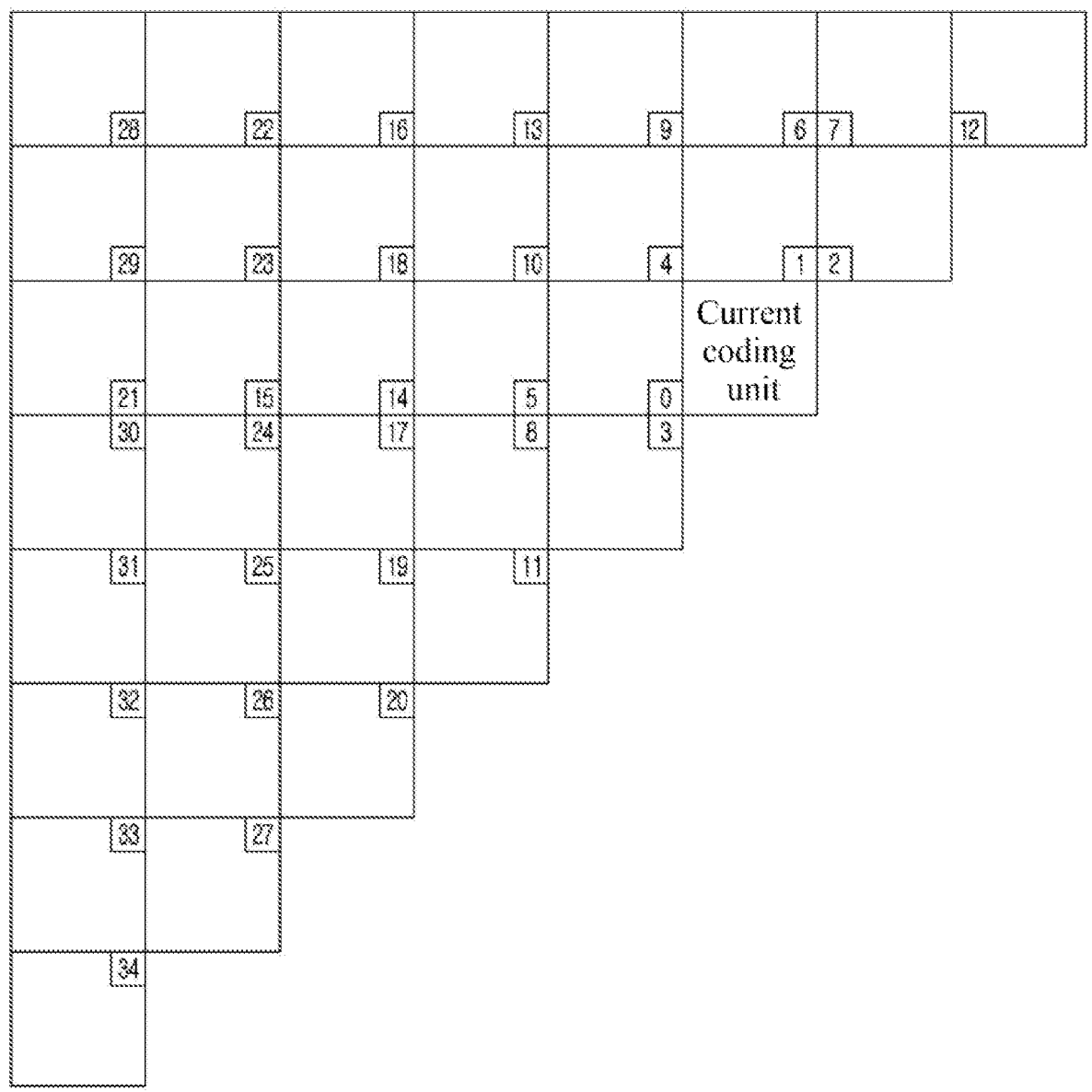
FIG. 14 is a view showing an example of candidate blocks used for deriving a merge candidate.

FIG. 14 is a view showing an example of candidate blocks used for deriving a merge candidate.

As shown in the example of FIG. 14, top blocks belonging to top N block columns of the current block and left-side blocks belonging to M left-side block columns of the current block may be set as candidate blocks. At this point, the number of left-side candidate blocks may be set to be greater than the number of top candidate blocks by setting M to be greater than N.

For example, the difference between the y-axis coordinate of the reference sample in the current block and the y-axis coordinate of the top block that can be used as a candidate block may be set not to exceed N times of the height of the current block. In addition, the difference between the x-axis coordinate of the reference sample in the current block and the x-axis coordinate of the left-side block that can be used as a candidate block may be set not to exceed M times of the width of the current block.

For example, in the example shown in FIG. 14, it is shown that blocks belonging to the top two block columns of the current block and blocks belonging to the left five block columns of the current block are set as candidate blocks.

As another example, when a candidate block does not belong to a coding tree unit the same as that of the current block, a merge candidate may be derived using a block belonging to the same coding tree unit as the current block or a block including a reference sample adjacent to the boundary of the coding tree unit, instead of the candidate block.

Figure 15:
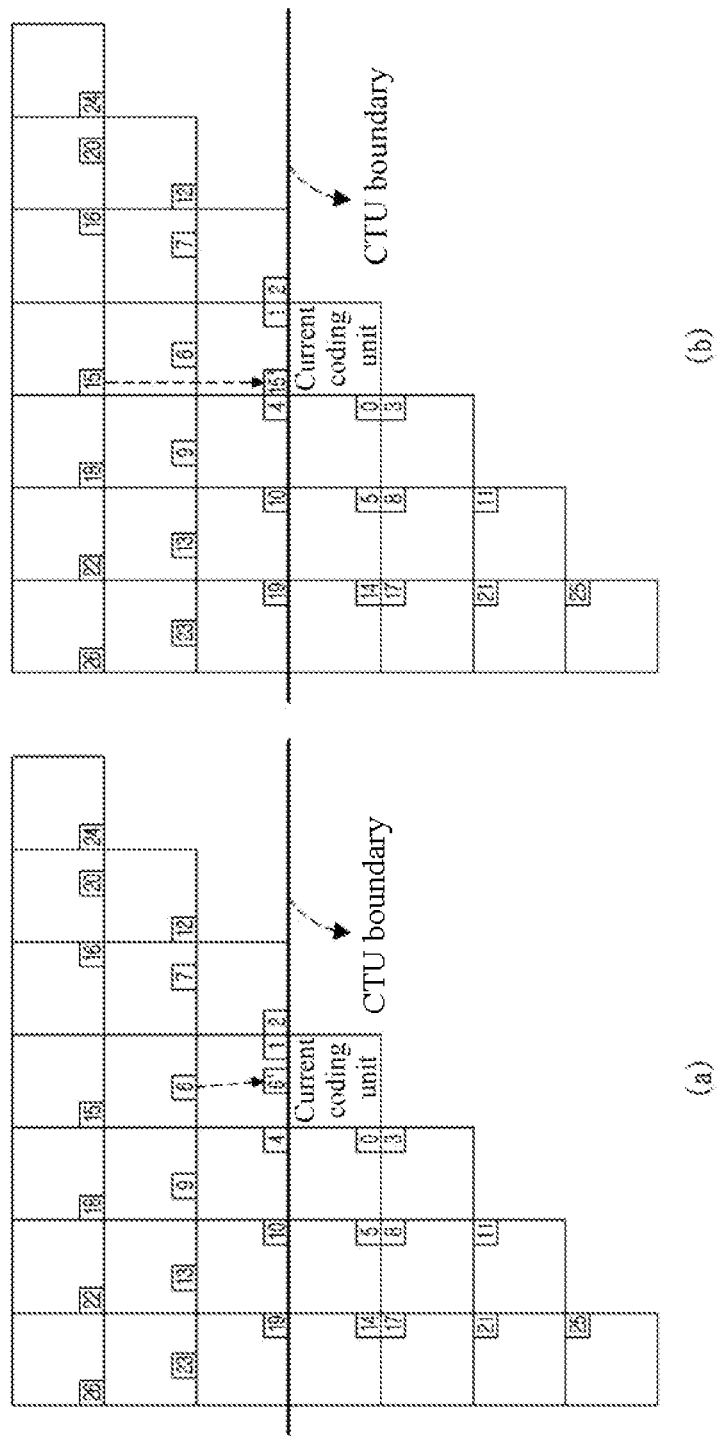
FIG. 15 is a view showing an example in which the position of a reference sample is changed.

FIG. 15 is a view showing an example in which the position of a reference sample is changed.

When a reference sample is included in a coding tree unit different from the current block, and the reference sample is not adjacent to the boundary of the coding tree unit, a candidate block may be determined using a reference sample adjacent to the boundary of the coding tree unit, instead of the reference sample.

For example, in the examples shown in FIGS. 15 (a) and 15 (b), when the top boundary of the current block and the top boundary of the coding tree unit are in contact with each other, the reference samples on the top of the current block belong to a coding tree unit different from the current block. Among the reference samples belonging to the coding tree unit different from the current block, a reference sample not adjacent to the top boundary of the coding tree unit may be replaced with a sample adjacent to the top boundary of the coding tree unit.

For example, as shown in the example of FIG. 15 (a), the reference sample at position 6 is replaced with the sample at position 6' positioned at the top boundary of the coding tree unit, and as shown in the example of FIG. 15 (b), the reference sample at position 15 is replaced with the sample at position 15' positioned at the top boundary of the coding tree unit. At this point, the y coordinate of the replacement sample is changed to a position adjacent to the coding tree unit, and the x coordinate of the replacement sample may be set to be equal to the reference sample. For example, the sample at position 6' may have the same x-coordinate as the sample at position 6, and the sample at position 15' may have the same x-coordinate as the sample at position 15.

Alternatively, a value obtained by adding or subtracting an offset to or from the x coordinate of the reference sample may be set as the x coordinate of the replacement sample. For example, when the x-coordinates of the neighboring reference sample positioned on the top of the current block and the non-neighboring reference sample are the same, a value obtained by adding or subtracting an offset to or from the x coordinate of the reference sample may be set as the x coordinate of the replacement sample. This is for preventing the replacement sample replacing the non-neighboring reference sample from being placed at the same position as another non-neighboring reference sample or neighboring reference sample.

Figure 16:
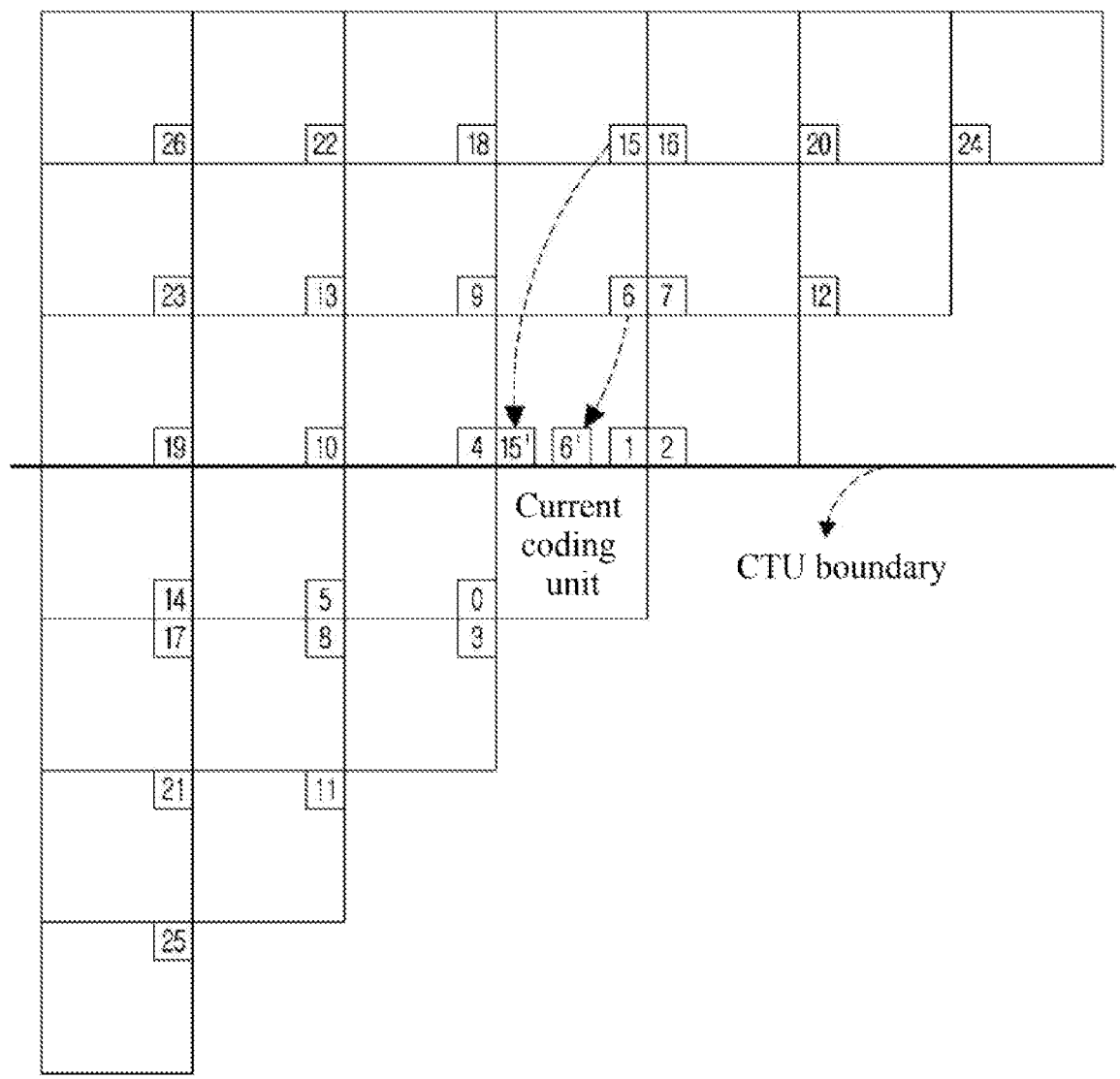
FIG. 16 is a view showing an example in which the position of a reference sample is changed.

FIG. 16 is a view showing an example in which the position of a reference sample is changed.

In replacing a reference sample that is included in a coding tree unit different from the current block and is not adjacent to the boundary of the coding tree unit with a sample positioned at the boundary of the coding tree unit, a value obtained by adding or subtracting an offset to and from the x coordinate of the reference sample may be set as the x-coordinate of the replacement sample.

For example, in the example shown in FIG. 16, the reference sample at position 6 and the reference sample at position 15 may be replaced with the sample at position 6' and the sample at position 15' respectively, of which the y coordinates are the same as that of the row adjacent to the top boundary of the coding tree unit. At this point, the x-coordinate of the sample at position 6' may be set to a value obtained by subtracting W/2 from the x-coordinate of the reference sample at position 6, and the x-coordinate of the sample at position 15' may be set to a value obtained by subtracting W−1 from the x-coordinate of the reference sample at position 15.

Unlike the examples shown in FIGS. 15 and 16, the y coordinate of the row positioned on the top of the uppermost row of the current block or the y coordinate of the top boundary of the coding tree unit may be set as the y coordinate of the replacement sample.

Although not shown, a sample replacing the reference sample may be determined based on the left-side boundary of the coding tree unit. For example, when the reference sample is not included in the same coding tree unit as the current block and is not adjacent to the left-side boundary of the coding tree unit, the reference sample may be replaced with a sample adjacent to the left-side boundary of the coding tree unit. At this point, the replacement sample may have a y-coordinate the same as that of the reference sample, or may have a y-coordinate obtained by adding or subtracting an offset to and from the y-coordinate of the reference sample.

Thereafter, a block including the replacement sample may be set as a candidate block, and a merge candidate of the current block may be derived based on the candidate block.

A merge candidate may also be derived from a temporally neighboring block included in a picture different from the current block. For example, a merge candidate may be derived from a collocated block included in a collocated picture.

The motion information of the merge candidate may be set to be equal to the motion information of the candidate block. For example, at least one among a motion vector, a reference picture index, a prediction direction, and a bidirectional weight index of the candidate block may be set as motion information of the merge candidate.

A merge candidate list including merge candidates may be generated (S1102). The merge candidates may be divided into a neighboring merge candidate derived from a neighboring block adjacent to the current block and a non-adjacent merge candidate derived from a non-neighboring block.

Indexes of the merge candidates in the merge candidate list may be assigned in a predetermined order. For example, an index assigned to an adjacent merge candidate may have a value smaller than an index assigned to a non-adjacent merge candidate. Alternatively, an index may be assigned to each of the merge candidates based on the index of each block shown in FIG. 12 or 14.

When a plurality of merge candidates is included in the merge candidate list, at least one among the plurality of merge candidates may be selected (S1103). At this point, information indicating whether motion information of the current block is derived from an adjacent merge candidate may be signaled through a bitstream. The information may be a 1-bit flag. For example, a syntax element isAdjancentMergeFlag indicating whether the motion information of the current block is derived from an adjacent merge candidate may be signaled through a bitstream. When the value of the syntax element isAdjancentMergeFlag is 1, motion information of the current block may be derived based on the adjacent merge candidate. Contrarily, when the value of the syntax element isAdjancentMergeFlag is 0, motion information of the current block may be derived based on a non-adjacent merge candidate.

Table 1 shows a syntax table including syntax element isAdjancentMergeFlag.

TABLE 1

|  | Descriptor |
|---|---|
| coding_unit( x0, y0, cbWidth, cbHeight, treeType ) { | |
|   if( slice_type != I ) { | |
|     pred_mode_flag | ae(v) |
|   } | |
|   if( CuPredMode[ x0 ][ y0 ] = = MODE_INTRA ) { | |
|     if( treeType = = SINGLE_TREE \|\| treeType = = DUAL_TREE_LUMA ) { | |
|       intra_luma_mpm_flag[ x0 ][ y0 ] | |
|       if( intra_luma_mpm_flag[ x0 ][ y0 ] ) | |
|         intra_luma_mpm_idx[ x0 ][ y0 ] | ae(v) |
|       else | |
|         intra_luma_mpm_remainder[ x0 ][ y0 ] | ae(v) |
|     } | |
|     if( treeType = = SINGLE_TREE \|\| treeType = = DUAL_TREE_CHROMA ) | |
|       intra_chroma_pred_mode[ x0 ][ y0 ] | ae(v) |
|   } else { | |
|   if (cu_skip_falg[x0][y0]) { | |
|     if (MaxNumMergeCand > 1){ | |
|       isAdjacentMergeflag | ae(v) |
|       if (isAdjcanetMergeflag){ | |
|         merge_idx[x0][y0] | ae(v) |
|       } else{ | |
|         NA_merge_idx[x0][y0] | ae(v) |
|       } | |
|     } | |
|   } else { /* MODE_INTER*/ | |
|     merge_flag[x0][y0] | ae(v) |
|     if (merge_flag[x0][y0]){ | |
|       if (MaxNumMergeCand > 1){ | |
|         isAdjacentMergeflag | ae(v) |
|         if (isAdjcanetMergeflag){ | |
|           merge_idx[x0][y0] | ae(v) |
|         } else{ | |
|           NA_merge_idx[x0][y0] | ae(v) |
|         } | |
|       } | |
|     } | |
|   } | |
|   if( CuPredMode[ x0 ][ y0 ] != MODE_INTRA ) | |
|     cu_cbf | ae(v) |
|   if( cu_cbf ) { | |
|     transform_tree( x0, y0, cbWidth, cbHeight, treeType ) | |

Information for specifying any one among a plurality of merge candidates may be signaled through a bitstream. For example, information indicating an index of any one among the merge candidates included in the merge candidate list may be signaled through a bitstream.

When isAdjacentMergeflag is 1, syntax element merge_idx specifying any one among the adjacent merge candidates may be signaled. The maximum value of syntax element merge_idx may be set to a value obtained by subtracting 1 from the number of adjacent merge candidates.

When isAdjacentMergeflag is 0, syntax element NA_merge_idx specifying any one among the non-adjacent merge candidates may be signaled. The syntax element NA_merge_idx represents a value obtained by subtracting the number of adjacent merge candidates from the index of the non-adjacent merge candidate. The decoder may select a non-adjacent merge candidate by adding the number of adjacent merge candidates to an index specified by NA_merge_idx.

When the number of merge candidates included in the merge candidate list is smaller than a threshold value, the merge candidate included in the inter-region motion information list may be added to the merge candidate list. Here, the threshold value may be the maximum number of merge candidates that can be included in the merge candidate list or a value obtained by subtracting an offset from the maximum number of merge candidates. The offset may be a natural number such as 1, 2 or the like. The inter-region motion information list may include a merge candidate derived based on a block encoded/decoded before the current block.

The inter-region motion information list includes a merge candidate derived from a block encoded/decoded based on inter prediction in the current picture. For example, motion information of a merge candidate included in the inter-region motion information list may be set to be equal to motion information of a block encoded/decoded based on inter prediction. Here, the motion information may include at least one among a motion vector, a reference picture index, a prediction direction, and a bidirectional weight index.

For convenience of explanation, a merge candidate included in the inter-region motion information list will be referred to as an inter-region merge candidate.

The maximum number of merge candidates that can be included in the inter-region motion information list may be predefined by an encoder and a decoder. For example, the maximum number of merge candidates that can be included in the inter-region motion information list may be 1, 2, 3, 4, 5, 6, 7, 8 or more (e.g., 16).

Alternatively, information indicating the maximum number of merge candidates in the inter-region motion information list may be signaled through a bitstream. The information may be signaled at the sequence, picture, or slice level.

Alternatively, the maximum number of merge candidates of the inter-region motion information list may be determined according to the size of a picture, the size of a slice, or the size of a coding tree unit.

The inter-region motion information list may be initialized by the unit of picture, slice, tile, brick, coding tree unit, or coding tree unit line (row or column). For example, when a slice is initialized, the inter-region motion information list is also initialized, and the inter-region motion information list may not include any merge candidate.

Alternatively, information indicating whether or not to initialize the inter-region motion information list may be signaled through a bitstream. The information may be signaled at the slice, tile, brick, or block level. Until the information indicates to initialize the inter-region motion information list, a previously configured inter-region motion information list may be used.

Alternatively, information on the initial inter-region merge candidate may be signaled through a picture parameter set or a slice header. Although the slice is initialized, the inter-region motion information list may include the initial inter-region merge candidate. Accordingly, an inter-region merge candidate may be used for a block that is the first encoding/decoding target in the slice.

Blocks are encoded/decoded according to an encoding/decoding order, and blocks encoded/decoded based on inter prediction may be sequentially set as an inter-region merge candidate according to an encoding/decoding order.

Figure 17:
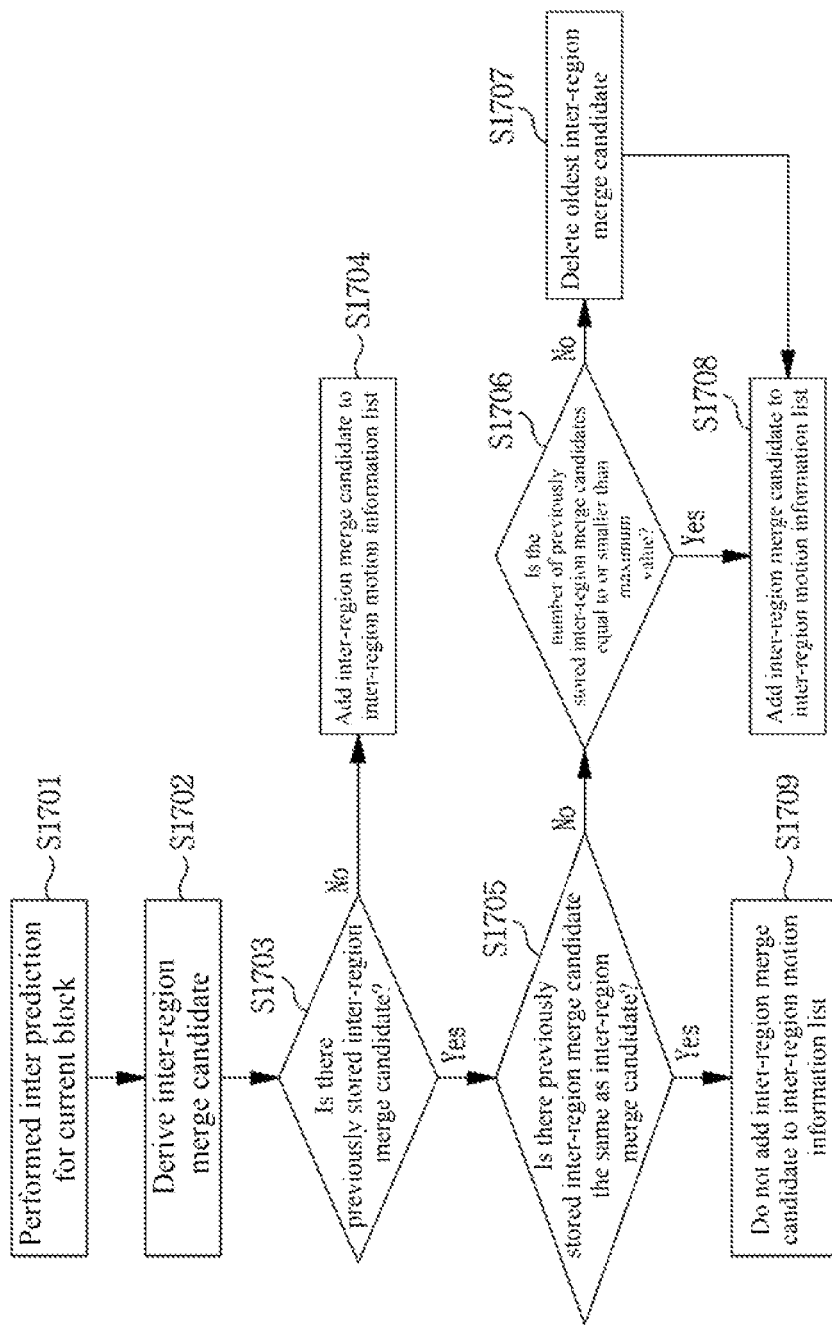
FIG. 17 is a flowchart illustrating a process of updating an inter-region motion information list.

FIG. 17 is a flowchart illustrating a process of updating an inter-region motion information list.

When inter prediction is performed on the current block (S1701), an inter-region merge candidate may be derived based on the current block (S1702). Motion information of the inter-region merge candidate may be set to be equal to the motion information of the current block.

When the inter-region motion information list is empty (S1703), the inter-region merge candidate derived based on the current block may be added to the inter-region motion information list (S1704).

When the inter-region motion information list already includes the inter-region merge candidate (S1703), a redundancy check may be performed on the motion information of the current block (or the inter-region merge candidate derived based on the current block) (S1705). The redundancy check is for determining whether motion information of an inter-region merge candidate previously stored in the inter-region motion information list and motion information of the current block are the same. The redundancy check may be performed on all inter-region merge candidates previously stored in the inter-region motion information list. Alternatively, the redundancy check may be performed on inter-region merge candidates having an index larger than or equal to a threshold value among inter-region merge candidates previously stored in the inter-region motion information list.

When an inter-region merge candidate having the same motion information as the motion information of the current block is not included, the inter-region merge candidate derived based on the current block may be added to the inter-region motion information list (S1708). Whether the inter-region merge candidates are the same may be determined based on whether motion information (e.g., a motion vector and/or a reference picture index) of the inter-region merge candidates is the same.

At this point, when the maximum number of inter-region merge candidates are already stored in the inter-region motion information list (S1706), the oldest inter-region merge candidate is deleted (S1707), and the inter-region merge candidate derived based on the current block may be added to the inter-region motion information list (S1708).

Each of the inter-region merge candidates may be identified by an index. When an inter-region merge candidate derived from the current block is added to the inter-region motion information list, the lowest index (e.g., 0) is assigned to the inter-region merge candidate, and indexes of previously stored inter-region merge candidates may be increased by 1. At this point, when the maximum number of inter-region merge candidates are already stored in the inter-region motion information list, an inter-region merge candidate having the largest index is removed.

Alternatively, when the inter-region merge candidate derived from the current block is added to the inter-region motion information list, the largest index may be assigned to the inter-region merge candidate. For example, when the number of inter-region merge candidates previously stored in the inter-region motion information list is smaller than a maximum value, an index having the same value as the number of previously stored inter-region merge candidates may be assigned to the inter-region merge candidate. Alternatively, when the number of inter-region merge candidates previously stored in the inter-region motion information list is the same as the maximum value, an index subtracting 1 from the maximum value may be assigned to the inter-region merge candidate. In addition, an inter-region merge candidate having the smallest index is removed, and indexes of remaining previously stored inter-region merge candidates may be decreased by 1.

Figure 18:
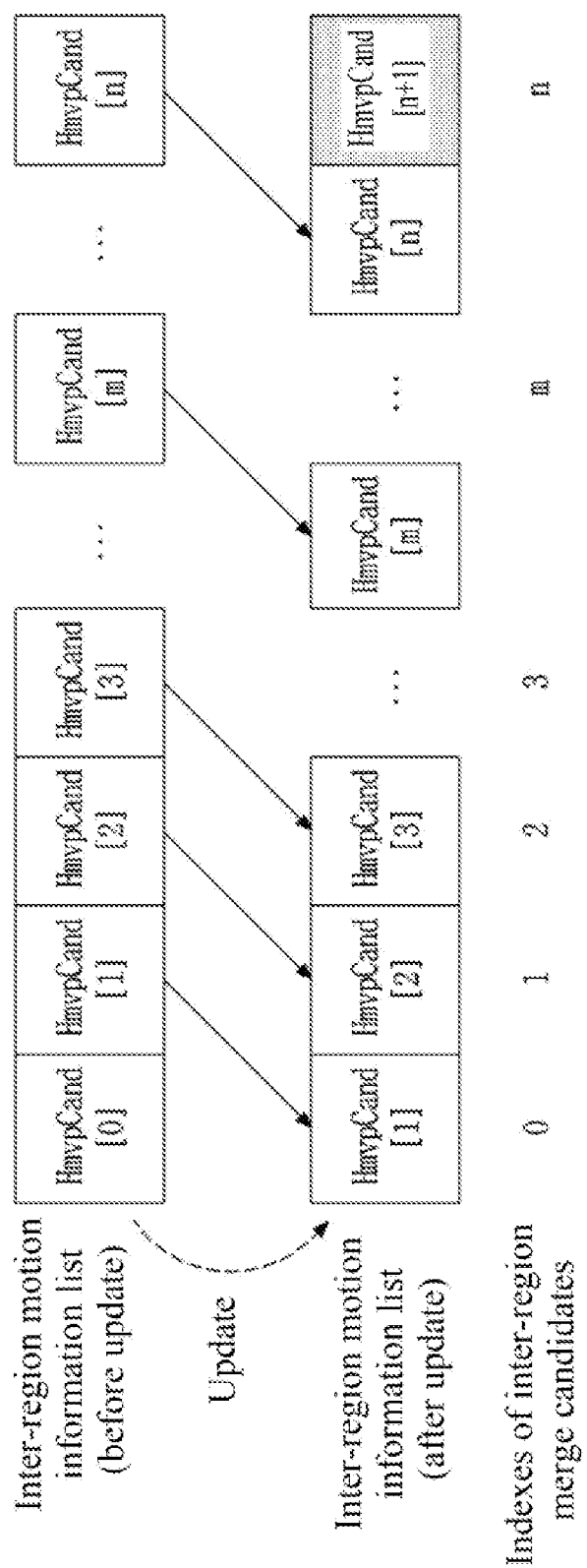
FIG. 18 is a view showing an embodiment of updating an inter-region merge candidate list.

FIG. 18 is a view showing an embodiment of updating an inter-region merge candidate list.

It is assumed that as the inter-region merge candidate derived from the current block is added to the inter-region merge candidate list, the largest index is assigned to the inter-region merge candidate. In addition, it is assumed that the maximum number of inter-region merge candidates are already stored in the inter-region merge candidate list.

When the inter-region merge candidate HmvpCand[n+1] derived from the current block is added to the inter-region merge candidate list HmvpCandList, the inter-region merge candidate HmvpCand[0] having the smallest index among the previously stored inter-region merge candidates is deleted, and the indexes of the remaining inter-region merge candidates may be decreased by 1. In addition, the index of the inter-region merge candidate HmvpCand[n+1] derived from the current block may be set to a maximum value (n in the example shown in FIG. 18).

When an inter-region merge candidate the same as the inter-region merge candidate derived based on the current block is previously stored (S1705), the inter-region merge candidate derived based on the current block may not be added to the inter-region motion information list (S1709).

Alternatively, as the inter-region merge candidate derived based on the current block is added to the inter-region motion information list, a previously stored inter-region merge candidate that is the same as the inter-region merge candidate may be removed. In this case, an effect the same as newly updating the index of the previously stored inter-region merge candidate is obtained.

Figure 19:
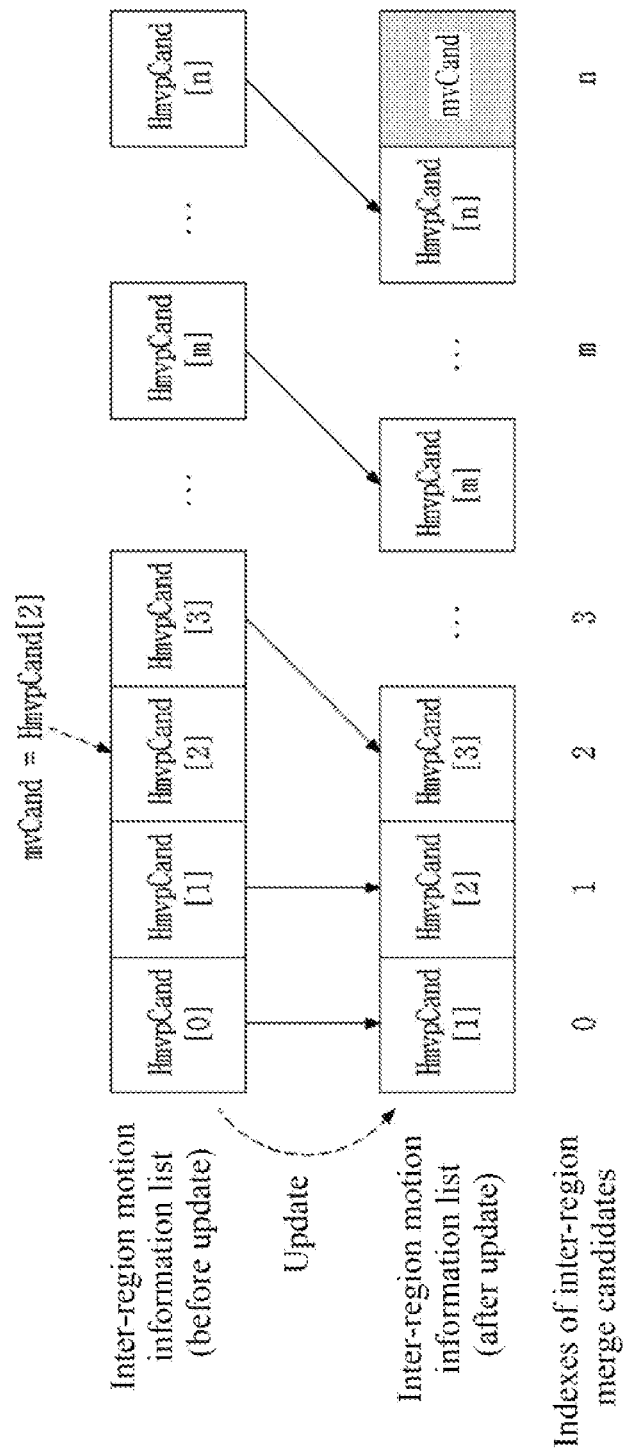
FIG. 19 is a view showing an example in which an index of a previously stored inter-region merge candidate is updated.

FIG. 19 is a view showing an example in which an index of a previously stored inter-region merge candidate is updated.

When the index of a previously stored inter-region merge candidate mvCand that is the same as the inter-region merge candidate mvCand derived based on the current block is hIdx, the previously stored inter-region merge candidate is deleted, and indexes of inter-region merge candidates having an index larger than hIdx may be decreased by 1. For example, in the example shown in FIG. 19, it is shown that HmvpCand[2] the same as mvCand is deleted from the inter-region motion information list HvmpCandList, and the indexes of HmvpCand[3] to HmvpCand[n] are decreased by 1.

In addition, the inter-region merge candidate mvCand derived based on the current block may be added to the end of the inter-region motion information list.

Alternatively, the index assigned to the previously stored inter-region merge candidate that is the same as the inter-region merge candidate derived based on the current block may be updated. For example, the index of the previously stored inter-region merge candidate may be changed to a minimum value or a maximum value.

It may be set not to add motion information of blocks included in a predetermined area to the inter-region motion information list. For example, an inter-region merge candidate derived based on motion information of a block included in the merge processing area may not be added to the inter-region motion information list. Since an encoding/decoding order is not defined for the blocks included in the merge processing area, it is inappropriate to use motion information of any one among the blocks for inter prediction of another block. Accordingly, inter-region merge candidates derived based on the blocks included in the merge processing area may not be added to the inter-region motion information list.

When motion compensation prediction is performed by the unit of subblock, an inter-region merge candidate may be derived based on motion information of a representative subblock among a plurality of subblocks included in the current block. For example, when a subblock merge candidate is used for the current block, an inter-region merge candidate may be derived based on motion information of a representative subblock among the subblocks.

Motion vectors of the subblocks may be derived in the following order. First, any one among the merge candidates included in the merge candidate list of the current block is selected, and an initial shift vector (shVector) may be derived based on the motion vector of the selected merge candidate. Then, a shifted subblock, in which the position of the reference sample is (xColSb, yColSb), may be derived as the initial shift vector is added at the position (xSb, ySb) of the reference sample (e.g., the top-left sample or the sample at the center) of each subblock in the coding block. Equation 4 shows an equation for deriving the shifted subblock.

$$(xColSb, yColSb) = (xSb + shVector[0] >> 4, ySb + shVector[1] >> 4) \quad \text{[Equation 4]}$$

Then, the motion vector of a collocated block corresponding to the center position of the subblock including (xColSb, yColSb) may be set as the motion vector of the subblock including (xSb, ySb).

The representative subblock may mean a subblock including the top-left sample or the sample at the center of the current block.

Figure 20:
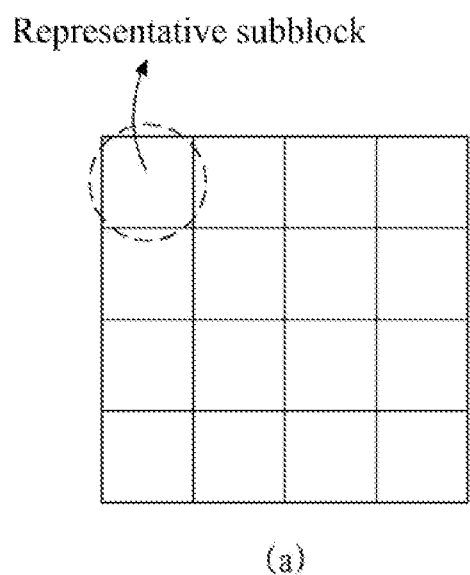
FIG. 20 is a view showing the position of a representative subblock.
Figure 20:
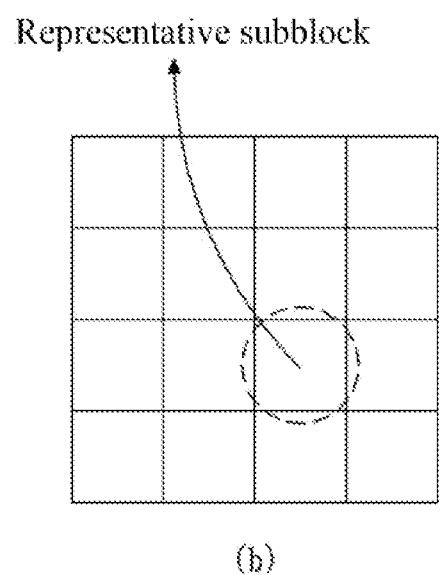

FIG. 20 is a view showing the position of a representative subblock.

FIG. 20 (a) shows an example in which the subblock positioned at the top-left of the current block is set as the representative subblock, and FIG. 20 (b) shows an example in which the subblock positioned at the center of the current block is set as the representative subblock. When motion compensation prediction is performed by unit of subblock, an inter-region merge candidate of the current block may be derived based on the motion vector of the subblock including the top-left sample of the current block or the subblock including the sample at the center of the current block.

It may be determined whether or not to use the current block as an inter-region merge candidate, based on the inter prediction mode of the current block. For example, a block encoded/decoded based on an affine motion model may be set to be unavailable as an inter-region merge candidate. Accordingly, although the current block is encoded/decoded by inter prediction, when the inter prediction mode of the current block is the affine prediction mode, the inter-region motion information list may not be updated based on the current block.

Alternatively, the inter-region merge candidate may be derived based on at least one subblock vector among the subblocks included in the block encoded/decoded based on the affine motion model. For example, the inter-region merge candidate may be derived using a subblock positioned at the top-left, a subblock positioned at the center, or a subblock positioned at the top-right side of the current block. Alternatively, an average value of subblock vectors of a plurality of subblocks may be set as the motion vector of the inter-region merge candidate.

Alternatively, the inter-region merge candidate may be derived based on an average value of affine seed vectors of the block encoded/decoded based on the affine motion model. For example, an average of at least one among the first affine seed vector, the second affine seed vector, and the third affine seed vector of the current block may be set as the motion vector of the inter-region merge candidate.

Alternatively, an inter-region motion information list may be configured for each inter prediction mode. For example, at least one among an inter-region motion information list for a block encoded/decoded by intra-block copy, an inter-region motion information list for a block encoded/decoded based on a translational motion model, and an inter-region motion information list for a block encoded/decoded based on an affine motion model may be defined. According to the inter prediction mode of the current block, any one among a plurality of inter-region motion information lists may be selected.

Figure 21:
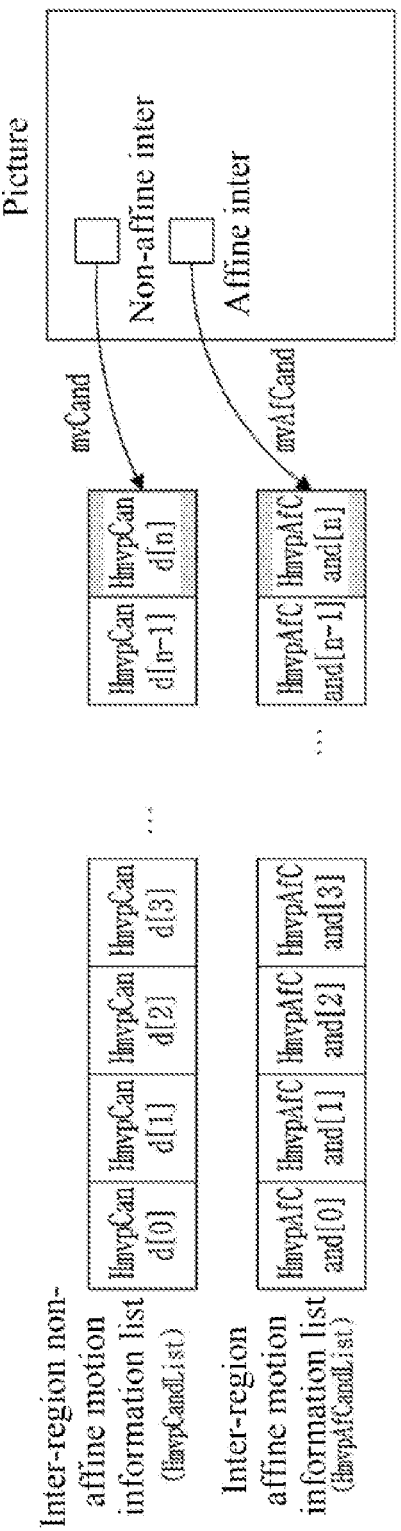
FIG. 21 is a view showing an example in which an inter-region motion information list is generated for each inter prediction mode.

FIG. 21 is a view showing an example in which an inter-region motion information list is generated for each inter prediction mode.

When a block is encoded/decoded based on a non-affine motion model, an inter-region merge candidate mvCand derived based on the block may be added to an inter-region non-affine motion information list HmvpCandList. Contrarily, when a block is encoded/decoded based on an affine motion model, an inter-region merge candidate mvAfCand derived based on the block may be added to an inter-region affine motion information list HmvpAfCandList.

Affine seed vectors of a block encoded/decoded based on the affine motion model may be stored in an inter-region merge candidate derived from the block. Accordingly, the inter-region merge candidate may be used as a merge candidate for deriving the affine seed vector of the current block.

In addition to the inter-region motion information list described above, an additional inter-region motion information list may be defined. In addition to the inter-region motion information list described above (hereinafter, referred to as a first inter-region motion information list), a long-term motion information list (hereinafter, referred to as a second inter-region motion information list) may be defined. Here, the long-term motion information list includes long-term merge candidates.

When both the first inter-region motion information list and the second inter-region motion information list are empty, first, an inter-region merge candidate may be added to the second inter-region motion information list. Only after the number of available inter-region merge candidates reaches the maximum number in the second inter-region motion information list, an inter-region merge candidate may be added to the first inter-region motion information list.

Alternatively, one inter-region merge candidate may be added to both the second inter-region motion information list and the first inter-region motion information list.

At this point, the second inter-region motion information list, the configuration of which has been completed, may not be updated any more. Alternatively, when the decoded region is greater than or equal to a predetermined ratio of the slice, the second inter-region motion information list may be updated. Alternatively, the second inter-region motion information list may be updated for every N coding tree unit lines.

Contrarily, the first inter-region motion information list may be updated whenever a block encoded/decoded by inter prediction is generated. However, it may be set not to use the inter-region merge candidate added to the second inter-region motion information list, to update the first inter-region motion information list.

Information for selecting any one among the first inter-region motion information list and the second inter-region motion information list may be signaled through a bitstream. When the number of merge candidates included in the merge candidate list is smaller than a threshold value, merge candidates included in the inter-region motion information list indicated by the information may be added to the merge candidate list.

Alternatively, an inter-region motion information list may be selected based on the size and shape of the current block, inter prediction mode, whether bidirectional prediction is enabled, whether motion vector refinement is enabled, or whether triangular partitioning is enabled.

Alternatively, although an inter-region merge candidate included in the first inter-region motion information list is added, when the number of merge candidates included in the merge candidate list is smaller than the maximum number of merges, the inter-region merge candidates included in the second inter-region motion information list may be added to the merge candidate list.

Figure 22:
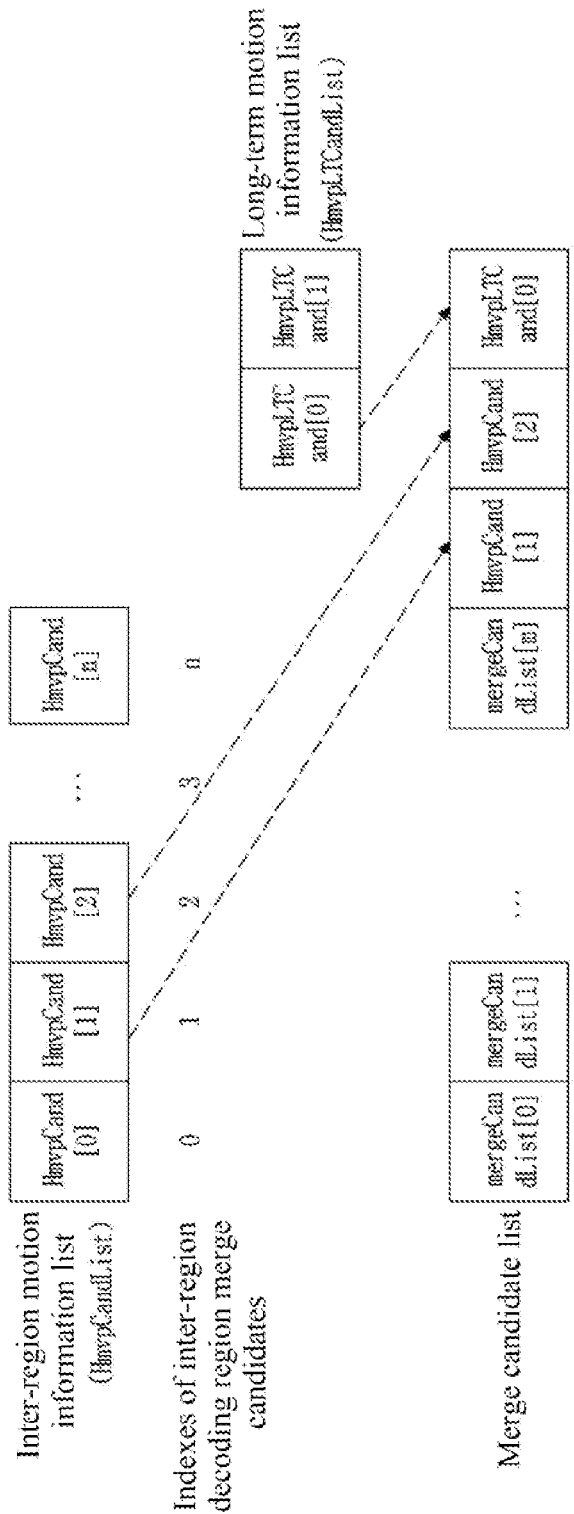
FIG. 22 is a view showing an example in which an inter-region merge candidate included in a long-term motion information list is added to a merge candidate list.

FIG. 22 is a view showing an example in which an inter-region merge candidate included in a long-term motion information list is added to a merge candidate list.

When the number of merge candidates included in the merge candidate list is smaller than the maximum number, the inter-region merge candidates included in the first inter-region motion information list HmvpCandList may be added to the merge candidate list. When the number of merge candidates included in the merge candidate list is smaller than the maximum number although the inter-region merge candidates included in the first inter-region motion information list are added to the merge candidate list, inter-region merge candidates included in the long-term motion information list HmvpLTCandList may be added to the merge candidate list.

Table 2 shows a process of adding inter-region merge candidates included in the long-term motion information list to the merge candidate list.

TABLE 2

For each candidate in HMVPCandList with index HMVPLTIdx = 1 .. numHMVPLTCand, the following ordered steps are repeated until combStop is equal to true
  sameMotion is set to FALSE
  If hmvpStop is equal to FALSE and numCurrMergecand is less than (MaxNumMergeCand-1), hmvpLT is set to TRUE
    If HMVPLTCandList[NumLTHmvp-HMVPLTIdx] have the same motion vectors and the same reference indices with any mergeCandList[i] with I being 0.. numOrigMergeCand-1 and HasBeenPruned[i] equal to false, sameMotion is set to true TABLE 2-continued If sameMotion is equal to false,
mergeCandList[numCurrMergeCand++] is set to
HMVPLTCandList[NumLTHmvp-HMVPLTIdx]
 If numCurrMergeCand is equal to (MaxNumMergeCand-1),
hmvpLTStop is set to TRUE The inter-region merge candidate may be set to include additional information, in addition to motion information. For example, for the inter-region merge candidate, a size, a shape, or partition information of a block may be additionally stored. When the merge candidate list of the current block is constructed, only inter-region merge candidates having a size, a shape, or partition information the same as or similar to those of the current block are used among the inter-region merge candidates, or inter-region merge candidates having a size, a shape, or partition information the same as or similar to those of the current block may be added to the merge candidate list in the first place.

Alternatively, an inter-region motion information list may be generated for each of the size, shape, or partition information of a block. Among the plurality of inter-region motion information lists, a merge candidate list of the current block may be generated by using an inter-region motion information list corresponding to the shape, size, or partition information of the current block.

When the number of merge candidates included in the merge candidate list of the current block is smaller than the threshold value, the inter-region merge candidates included in the inter-region motion information list may be added to the merge candidate list. The addition process is performed in an ascending or descending order based on the index. For example, an inter-region merge candidate having the largest index may be first added to the merge candidate list.

When it is desired to add an inter-region merge candidate included in the inter-region motion information list to the merge candidate list, a redundancy check may be performed between the inter-region merge candidate and the merge candidates previously stored in the merge candidate list.

For example, Table 3 shows a process in which an inter-region merge candidate is added to the merge candidate list.

TABLE 3

For each candidate in HMVPCandList with index HMVPIdx = 1..
numCheckedHMVPCand, the following ordered steps are repeated
until combStop is equal to true
 sameMotion is set to false
 If HMVPCandList[NumHmvp-HMVPIdx] have the same motion
vectors and the same reference indices with any mergeCandList[i] with
I being 0.. numOrigMergeCand-1 and HasBeenPruned[i] equal to false,
sameMotion is set to true
 If sameMotion is equal to false,
mergeCandList[numCurrMergeCand++] is set to
HMVPCandList[NumHmvp-HMVPIdx]
 If numCurrMergeCand is equal to (MaxNumMergeCand-1),
hmvpStop is set to TRUE The redundancy check may be performed only on some of the inter-region merge candidates included in the inter-region motion information list. For example, the redundancy check may be performed only on inter-region merge candidates having an index larger than a threshold value or smaller than a threshold value. Alternatively, the redundancy check may be performed only on N merge candidates having the largest index or N merge candidates having the smallest index.

Alternatively, the redundancy check may be performed only on some of the merge candidates previously stored in the merge candidate list. For example, the redundancy check may be performed only on a merge candidate having an index larger than a threshold value or smaller than a threshold value, or on a merge candidate derived from a block at a specific position. Here, the specific position may include at least one among a left neighboring block, a top neighboring block, a top-right neighboring block, and a bottom-left neighboring block of the current block.

Figure 23:
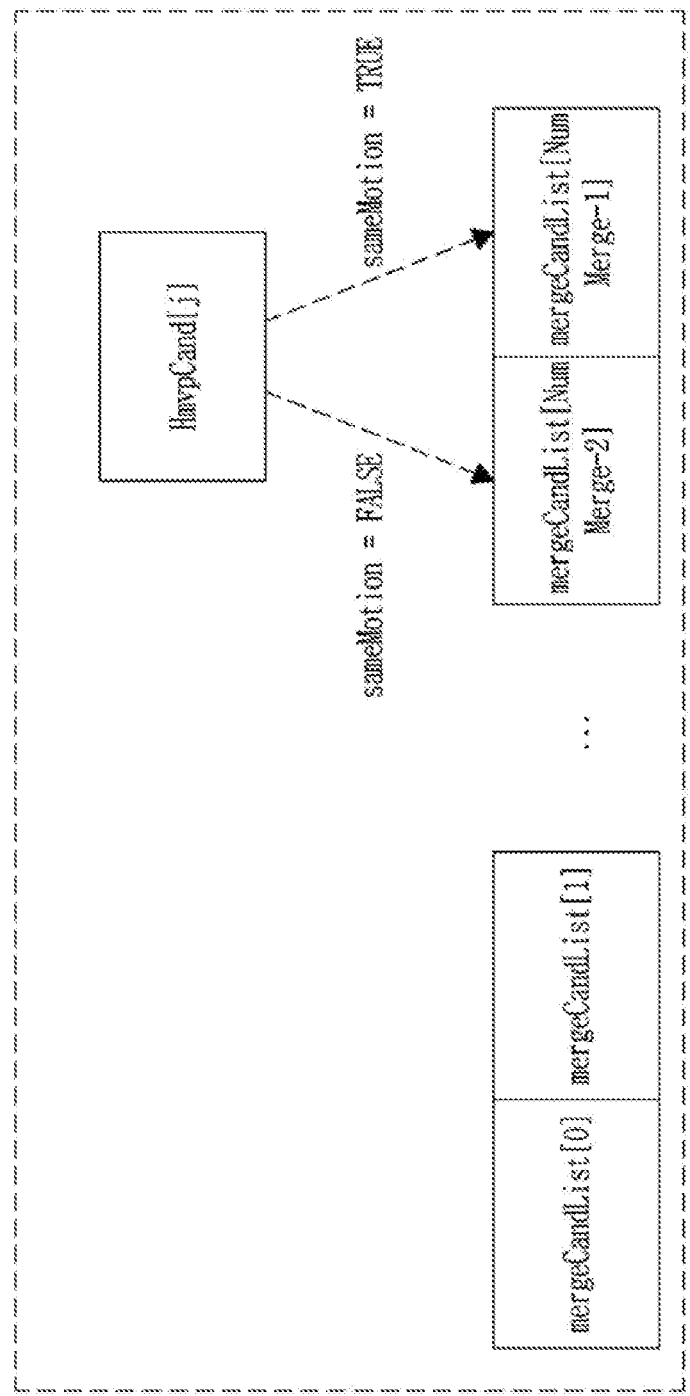
FIG. 23 is a view showing an example in which a redundancy check is performed only on some of merge candidates.

FIG. 23 is a view showing an example in which a redundancy check is performed only on some of merge candidates.

When it is desired to add the inter-region merge candidate HmvpCand[j] to the merge candidate list, a redundancy check may be performed on the inter-region merge candidate with two merge candidates mergeCandList[NumMerge-2] and mergeCandList[NumMerge-1] having the largest indexes. Here, NumMerge may represent the number of spatial merge candidates and temporal merge candidates that are available.

Unlike the example shown in the drawing, when it is desired to add an inter-region merge candidate HmvpCand [j] to the merge candidate list, a redundancy check may be performed on the inter-region merge candidate with up to two merge candidates having the smallest index. For example, it is possible to check whether mergeCandList[0] and mergeCandList[1] are the same as HmvpCand[j]. Alternatively, a redundancy check may be performed only on merge candidates derived at a specific position. For example, the redundancy check may be performed on at least one among a merge candidate derived from a neighboring block positioned on the left side of the current block and a merge candidate derived from a neighboring block positioned on the top the current block. When a merge candidate derived at a specific position does not exist in the merge candidate list, an inter-region merge candidate may be added to the merge candidate list without having a redundancy check.

When a merge candidate the same as the first inter-region merge candidate is found and a redundancy check is performed on the second inter-region merge candidate, the redundancy check with the merge candidate the same as the first inter-region merge candidate may be omitted.

Figure 24:
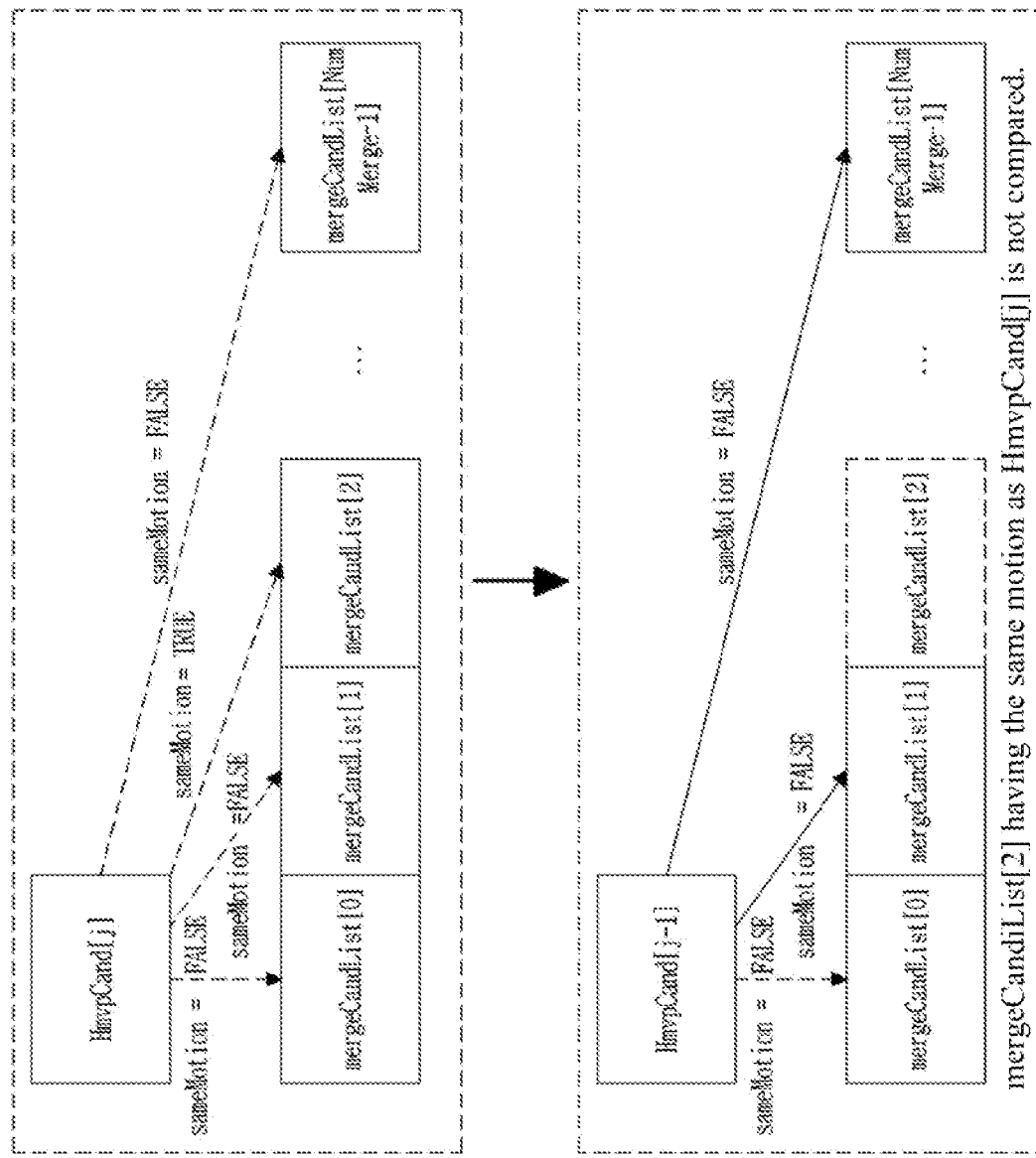
FIG. 24 is a view showing an example in which a redundancy check is omitted for a specific merge candidate.

FIG. 24 is a view showing an example in which a redundancy check is omitted for a specific merge candidate.

When it is desired to add an inter-region merge candidate HmvpCand[i] having index i to the merge candidate list, a redundancy check is performed between the inter-region merge candidate and merge candidates previously stored in the merge candidate list. At this point, when a merge candidate mergeCandList[j] the same as the inter-region merge candidate HmvpCand[i] is found, the redundancy check may be performed between the inter-region merge candidate HmvpCand[i−1] having index i−1 and the merge candidates without adding the inter-region merge candidate HmvpCand[i] to the merge candidate list. At this point, the redundancy check between the inter-region merge candidate HmvpCand[i−1] and the merge candidate mergeCandList[j] may be omitted.

For example, in the example shown in FIG. 24, it is determined that HmvpCand[i] and mergeCandList[2] are the same. Accordingly, HmvpCand[i] is not added to the merge candidate list, and a redundancy check may be performed on HmvpCand[i−1]. At this point, the redundancy check between HvmpCand[i−1] and mergeCandList[2] may be omitted.

When the number of merge candidates included in the merge candidate list of the current block is smaller than the threshold value, at least one among a pairwise merge candidate and a zero-merge candidate may be further included, in addition to the inter-region merge candidate. The pairwise merge candidate means a merge candidate having an average value of motion vectors of two or more merge candidates as a motion vector, and the zero-merge candidate means a merge candidate having a motion vector of 0.

A merge candidate may be added to the merge candidate list of the current block in the following order.

Spatial merge candidate—Temporal merge candidate—Inter-region merge candidate—(Inter-region affine merge candidate)—Pairwise merge candidate—Zero-merge candidate The spatial merge candidate means a merge candidate derived from at least one among a neighboring block and a non-neighboring block, and the temporal merge candidate means a merge candidate derived from a previous reference picture. The inter-region affine merge candidate represents an inter-region merge candidate derived from a block encoded/decoded with an affine motion model.

The inter-region motion information list may also be used in the motion vector prediction mode. For example, when the number of motion vector prediction candidates included in a motion vector prediction candidate list of the current block is smaller than a threshold value, an inter-region merge candidate included in the inter-region motion information list may be set as a motion vector prediction candidate for the current block. Specifically, the motion vector of the inter-region merge candidate may be set as a motion vector prediction candidate.

When any one among the motion vector prediction candidates included in the motion vector prediction candidate list of the current block is selected, the selected candidate may be set as the motion vector predictor of the current block. Thereafter, after a motion vector residual coefficient of the current block is decoded, a motion vector of the current block may be obtained by adding the motion vector predictor and the motion vector residual coefficient.

The motion vector prediction candidate list of the current block may be configured in the following order.

Spatial motion vector prediction candidate—Temporal motion vector prediction candidate—Inter-region merge candidate—(Inter-region affine merge candidate)—Zero-motion vector prediction candidate The spatial motion vector prediction candidate means a motion vector prediction candidate derived from at least one among a neighboring block and a non-neighboring block, and the temporal motion vector prediction candidate means a motion vector prediction candidate derived from a previous reference picture. The inter-region affine merge candidate represents an inter-region motion vector prediction candidate derived from a block encoded/decoded with the affine motion model. The zero-motion vector prediction candidate represents a candidate having a motion vector value of 0.

A merge processing area having a size greater than that of a coding block may be defined. Coding blocks included in the merge processing area are not sequentially encoded/decoded, and may be processed in parallel. Here, that coding blocks are not sequentially encoded/decoded means that an encoding/decoding order is not defined. Accordingly, a process of encoding/decoding the blocks included in the merge processing area may be independently processed. Alternatively, the blocks included in the merge processing area may share merge candidates. Here, the merge candidates may be derived based on the merge processing area.

According to the characteristics described above, the merge processing area may also be referred to as a parallel processing area, a shared merge area (SMR), or a merge estimation area (MER).

The merge candidate of the current block may be derived based on the coding block. However, when the current block is included in a merge processing area of a size greater than the current block, a candidate block included in the merge processing area the same as the current block may be set to be unavailable as a merge candidate.

Figure 25:
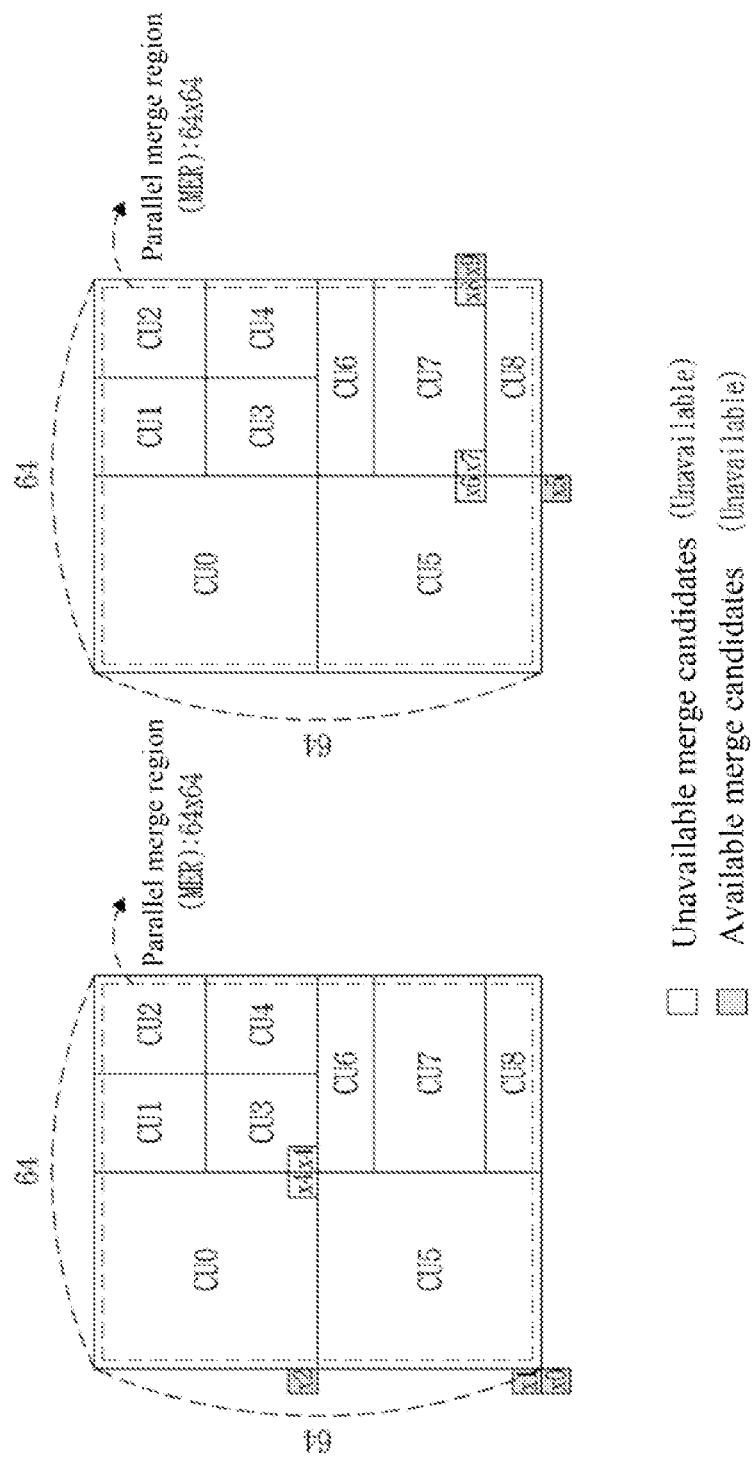
FIG. 25 is a view showing an example in which candidate blocks included in the same merge processing area as the current block are set to be unavailable as a merge candidate.

FIG. 25 is a view showing an example in which candidate blocks included in the same merge processing area as the current block are set to be unavailable as a merge candidate.

In the example shown in FIG. 25 (a), when CU5 is encoded/decoded, blocks including reference samples adjacent to CU5 may be set as candidate blocks. At this point, candidate blocks X3 and X4 included in the merge processing area the same as CU5 may be set to be unavailable as a merge candidate of CU5. Contrarily, candidate blocks X0, X1 and X2 that are not included in the merge processing area the same as CU5 may be set to be available as a merge candidate.

In the example shown in FIG. 25 (b), when CU8 is encoded/decoded, blocks including reference samples adjacent to CU8 may be set as candidate blocks. At this point, candidate blocks X6, X7 and X8 included in the merge processing area the same as CU8 may be set to be unavailable as a merge candidate. Contrarily, candidate blocks X5 and X9 that are not included in the merge processing area the same as CU8 may be set to be available as a merge candidate.

The merge processing area may be a square or non-square shape. Information for determining the merge processing area may be signaled through a bitstream. The information may include at least one among information indicating the shape of the merge processing area and information indicating the size of the merge processing area. When the merge processing area is a non-square shape, at least one among information indicating the size of the merge processing area, information indicating the width and/or height of the merge processing area, and information indicating a ratio of width to height of the merge processing area may be signaled through a bitstream.

The size of the merge processing area may be determined based on at least one among information signaled through a bitstream, a picture resolution, a slice size, and a tile size.

When motion compensation prediction is performed on a block included in the merge processing area, an inter-region merge candidate derived based on motion information of the block on which motion compensation prediction has been performed may be added to the inter-region motion information list.

However, in the case where an inter-region merge candidate derived from a block included in the merge processing area is added to the inter-region motion information list, when another block in the merge processing area, which actually is encoded/decoded after the block is encoded/decoded, is encoded/decoded, there may be a case of using an inter-region merge candidate derived from the block. That is, although dependency among blocks should be excluded when the blocks included in the merge processing area are encoded/decoded, there may be a case a case of performing motion prediction compensation using motion information of another block included in the merge processing area. In order to solve the problem, although encoding/decoding of a block included in the merge processing area is completed, motion information of the encoded/decoded block may not be added to the inter-region motion information list.

Alternatively, when motion compensation prediction is performed on the blocks included in the merge processing area, inter-region merge candidates derived from the blocks may be added to the inter-region motion information list in a predefined order. Here, the predefined order may be determined according to the scan order of the coding blocks in the merge processing area or the coding tree unit. The scan order may be at least one among the raster scan, horizontal scan, vertical scan, and zigzag scan. Alternatively, the predefined order may be determined based on motion information of each block or the number of blocks having the same motion information.

Alternatively, an inter-region merge candidate including unidirectional motion information may be added to the inter-region merge list before an inter-region merge candidate including bidirectional motion information. Contrarily, an inter-region merge candidate including bidirectional motion information may be added to the inter-region merge candidate list before an inter-region merge candidate including unidirectional motion information.

Alternatively, an inter-region merge candidate may be added to the inter-region motion information list according to an order of a high use frequency or a low use frequency within the merge processing area or the coding tree unit.

When the current block is included in the merge processing area and the number of merge candidates included in the merge candidate list of the current block is smaller than the maximum number, inter-region merge candidates included in the inter-region motion information list may be added to the merge candidate list. At this point, it may be set not to add an inter-region merge candidate derived from a block included in a merge processing area the same as the current block to the merge candidate list of the current block.

Alternatively, when the current block is included in the merge processing area, it may be set not to use the inter-region merge candidates included in the inter-region motion information list. That is, although the number of merge candidates included in the merge candidate list of the current block is smaller than the maximum number, the inter-region merge candidates included in the inter-region motion information list may not be added to the merge candidate list.

An inter-region motion information list for a merge processing area or a coding tree unit may be configured. This inter-region motion information list performs a function of temporarily storing motion information of blocks included in the merge processing area. In order to distinguish a general inter-region motion information list from the inter-region motion information list for a merge processing area or a coding tree unit, the inter-region motion information list for a merge processing area or a coding tree unit is referred to as a temporary motion information list. In addition, an inter-region merge candidate stored in the temporary motion information list will be referred to as a temporary merge candidate.

Figure 26:
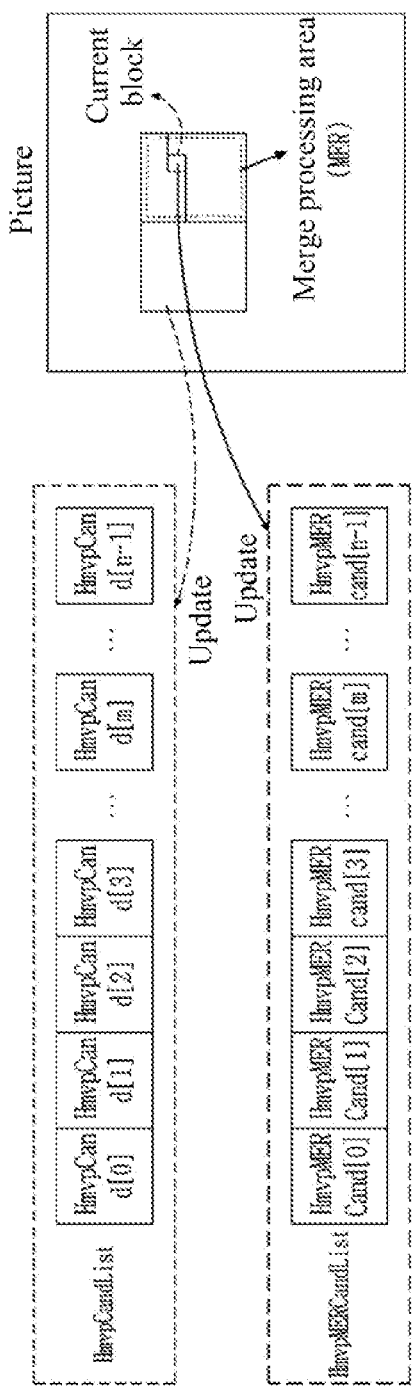
FIG. 26 is a view showing a temporary motion information list.

FIG. 26 is a view showing a temporary motion information list.

A temporary motion information list for a coding tree unit or a merge processing area may be configured. When motion compensation prediction has been performed on the current block included in the coding tree unit or the merge processing area, motion information of the block may not be added to the inter-region motion information list HmvpCandList. Instead, a temporary merge candidate derived from the block may be added to the temporary motion information list HmvpMERCandList. That is, the temporary merge candidate added to the temporary motion information list may not be added to the inter-region motion information list. Accordingly, the inter-region motion information list may not include inter-region merge candidates derived based on motion information of the blocks included in the coding tree unit or the merge processing area.

The maximum number of merge candidates that the temporary motion information list may include may be set to be the same as that of the inter-region motion information list. Alternatively, the maximum number of merge candidates that the temporary motion information list may include may be determined according to the size of the coding tree unit or the merge processing area.

The current block included in the coding tree unit or the merge processing area may be set not to use the temporary motion information list for a corresponding coding tree unit or a corresponding merge processing area. That is, when the number of merge candidates included in the merge candidate list of the current block is smaller than a threshold value, the inter-region merge candidates included in the inter-region motion information list are added to the merge candidate list, and the temporary merge candidates included in the temporary motion information list may not be added to the merge candidate list. Accordingly, motion information of other blocks included in the coding tree unit or the merge processing area the same as the current block may not be used for motion compensation prediction of the current block.

When encoding/decoding of all the blocks included in the coding tree unit or the merge processing area is completed, the inter-region motion information list and the temporary motion information list may be merged.

Figure 27:
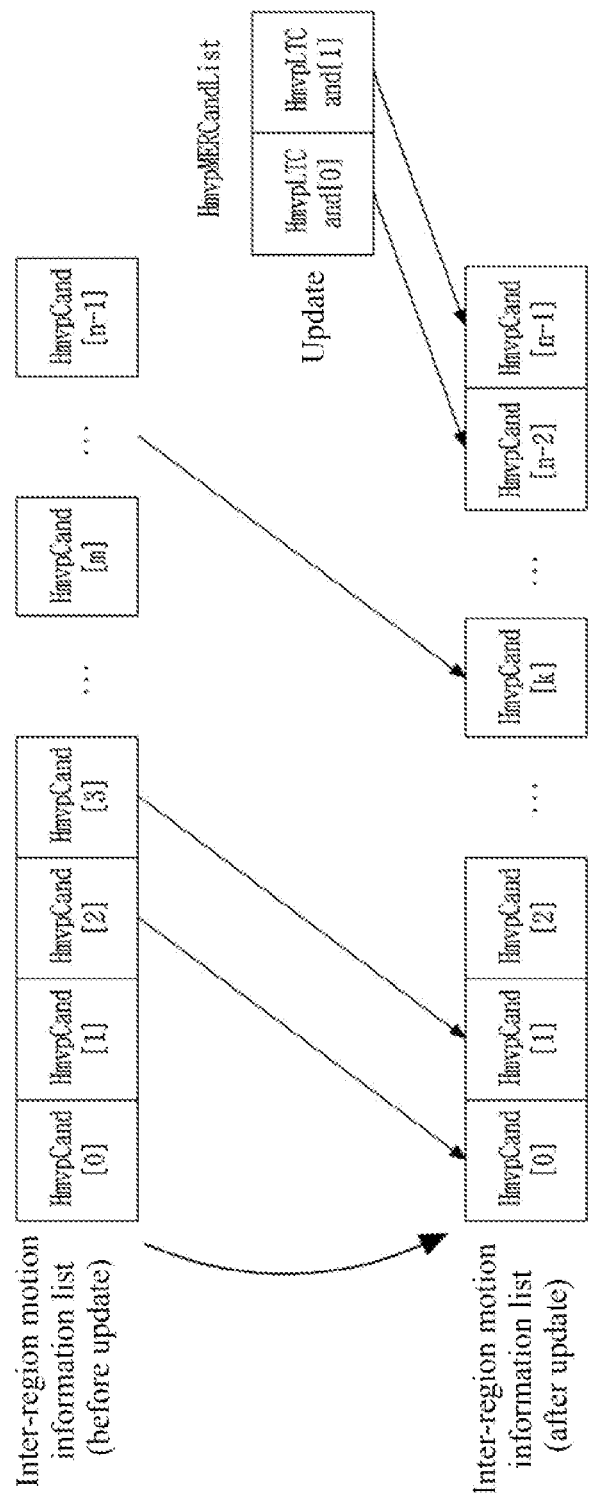
FIG. 27 is a view showing an example of merging an inter-region motion information list and a temporary motion information list.

FIG. 27 is a view showing an example of merging an inter-region motion information list and a temporary motion information list.

When coding/decoding of all the blocks included in the coding tree unit or the merge processing area is completed, as shown in the example of FIG. 27, the inter-region motion information list may be updated with the temporary merge candidates included in the temporary motion information list.

At this point, the temporary merge candidates included in the temporary motion information list may be added to the inter-region motion information list in order of the temporary merge candidates inserted in the temporary motion information list (i.e., in ascending or descending order of index values).

As another example, the temporary merge candidates included in the temporary motion information list may be added to the inter-region motion information list in a predefined order.

Here, the predefined order may be determined according to the scan order of the coding blocks in the merge processing area or the coding tree unit. The scan order may be at least one among the raster scan, horizontal scan, vertical scan, and zigzag scan. Alternatively, the predefined order may be determined based on motion information of each block or the number of blocks having the same motion information.

Alternatively, a temporary merge candidate including unidirectional motion information may be added to the inter-region merge list before a temporary merge candidate including bidirectional motion information. Contrarily, a temporary merge candidate including bidirectional motion information may be added to the inter-region merge candidate list before a temporary merge candidate including unidirectional motion information.

Alternatively, a temporary merge candidate may be added to the inter-region motion information list according to an order of a high use frequency or a low use frequency within the merge processing area or the coding tree unit.

When a temporary merge candidate included in the temporary motion information list is added to the inter-region motion information list, a redundancy check may be performed on the temporary merge candidate. For example, when an inter-region merge candidate the same as the temporary merge candidate included in the temporary motion information list is previously stored in the inter-region motion information list, the temporary merge candidate may not be added to the inter-region motion information list. At this point, a redundancy check may be performed on some of the inter-region merge candidates included in the inter-region motion information list. For example, the redundancy check may be performed on inter-region merge candidates having an index larger than a threshold value or smaller than a threshold value. For example, when the temporary merge candidate is the same as an inter-region merge candidate having an index larger than or equal to a predefined value, the temporary merge candidate may not be added to the inter-region motion information list.

Intra prediction is for predicting a current block using reconstructed samples that have been encoded/decoded in the neighborhood of the current block. At this point, samples reconstructed before an in-loop filter is applied may be used for intra prediction of the current block.

The intra prediction technique includes matrix-based intra prediction, and general intra prediction considering directionality with respect to neighboring reconstructed samples. Information indicating the intra prediction technique of the current block may be signaled through a bitstream. The information may be a 1-bit flag. Alternatively, the intra prediction technique of the current block may be determined based on at least one among the location, the size, and the shape of the current block, or based on an intra prediction technique of a neighboring block. For example, when the current block exists across a picture boundary, it may be set not to apply the matrix-based intra prediction intra prediction to the current block.

The matrix-based intra prediction intra prediction is a method of acquiring a prediction block of the current block by an encoder and a decoder based on a matrix product between a previously stored matrix and reconstructed samples in the neighborhood of the current block. Information for specifying any one among a plurality of previously stored matrixes may be signaled through a bitstream. The decoder may determine a matrix for intra prediction of the current block based on the information and the size of the current block.

The general intra prediction is a method of acquiring a prediction block for the current block based on a non-angular intra prediction mode or an angular intra prediction mode. Hereinafter, a process of performing intra prediction based on general intra prediction will be described in more detail with reference to the drawings.

Figure 28:
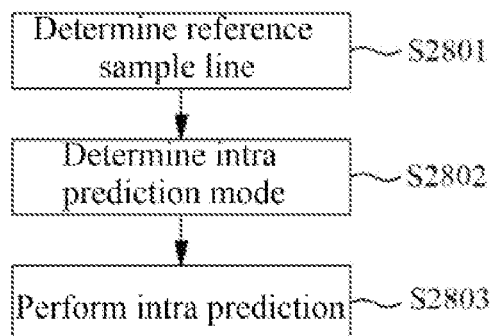
FIG. 28 is a flowchart illustrating an intra prediction method according to an embodiment of the present disclosure.

FIG. 28 is a flowchart illustrating an intra prediction method according to an embodiment of the present disclosure.

A reference sample line of the current block may be determined (S2801). The reference sample line means a set of reference samples included in a k-th line apart from the top and/or the left side of the current block. The reference samples may be derived from reconstructed samples that have been encoded/decoded in the neighborhood of the current block.

Index information for identifying the reference sample line of the current block among a plurality of reference sample lines may be signaled through a bitstream. The plurality of reference sample lines may include at least one among a first line, a second line, a third line, and a fourth line on the top and/or left side of the current block. Table 4 shows indexes assigned to the reference sample lines, respectively. In Table 4, it is assumed that the first line, the second line, and the fourth line are used as reference sample line candidates.

TABLE 4

| Index | Reference sample lines |
|---|---|
| 0 | First reference sample line |
| 1 | Second reference sample line |
| 2 | Fourth reference sample line |

The reference sample line of the current block may be determined based on at least one among the location, the size, and the shape of the current block, or based on a prediction encoding mode of a neighboring block. For example, when the current block is in contact with the boundary of a picture, a tile, a slice, or a coding tree unit, the first reference sample line may be determined as the reference sample line of the current block.

The reference sample line may include top reference samples positioned on the top of the current block and left reference samples positioned on the left side of the current block. The top reference samples and the left reference samples may be derived from reconstructed samples in the neighborhood of the current block. The reconstructed samples may be in a state before the in-loop filter is applied.

Figure 29:
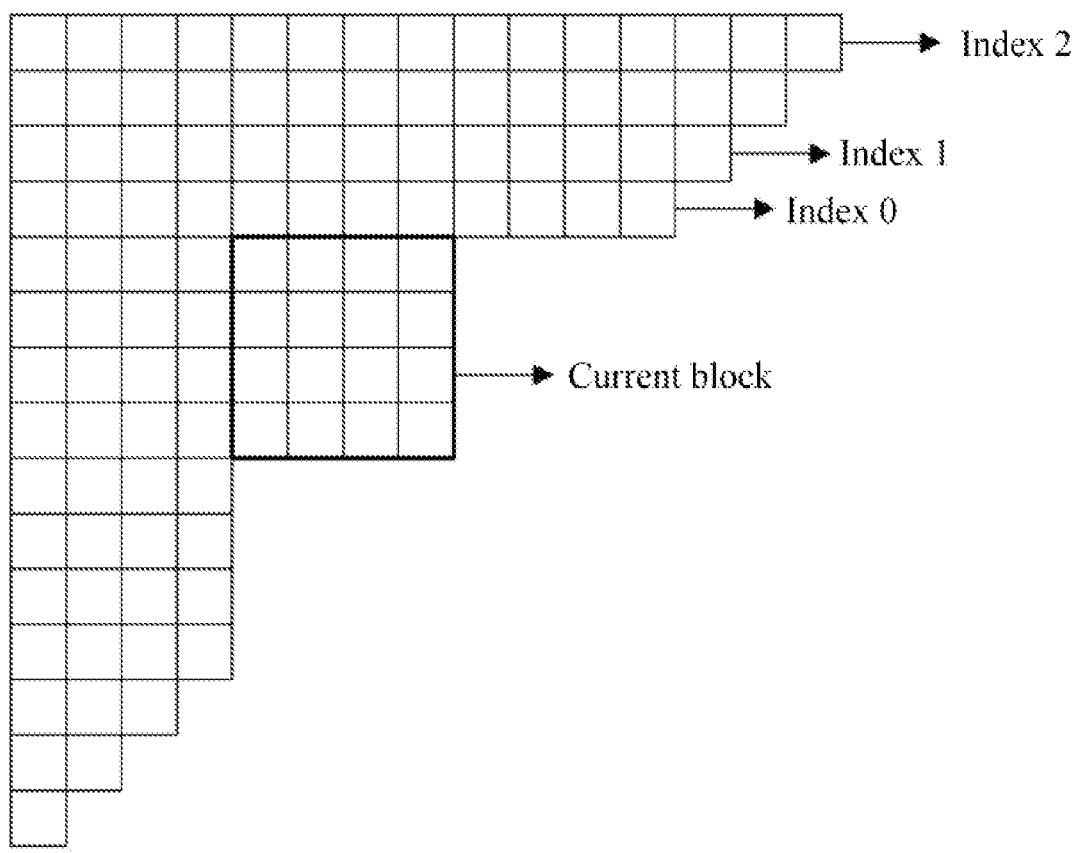
FIG. 29 is a view showing reference samples included in each reference sample line.

FIG. 29 is a view showing reference samples included in each reference sample line.

According to the intra prediction mode of the current block, a prediction sample may be acquired by using at least one among reference samples belonging to a reference sample line.

Next, the intra prediction mode of the current block may be determined (S2802). As for the intra prediction mode of the current block, at least one among a non-angular intra prediction mode and an angular intra prediction mode may be determined as the intra prediction mode of the current block. The non-angular intra prediction mode includes a planar mode and a DC mode, and the angular intra prediction mode includes 33 or 65 modes between the bottom-left diagonal direction and the top-right diagonal direction.

Figure 30:
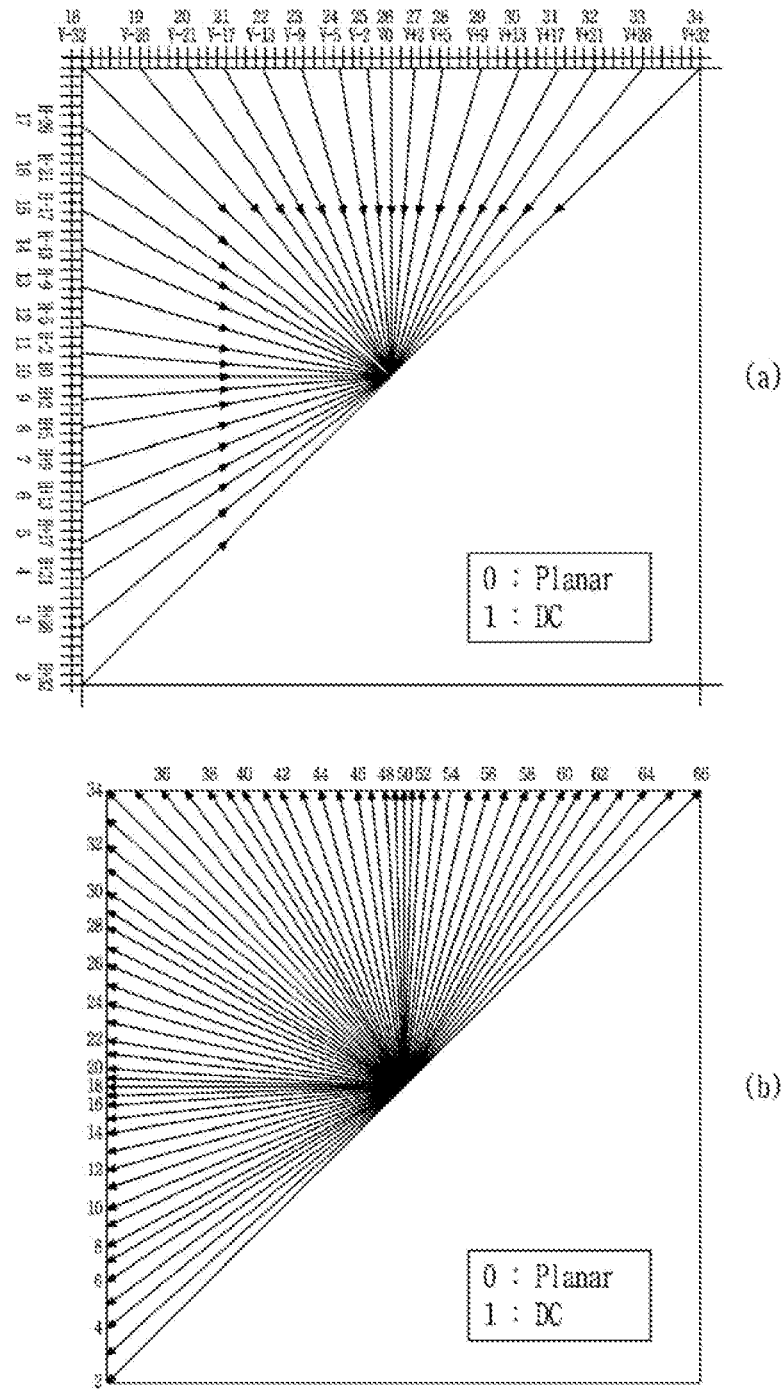
FIG. 30 is a view showing intra prediction modes.

FIG. 30 is a view showing intra prediction modes.

FIG. 30 (a) shows 35 intra prediction modes, and FIG. 30 (b) shows 67 intra prediction modes.

A larger or smaller number of intra prediction modes than those shown in FIG. 30 may be defined.

A Most Probable Mode (MPM) may be set based on the intra prediction mode of a neighboring block adjacent to the current block. Here, the neighboring block may include a left neighboring block adjacent to the left side of the current block and a top neighboring block adjacent to the top of the current block. When the coordinates of the top-left sample of the current block are (0, 0), the left neighboring block may include a sample at the position of (−1, 0), (−1, H−1) or (−1, (H−1)/2). Here, H denotes the height of the current block. The top neighboring block may include a sample at the position of (0, −1), (W−1, −1) or ((W−1)/2, −1). Here, W denotes the width of the current block.

When the neighboring block is encoded by normal intra prediction, the MPM may be derived based on the intra prediction mode of the neighboring block. Specifically, the intra prediction mode of the left neighboring block may be set to variable candIntraPredModeA, and the intra prediction mode of the top neighboring block may be set to variable candIntraPredModeB.

At this point, when the neighboring block is unavailable (e.g., when the neighboring block is not yet encoded/decoded or when the position of the neighboring block is outside the picture boundary), when the neighboring block is encoded by matrix-based intra prediction, when the neighboring block is encoded by inter prediction, or when the neighboring block is included in a coding tree unit different from the current block, variable candIntraPredModeX (here, X is A or B) derived based on the intra prediction mode of the neighboring block may be set as a default mode. Here, the default mode may include at least one among a planar mode, a DC mode, a vertical direction mode, and a horizontal direction mode.

Alternatively, when the neighboring block is encoded by matrix-based intra prediction, an intra prediction mode corresponding to an index value for specifying any one among the matrixes may be set to candIntraPredModeX. To this end, a lookup table showing the mapping relation between index values for specifying a matrix and intra prediction modes may be previously stored in the encoder and the decoder.

MPMs may be derived based on variable candIntraPredModeA and variable candIntraPredModeB. The number of MPMs included in an MPM list may be previously set in the encoder and the decoder. The number of MPMs included in the MPM list may be preset in the encoder and the decoder. For example, the number of MPMs may be 3, 4, 5 or 6. Alternatively, information indicating the number of MPMs may be signaled through a bitstream. Alternatively, the number of MPMs may be determined based on at least one among the prediction encoding mode of the neighboring block and the size and the shape of the current block.

In the embodiments described below, it is assumed that the number of MPMs is 3, and the 3 MPMs will be referred to as MPM[0], MPM[1] and MPM[2]. When the number of MPMs is more than 3, the MPMs may be configured to include 3 MPMs described in the embodiments described below.

When candIntraPredA and candIntraPredB are the same, and candIntraPredA is a planar mode or a DC mode, MPM[0] and MPM[1] may be set to a planar mode and a DC mode, respectively. MPM[2] may be set to a vertical direction intra prediction mode, a horizontal direction intra prediction mode, or a diagonal direction intra prediction mode. The diagonal direction intra prediction mode may be a bottom-left diagonal direction intra prediction mode, a top-left direction intra prediction mode, or a top-right direction intra prediction mode.

When candIntraPredA and candIntraPredB are the same, and candIntraPredA is an angular intra prediction mode, MPM[0] may be set to be the same as candIntraPredA. MPM[1] and MPM[2] may be set to an intra prediction mode similar to candIntraPredA, respectively. The intra prediction mode similar to candIntraPredA may be an intra prediction mode in which the difference between candIntraPredA and an index is ±1 or ±2. A modulo operation (%) and an offset may be used to derive the intra prediction mode similar to candIntraPredA.

When candIntraPredA and candIntraPredB are different, MPM[0] may be set to be the same as candIntraPredA, and MPM[1] may be set to be the same as candIntraPredB. At this point, when both candIntraPredA and candIntraPredB are the non-angular intra prediction mode, MPM[2] may be set to a vertical direction intra prediction mode, a horizontal direction intra prediction mode, or a diagonal direction intra prediction mode. Alternatively, when at least one among candIntraPredA and candIntraPredB is an angular intra prediction mode, MPM[2] may be set to an intra prediction mode derived by adding or subtracting an offset to or from a planar mode, a DC mode, or one among candIntraPredA and candIntraPredB having a greater value. Here, the offset may be 1 or 2.

An MPM list including a plurality of MPMs is generated, and information indicating whether an MPM that is the same as the intra prediction mode of the current block is included in the MPM list may be signaled through a bitstream. The information is a 1-bit flag and may be referred to as an MPM flag. When the MPM flag indicates that an MPM the same as that of the current block is included in the MPM list, index information identifying one among the MPMs may be signaled through a bitstream. The MPM specified by the index information may be set as the intra prediction mode of the current block. When the MPM flag indicates that an MPM the same as that of the current block is not included in the MPM list, residual mode information indicating any one among residual intra prediction modes other than MPMs may be signaled through a bitstream. The residual mode information indicates an index value corresponding to the intra prediction mode of the current block when indexes are reassigned to the residual intra prediction modes excluding the MPMs. The decoder may arrange the MPMs in ascending order and determine the intra prediction mode of the current block by comparing the residual mode information with the MPMs. For example, when the residual mode information is equal to or smaller than the MPM, the intra prediction mode of the current block may be derived by adding 1 to the residual mode information.

Instead of setting the default mode to MPM, information indicating whether or not the intra prediction mode of the current block is the default mode may be signaled through a bitstream. The information is a 1-bit flag, and the flag may be referred to as a default mode flag. The default mode flag may be signaled only when the MPM flag indicates that an MPM the same as that of the current block is included in the MPM list. As described above, the default mode may include at least one among a planar mode, a DC mode, a vertical direction mode, and a horizontal direction mode. For example, when the planar mode is set as the default mode, the default mode flag may indicate whether or not the intra prediction mode of the current block is a planar mode. When the default mode flag indicates that the intra prediction mode of the current block is not the default mode, one among the MPMs indicated by the index information may be set as the intra prediction mode of the current block.

When a plurality of intra prediction modes is set as default modes, index information indicating any one among the default modes may be further signaled. The intra prediction mode of the current block may be set as the default mode indicated by the index information.

When the index of the reference sample line of the current block is not 0, it may be set not to use the default mode. Accordingly, when the index of the reference sample line is not 0, the default mode flag is not signaled, and the value of the default mode flag may be set to a predefined value (i.e., false).

When the intra prediction mode of the current block is determined, prediction samples may be acquired for the current block based on the determined intra prediction mode (S2803).

When the DC mode is selected, prediction samples are generated for the current block based on an average value of reference samples. Specifically, values of all the samples in a prediction block may be generated based on an average value of the reference samples. The average value may be derived using at least one among top reference samples positioned on the top of the current block and left reference samples positioned on the left side of the current block.

Depending on the shape of the current block, the number or range of the reference samples used for deriving the average value may vary. For example, when the current block is a non-square shaped block of which the width is greater than the height, the average value may be calculated using only the top reference samples. Contrarily, when the current block is a non-square shaped block of which the width is smaller than the height, the average value may be calculated using only the left reference samples. That is, when the width and the height of the current block are different, the average value may be calculated using only reference samples adjacent to the longer one. Alternatively, based on the ratio of width to height of the current block, whether or not to calculate the average value using only the top reference samples or whether or not to calculate the average value using only the left reference samples may be determined.

When the planar mode is selected, a prediction sample may be acquired using a horizontal direction prediction sample and a vertical direction prediction sample. Here, the horizontal direction prediction sample is acquired based on a left reference sample and a right reference sample positioned on a horizontal line the same as that of the prediction sample, and the vertical direction prediction sample is acquired based on a top reference sample and a bottom reference sample positioned on a vertical line the same as that of the prediction sample. Here, the right reference sample may be generated by copying a reference sample adjacent to the top-right corner of the current block, and the bottom reference sample may be generated by copying a reference sample adjacent to the bottom-left corner of the current block. The horizontal direction prediction sample may be acquired based on a weighted sum operation of the left reference sample and the right reference sample, and the vertical direction prediction sample may be acquired based on a weighted sum operation of the top reference sample and the bottom reference sample. At this point, a weighting value assigned to each reference sample may be determined according to the position of the prediction sample. The prediction sample may be acquired based on an average operation or a weighted sum operation of the horizontal direction prediction sample and the vertical direction prediction sample. When the weighted sum operation is performed, weighting values applied to the horizontal direction prediction sample and the vertical direction prediction sample may be determined based on the position of the prediction sample.

When an angular prediction mode is selected, a parameter indicating the prediction direction (or prediction angle) of the selected angular prediction mode may be determined. Table 5 shows intra direction parameter intraPredAng of each intra prediction mode.

TABLE 5

| | PredModeIntra | | | | | | |
|---|---|---|---|---|---|---|---|
| | 1 | 2 | 3 | 4 | 5 | 6 | 7 |
| IntraPredAng | — | 32 | 26 | 21 | 17 | 13 | 9 |

| | PredModeIntra | | | | | | |
|---|---|---|---|---|---|---|---|
| | 8 | 9 | 10 | 11 | 12 | 13 | 14 |
| IntraPredAng | 5 | 2 | 0 | −2 | −5 | −9 | −13 |

| | PredModeIntra | | | | | | |
|---|---|---|---|---|---|---|---|
| | 15 | 16 | 17 | 18 | 19 | 20 | 21 |
| IntraPredAng | −17 | −21 | −26 | −32 | −26 | −21 | −17 |

| | PredModeIntra | | | | | | |
|---|---|---|---|---|---|---|---|
| | 22 | 23 | 24 | 25 | 26 | 27 | 28 |
| IntraPredAng | −13 | −9 | −5 | −2 | 0 | 2 | 5 |

| | PredModeIntra | | | | | |
|---|---|---|---|---|---|---|
| | 29 | 30 | 31 | 32 | 33 | 34 |
| IntraPredAng | 9 | 13 | 17 | 21 | 26 | 32 |

When 35 intra prediction modes are defined, Table 5 shows the intra direction parameter of each intra prediction mode having an index of any one among 2 to 34. When more than 33 angular intra prediction modes are defined, Table 5 is further subdivided to set the intra direction parameter of each angular intra prediction mode.

After arranging top reference samples and left reference samples of the current block in a line, a prediction sample may be acquired based on the value of the intra direction parameter. At this point, when the value of the intra direction parameter is a negative value, the left reference samples and the top reference samples may be arranged in a line.

Figure 31:
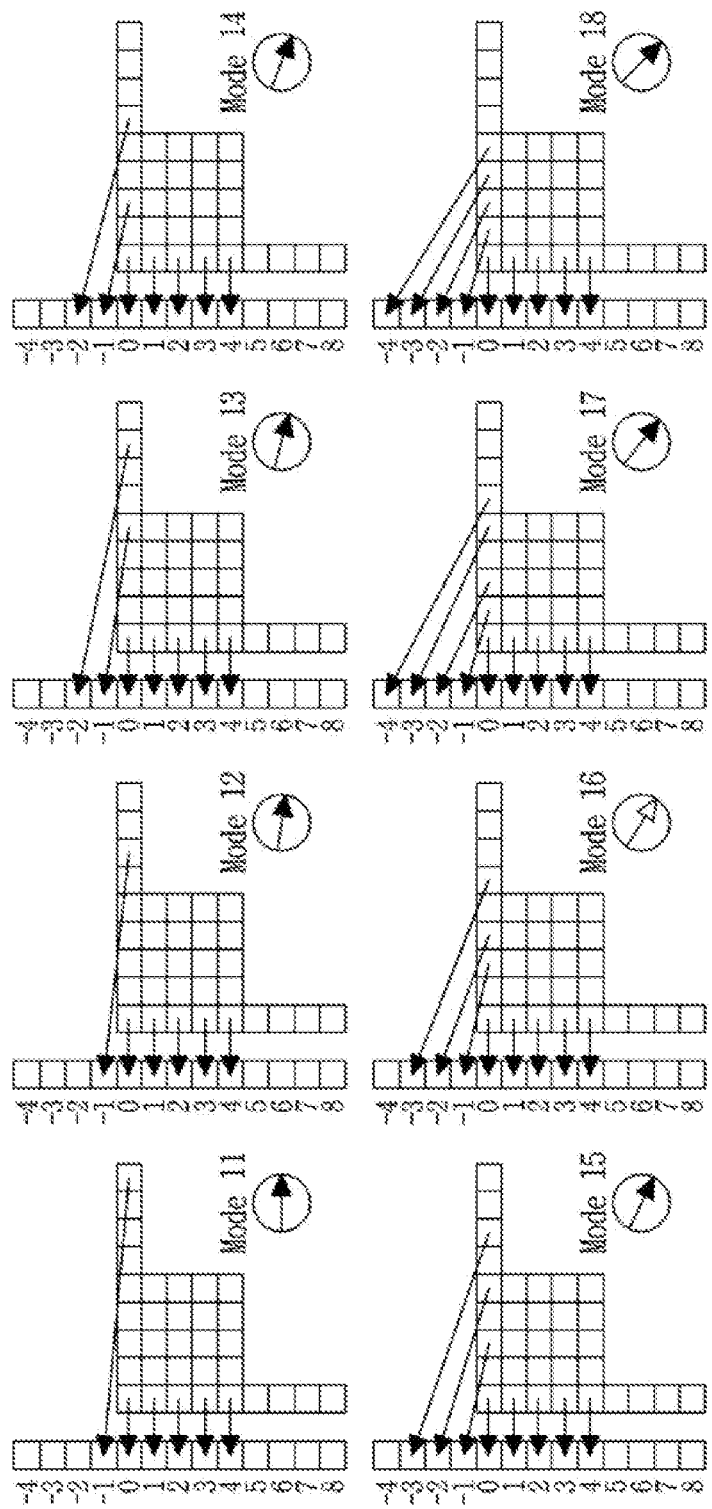
FIG. 31 is a view showing an example of a one-dimensional array arranging reference samples in a line.
Figure 32:
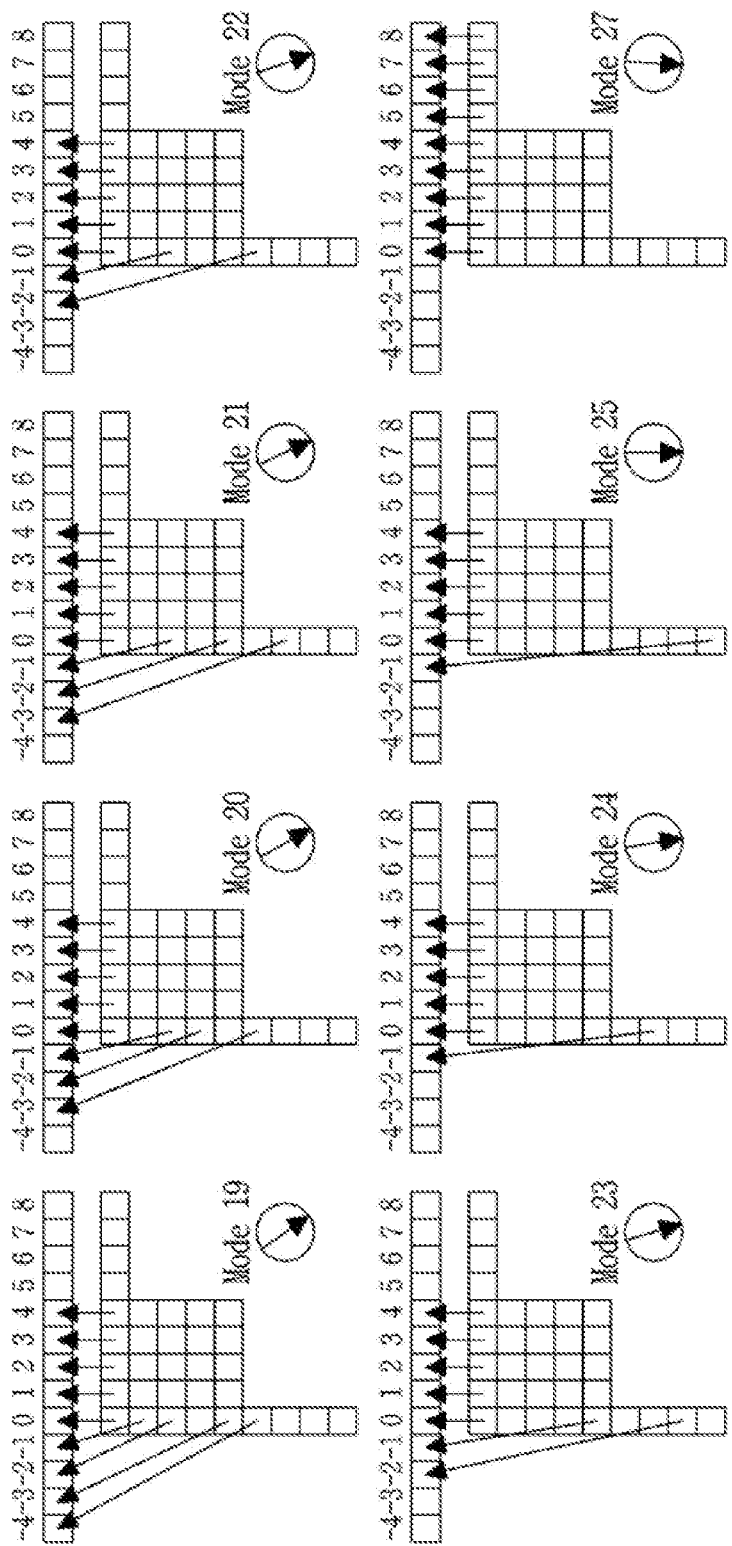
FIG. 32 is a view showing an example of a one-dimensional array arranging reference samples in a line.

FIGS. 31 and 32 are views showing an example of a one-dimensional array arranging reference samples in a line.

FIG. 31 is a view showing an example of a vertical direction one-dimensional array arranging reference samples in the vertical direction, and FIG. 32 is a view showing an example of a horizontal direction one-dimensional array arranging reference samples in the horizontal direction. The embodiments of FIGS. 31 and 32 will be described on the assumption that 35 intra prediction modes are defined.

When the intra prediction mode index is any one among 11 to 18, a horizontal direction one-dimensional array in which top reference samples are rotated counterclockwise may be applied, and when the intra prediction mode index is any one among 19 to 25, a vertical direction one-dimensional array in which left reference samples are rotated clockwise may be applied. In arranging the reference samples in a line, an intra prediction mode angle may be considered.

A reference sample determination parameter may be determined based on an intra direction parameter. The reference sample determination parameter may include a reference sample index for specifying a reference sample and a weighting value parameter for determining a weighting value applied to the reference sample.

Reference sample index iIdx and weighting value parameter ifact may be acquired through Equations 5 and 6 shown below, respectively.

$$ildx = (y+1) * P_{ang}/32 \quad \text{[Equation 5]}$$

$$i_{fact} = [(y+1) * P_{ang}] \& 31 \quad \text{[Equation 6]}$$

In Equations 5 and 6, $P_{ang}$ denotes an intra direction parameter. The reference sample specified by reference sample index ildx corresponds to an integer pel.

At least one or more reference samples may be specified to derive a prediction sample. Specifically, the position of a reference sample used for deriving a prediction sample may be specified considering the slope of the prediction mode. For example, a reference sample used for deriving a prediction sample may be specified using reference sample index ildx.

At this point, when the slope of the intra prediction mode is not expressed by one reference sample, a prediction sample may be generated by interpolating a plurality of reference samples. For example, when the slope of the intra prediction mode is a value between a slope between a prediction sample and a first reference sample and a slope between a prediction sample and a second reference sample, the prediction sample may be acquired by interpolating the first reference sample and the second reference sample. That is, when an angular line following an intra prediction angle does not pass through a reference sample positioned at an integer pel, the prediction sample may be acquired by interpolating reference samples adjacent to the left and right or up and down sides of a position where the angular line passes through.

Equation 7 shows an example of acquiring a prediction sample based on reference samples.

$$P(x,y) = ((32 - i_{fact})/32) * \text{Ref\_1D}(x + ildx + 1)(i_{fact}/32) * \text{Ref\_1D}(x + ildx + 2) \quad \text{[Equation 7]}$$

In Equation 7, P denotes a prediction sample, and Ref_1D denotes any one among one-dimensionally arranged reference samples. At this point, the position of a reference sample may be determined by position (x, y) of the prediction sample and index ildx of the reference sample.

When the slope of the intra prediction mode can be expressed as one reference sample, weighting value parameter $i_{fact}$ is set to 0. Accordingly, Equation 7 may be simplified as shown in Equation 8.

$$P(x,y) = \text{Ref\_1D}(x + ildx + 1) \quad \text{[Equation 8]}$$

Intra prediction for the current block may be performed based on a plurality of intra prediction modes. For example, an intra prediction mode may be derived for each prediction sample, and the prediction sample may be derived based on an intra prediction mode assigned to each prediction sample.

Alternatively, an intra prediction mode may be derived for each region, and intra prediction for each region may be performed based on the intra prediction mode assigned to each region. Here, the region may include at least one sample. At least one among the size and the shape of the region may be adaptively determined based on at least one among the size, the shape, and the intra prediction mode of the current block. Alternatively, at least one among the size and the shape of the region may be predefined in the encoder and the decoder to be independent from the size or the shape of the current block.

Alternatively, intra prediction may be performed based on each of a plurality of intra predictions, and a final prediction sample may be derived based on an average operation or a weighted sum operation of a plurality of prediction samples acquired through the plurality of intra predictions. For example, a first prediction sample may be acquired by performing intra prediction based on a first intra prediction mode, and a second prediction sample may be acquired by performing intra prediction based on a second intra prediction mode. Thereafter, a final prediction sample may be acquired based on an average operation or a weighted sum operation of the first prediction sample and the second prediction sample. At this point, a weighting value assigned to each of the first prediction sample and the second prediction sample may be determined considering at least one among whether or not the first intra prediction mode is a non-angular/angular prediction mode, whether or not the second intra prediction mode is a non-angular/angular prediction mode, and an intra prediction mode of a neighboring block.

The plurality of intra prediction modes may be a combination of a non-angular intra prediction mode and an angular prediction mode, a combination of angular prediction modes, or a combination of non-angular prediction modes.

Figure 33:
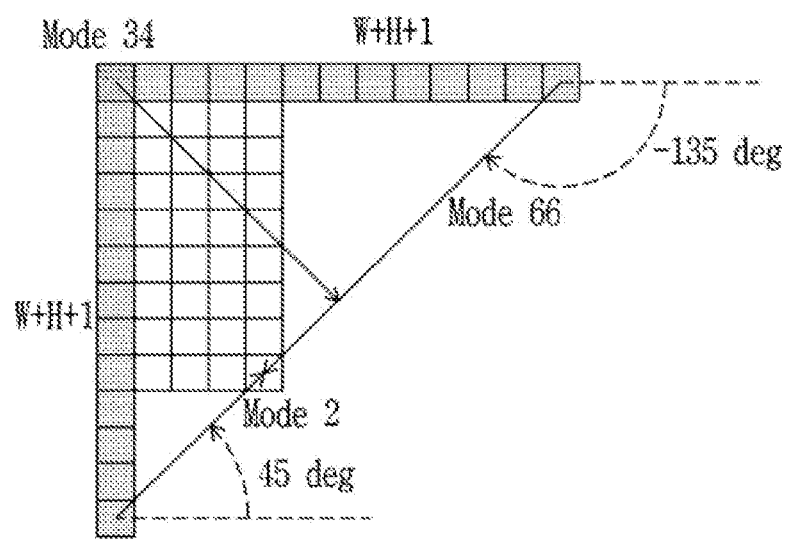
FIG. 33 is a view showing an example of angles formed between angular intra prediction modes and a straight line parallel to the x-axis.

FIG. 33 is a view showing an example of angles formed between angular intra prediction modes and a straight line parallel to the x-axis.

As shown in the example of FIG. 33, the angular prediction modes may exist between the bottom-left diagonal direction and the top-right diagonal direction. Describing in terms of an angle formed by the x-axis and the angular prediction mode, the angular prediction modes may exist between 45 degrees (bottom-left diagonal direction) and −135 degrees (top-right diagonal direction).

When the current block is a non-square shape, according to the intra prediction mode of the current block, there may be a case of deriving a prediction sample by using a reference sample farther from the prediction sample, instead of a reference sample further closer to the prediction sample, among the reference samples positioned on the angular line following the intra prediction angle.

Figure 34:
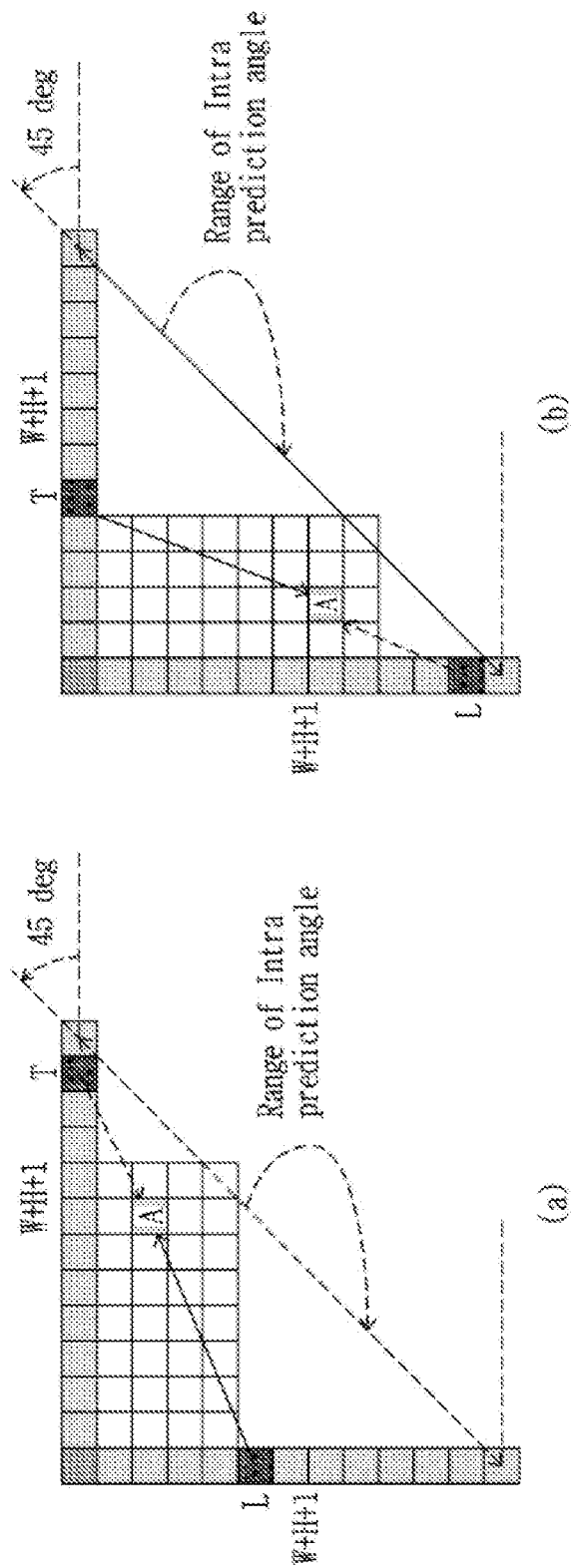
FIG. 34 is a view showing an embodiment of acquiring prediction samples when the current block is a non-square shape.

FIG. 34 is a view showing an embodiment of acquiring prediction samples when the current block is a non-square shape.

For example, as shown in the example of FIG. 34 (a), it is assumed that the current block is a non-square shape of which the width is greater than the height, and the intra prediction mode of the current block is an angular intra prediction mode having an angle between 0 and 45 degrees. In the above case, when prediction sample A near the right column of the current block is derived, there may be a case of using left reference sample L far from the prediction sample, instead of top reference sample T close to the prediction sample, among the reference samples positioned on an angular mode following the angle.

As another example, as shown in the example of FIG. 34 (b), it is assumed that the current block is a non-square shape of which the height is greater than the width, and the intra prediction mode of the current block is an angular intra prediction mode having an angle between −90 and −135 degrees. In the above case, when prediction sample A near the bottom row of the current block is derived, there may be a case of using top reference sample T far from the prediction sample, instead of left reference sample L close to the prediction sample, among the reference samples positioned on an angular mode following the angle.

To solve the problem described above, when the current block is a non-square shape, the intra prediction mode of the current block may be replaced with an intra prediction mode of the opposite direction. Accordingly, angular prediction modes having an angle greater or smaller than that of the angular prediction modes shown in FIG. 34 may be used for a non-square shaped block. The angular intra prediction mode like this may be defined as a wide-angle intra prediction mode. The wide-angle intra prediction mode represents an angular intra prediction mode that does not belong to the range of 45 to −135 degrees.

Figure 35:
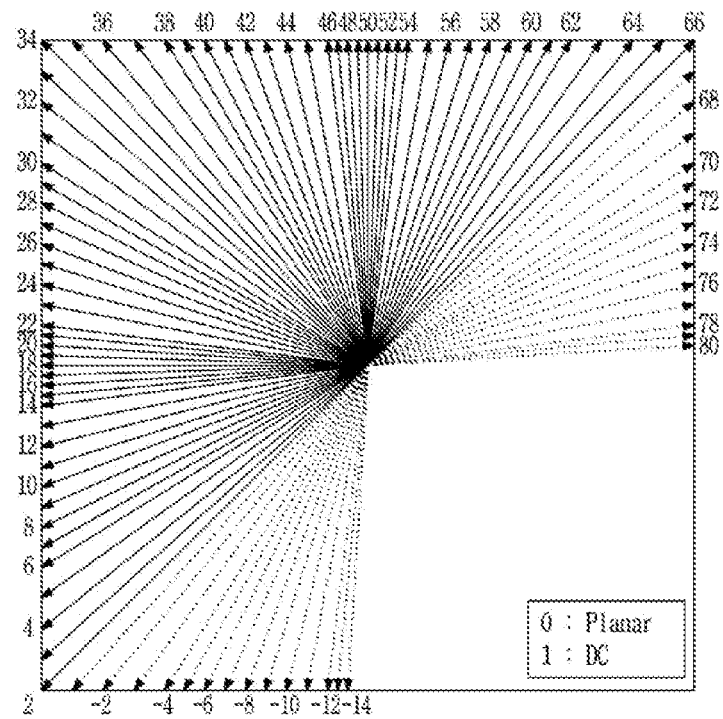
FIG. 35 is a view showing wide-angle intra prediction modes.

FIG. 35 is a view showing wide-angle intra prediction modes.

In the example shown in FIG. 35, intra prediction modes with an index of −1 to −14 and intra prediction modes with an index of 67 to 80 represent wide-angle intra prediction modes.

Although 14 wide-angle intra prediction modes (−1 to −14) having an angle larger than 45 degrees and 14 wide-angle intra prediction modes (67 to 80) having an angle smaller than −135 degrees are shown in FIG. 35, a larger or smaller number of wide-angle intra prediction modes may be defined.

When a wide-angle intra prediction mode is used, the length of top reference samples may be set to 2W+1, and the length of left reference samples may be set to 2H+1.

As a wide-angle intra prediction mode is used, sample A shown in FIG. 34 (*a*) may be predicted using reference sample T, and sample A shown in FIG. 34 (*b*) may be predicted using reference sample L.

By adding existing intra prediction modes and N wide-angle intra prediction modes, a total of 67+N intra prediction modes can be used. For example, Table 6 shows intra direction parameters of intra prediction modes when 20 wide-angle intra prediction modes are defined.

TABLE 6

| | PredModeIntra | | | | | | | | |
|---|---|---|---|---|---|---|---|---|---|
| | −10 | −9 | −8 | −7 | −6 | −5 | −4 | −3 | −2 |
| intraPredAngle | 114 | 93 | 79 | 68 | 60 | 54 | 49 | 45 | 39 |
| | PredModeIntra | | | | | | | | |
| | −1 | 2 | 3 | 4 | 5 | 6 | 7 | 8 | 9 |
| intraPredAngle | 35 | 32 | 29 | 26 | 23 | 21 | 19 | 17 | 15 |
| | PredModeIntra | | | | | | | | |
| | 10 | 11 | 12 | 13 | 14 | 15 | 16 | 17 | 18 |
| intraPredAngle | 13 | 11 | 9 | 7 | 5 | 3 | 2 | 1 | 0 |
| | PredModeIntra | | | | | | | | |
| | 19 | 20 | 21 | 22 | 23 | 24 | 25 | 26 | 27 |
| intraPredAngle | −1 | −2 | −3 | −5 | −7 | −9 | −11 | −13 | −15 |
| | PredModeIntra | | | | | | | | |
| | 28 | 29 | 30 | 31 | 32 | 33 | 34 | 35 | 36 |
| intraPredAngle | −17 | −19 | −21 | −23 | −26 | −29 | −32 | −29 | −26 |
| | PredModeIntra | | | | | | | | |
| | 37 | 38 | 39 | 40 | 41 | 42 | 43 | 44 | 45 |
| intraPredAngle | −23 | −21 | −19 | −17 | −15 | −13 | −11 | −9 | −7 |
| | PredModeIntra | | | | | | | | |
| | 46 | 47 | 48 | 49 | 50 | 51 | 52 | 53 | 54 |
| intraPredAngle | −5 | −3 | −2 | −1 | 0 | 1 | 2 | 3 | 5 |
| | PredModeIntra | | | | | | | | |
| | 55 | 56 | 57 | 58 | 59 | 60 | 61 | 62 | 63 |
| intraPredAngle | 7 | 9 | 11 | 13 | 15 | 17 | 19 | 21 | 23 |
| | PredModeIntra | | | | | | | | |
| | 64 | 65 | 66 | 67 | 68 | 69 | 70 | 71 | 72 |
| intraPredAngle | 26 | 29 | 32 | 35 | 39 | 45 | 49 | 54 | 60 |
| | PredModeIntra | | | | | | | | |
| | 73 | | 74 | | 75 | | 76 | | |
| intraPredAngle | 68 | | 79 | | 93 | | 114 | | |

When the current block is a non-square shape and the intra prediction mode of the current block acquired at step S2802 belongs to a transform range, the intra prediction mode of the current block may be transformed into a wide-angle intra prediction mode. The transform range may be determined based on at least one among the size, the shape, and the ratio of the current block. Here, the ratio may represent a ratio of width to height of the current block.

When the current block is a non-square shape of which the width is greater than the height, the transform range may be set from an intra prediction mode index (e.g., 66) of the top-right diagonal direction (an index of the intra prediction mode in the top-right diagonal direction−N). Here, N may be determined based on the ratio of the current block. When the intra prediction mode of the current block belongs to the transform range, the intra prediction mode may be transformed into a wide-angle intra prediction mode. The transform may be subtraction of a predefined value from the intra prediction mode, and the predefined value may be the total number (e.g., 67) of intra prediction modes excluding the wide-angle intra prediction modes.

According to the embodiment described above, 66th to 53rd intra prediction modes may be transformed into −1st to −14th wide-angle intra prediction modes, respectively.

When the current block is a non-square shape of which the height is greater than the width, the transform range may be set from an intra prediction mode index (e.g., 2) of the bottom-left diagonal direction (an index of the intra prediction mode in the bottom-left diagonal direction+M). Here, M may be determined based on the ratio of the current block. When the intra prediction mode of the current block belongs to the transform range, the intra prediction mode may be transformed into a wide-angle intra prediction mode. The transform may be addition of a predefined value to the intra prediction mode, and the predefined value may be the total number (e.g., 65) of angular intra prediction modes excluding the wide-angle intra prediction modes.

According to the embodiment described above, 2nd to 15th intra prediction modes may be transformed into 67th to 80th wide-angle intra prediction modes, respectively.

Hereinafter, intra prediction modes belonging to the transform range will be referred to as wide-angle intra replacement prediction modes.

The transform range may be determined based on the ratio of the current block. For example, Tables 7 and 8 show a transform range when 35 intra prediction modes and 67 intra prediction modes are defined excluding the wide-angle intra prediction modes, respectively.

TABLE 7

| Condition | Replaced Intra Prediction Modes |
|---|---|
| W/H = 2 | Modes 2, 3, 4 |
| W/H > 2 | Modes 2, 3, 4, 5, 6 |
| W/H = 1 | None |
| H/W = 1/2 | Modes 32, 33, 34 |
| H/W < 1/2 | Modes 30, 31, 32, 33, 34 |

TABLE 8

| Condition | Replaced Intra Prediction Modes |
|---|---|
| W/H = 2 | Modes 2, 3, 4, 5, 6, 7 |
| W/H > 2 | Modes 2, 3, 4, 5, 6, 7, 8, 9, 10, 11 |
| W/H = 1 | None |
| H/W = 1/2 | Modes 61, 62, 63, 64, 65, 66 |
| H/W < 1/2 | Modes 57, 58, 59, 60, 61, 62, 63, 64, 65, 66 |

As shown in the examples of Tables 7 and 8, the number of wide-angle intra replacement prediction modes belonging to the transform range may vary according to the ratio of the current block.

As the wide-angle intra prediction modes are used in addition to the existing intra prediction modes, resources required for encoding the wide-angle intra prediction modes increase, and thus encoding efficiency may be lowered. Accordingly, the encoding efficiency may be improved by encoding replacement intra prediction modes for the wide-angle intra prediction modes, instead of encoding the wide-angle intra prediction modes as they are.

For example, when the current block is encoded using the 67th wide-angle intra prediction mode, the 2nd intra prediction mode, which is the replacement intra prediction mode of the 67th wide-angle intra prediction mode, may be encoded using the intra prediction mode of the current block. In addition, when the current block is encoded using the −1st wide-angle intra prediction mode, the 66th intra prediction mode, which is the replacement intra prediction mode of the −1st wide-angle intra prediction mode, may be encoded using the intra prediction mode of the current block.

The decoder may decode the intra prediction mode of the current block and determine whether the decoded intra prediction mode belongs to the transform range. When the decoded intra prediction mode is a wide-angle replacement intra prediction mode, the intra prediction mode may be transformed into the wide-angle intra prediction mode.

Alternatively, when the current block is encoded using the wide-angle intra prediction mode, the wide-angle intra prediction mode may be encoded as it is.

Encoding the intra prediction mode may be performed based on the MPM list described above. Specifically, when a neighboring block is encoded using a wide-angle intra prediction mode, the MPM may be set based on a wide-angle replacement intra prediction mode corresponding to the wide-angle intra prediction mode. For example, when a neighboring block is encoded using a wide-angle intra prediction mode, variable candIntraPredX (X is A or B) may be set to the wide-angle replacement intra prediction mode.

When a prediction block is generated as a result of performing the intra prediction, prediction samples may be updated based on the position of each of the prediction samples included in the prediction block. The update method like this may be referred to as an intra weighted prediction method based on a sample position or Position Dependent intra Prediction Combination (PDPC).

Whether or not to use the PDPC may be determined considering the intra prediction mode of the current block, the reference sample line of the current block, the size of the current block, or a color component. For example, when the intra prediction mode of the current block is at least one among of a planar mode, a DC mode, a vertical direction mode, a horizontal direction mode, a mode having an index value smaller than that or the vertical direction mode, and a mode having an index value larger than that of the horizontal direction mode, the PDPC may be used. Alternatively, only when at least one among the width and the height of the current block is greater than 4, the PDPC may be used. Alternatively, only when the index of the reference picture line of the current block is 0, the PDPC may be used. Alternatively, only when the index of the reference picture line of the current block is equal to or greater than a predefined value, the PDPC may be used. Alternatively, PDPC may be used only for a luminance component. Alternatively, depending on whether or not two or more of the conditions listed above are satisfied, whether or not to use the PDPC may be determined.

As another example, information indicating whether or not the PDPC is applied may be signaled through a bitstream.

When a prediction sample is acquired through the intra prediction sample, a reference sample used for correcting the prediction sample may be determined based on the position of the acquired prediction sample. For convenience of explanation, in the embodiment described below, a reference sample used for correcting a prediction sample is referred to as a PDPC reference sample. In addition, a prediction sample acquired through intra prediction is referred to as a first prediction sample, and a prediction sample acquired by correcting the first prediction sample is referred to as a second prediction sample.

Figure 36:
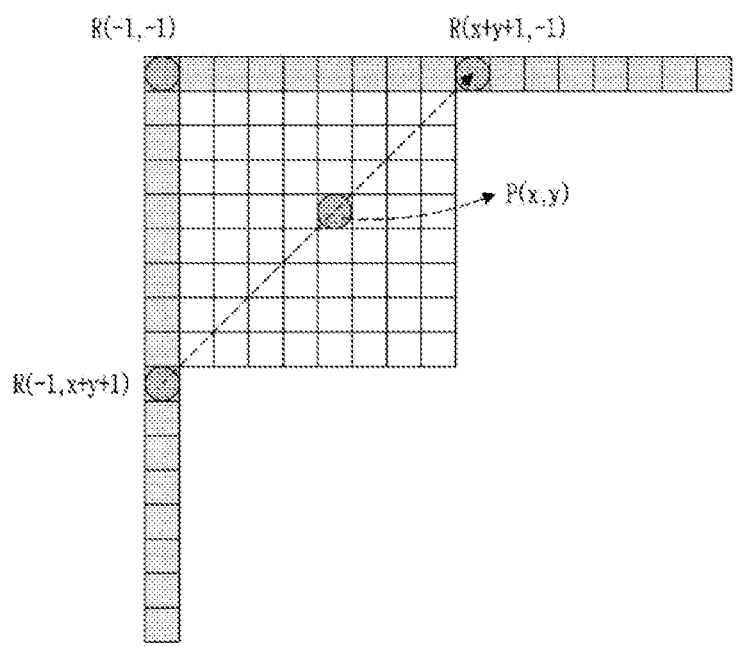
FIG. 36 is a view showing an embodiment of applying PDPC.

FIG. 36 is a view showing an embodiment of applying PDPC.

The first prediction sample may be corrected using at least one PDPC reference sample. The PDPC reference sample may include at least one among a reference sample adjacent to the top-left corner of the current block, a top reference sample positioned on the top of the current block, and a left reference sample positioned on the left side of the current block.

At least one among the reference samples belonging to the reference sample line of the current block may be set as the PDPC reference sample. Alternatively, regardless of the reference sample line of the current block, at least one among the reference samples belonging to the reference sample line having index 0 may be set as the PDPC reference sample. For example, although the first prediction sample is acquired using a reference sample included in a reference sample line of index 1 or index 2, the second prediction sample may be acquired using a reference sample included in the reference sample line of index 0.

The number or positions of the PDPC reference samples used for correcting the first prediction sample may be determined considering at least one among the intra prediction mode of the current block, the size of the current block, the shape of the current block, and the position of the first prediction sample.

For example, when the intra prediction mode of the current block is a planar mode or a DC mode, the second prediction sample may be acquired using a top reference sample and a left reference sample. At this point, the top reference sample may be a reference sample vertical to the first prediction sample (e.g., a reference sample of the same x-coordinate), and the left reference sample may be a reference sample horizontal to the first prediction sample (e.g., a reference sample of the same y-coordinate).

When the intra prediction mode of the current block is a horizontal direction intra prediction mode, the second prediction sample may be acquired using a top reference sample. At this point, the top reference sample may be a reference sample vertical to the first prediction sample.

When the intra prediction mode of the current block is a vertical direction intra prediction mode, the second prediction sample may be acquired using a left reference sample. At this point, the left reference sample may be a reference sample horizontal to the first prediction sample.

When the intra prediction mode of the current block is a bottom-left diagonal direction intra prediction mode or a top-right diagonal direction intra prediction mode, the second prediction sample may be acquired based on a top-left reference sample, a top reference sample, and a left reference sample. The top-left reference sample may be a reference sample adjacent to the top-left corner of the current block (e.g., a reference sample at the position of (−1, −1)). The top reference sample may be a reference sample positioned in the top-right diagonal direction of the first prediction sample, and the left reference sample may be a reference sample positioned in the bottom-left diagonal direction of the first prediction sample.

In summary, when the position of the first prediction sample is (x, y), R (−1, −1) may be set as the top-left reference sample, and R (x+y+1, −1) or R (x, −1) may be set as the top reference sample. In addition, R (−1, x+y+1) or R (−1, y) may be set as the left reference sample.

As another example, the position of the left reference sample or the top reference sample may be determined considering at least one among the shape of the current block and whether or not the wide-angle intra mode is applied.

Specifically, when the intra prediction mode of the current block is a wide-angle intra prediction mode, a reference sample spaced apart from a reference sample positioned in the diagonal direction of the first prediction sample as much as an offset may be set as the PDPC reference sample. For example, top reference sample R (x+y+k+1, −1) and left reference sample R (−1, x+y−k+1) may be set as PDPC reference samples.

At this point, offset k may be determined based on a wide-angle intra prediction mode. Equations 9 and 10 show an example of deriving an offset based on a wide-angle intra prediction mode.

$$k = \text{CurrIntraMode} - 66 \text{ if(CurrIntraMode>66)} \quad \text{[Equation 9]}$$

$$k = -\text{CurrIntraMode if(CurrIntraMode<0)} \quad \text{[Equation 10]}$$

The second prediction sample may be determined based on a weighted sum operation of the first prediction sample and the PDPC reference samples. For example, the second prediction sample may be acquired based on Equation 11 shown below.

$$\text{pred}(x,y) = (xL*R_L + wT*R_T - wTL*R_{TL} + (64 - wL - wT + wTL)*\text{pred}(x,y) + 32) >> 6 \quad \text{[Equation 11]}$$

In Equation 11, $R_L$ denotes a left reference sample, $R_T$ denotes a top reference sample, and $R_{TL}$ denotes a top-left reference sample. pred (x, y) denotes a prediction sample at the position of (x, y). wL denotes a weighting value assigned to the left reference sample, wT denotes a weighting value assigned to the top reference sample, and wTL denotes a weighting value assigned to the top-left reference sample. The weighting values assigned to the first prediction sample may be derived by subtracting weighting values assigned to the reference samples from the maximum value. For convenience of explanation, a weighting value assigned to a PDPC reference sample is referred to as a PDPC weighting value.

A weighting value assigned to each reference sample may be determined based on at least one among the intra prediction mode of the current block and the position of the first prediction sample.

For example, at least one among wL, wT and wTL may have a proportional or inverse proportional relation with at least one among the x-axis coordinate value and the y-axis coordinate value of the prediction sample. Alternatively, at least one among wL, wT and wTL may have a proportional or inversely proportional relation with at least one among the width and the height of the current block.

When the intra prediction mode of the current block is a DC mode, PDPC weighting values may be determined as shown in Equation 12.

$wT=32>>((y<<1)>>\text{shift})$ $wL=32>>((x<<1)>>\text{shift})$ $wTL=(wL>>4)+(wT>>4)$ [Equation 12]

In Equation 12, x and y denote the position of the first prediction sample.

Variable shift used in the bit shift operation in Equation 12 may be derived based on the width or the height of the current block. For example, variable shift may be derived based on Equation 13 or 14 shown below.

$\text{shift}=(\log_2(\text{width})-2+\log_2(\text{height})-2+2)>>2$ [Equation 13]

$\text{shift}=((\text{Log}_2(nTbW)+\text{Log}_2(nTbH)-2)>>2)$ [Equation 14]

Alternatively, variable shift may be derived considering the intra direction parameter of the current block.

The number of parameters or parameter types used for deriving variable shift may be determined differently according to the intra prediction mode of the current block. For example, when the intra prediction mode of the current block is a planar mode, a DC mode, a vertical direction mode, or a horizontal direction mode, variable shift may be derived using the width and the height of the current block as shown in the example of Equation 13 or Equation 14. When the intra prediction mode of the current block is an intra prediction mode having an index larger than that of the vertical direction intra prediction mode, variable shift may be derived using the height and the intra direction parameter of the current block. When the intra prediction mode of the current block is an intra prediction mode having an index smaller than that of the horizontal intra prediction mode, variable shift may be derived using the width and the intra direction parameter of the current block.

When the intra prediction mode of the current block is a planar mode, the value of wTL may be set to 0. wL and wT may be derived based on Equation 15 shown below.

$wT[y]=32>>((y<<1)>>n\text{Scale})$ $wL[x]=32>>((x<<1)>>n\text{Scale})$ [Equation 15]

When the intra prediction mode of the current block is a horizontal direction intra prediction mode, wT may be set to 0, and wTL and wL may be set equally. Contrarily, when the intra prediction mode of the current block is a vertical direction intra prediction mode, wL may be set to 0, and wTL and wT may be set equally.

When the intra prediction mode of the current block is an intra prediction mode directing toward the top-right having an index value larger than that of the intra prediction mode of the vertical direction, PDPC weighting values may be derived as shown in Equation 16.

$wT=16((y<<1)>>\text{shift})$ $wL=16((x<<1)>>\text{shift})$ $wTL=0$ [Equation 16]

Contrarily, when the intra prediction mode of the current block is an intra prediction mode directing toward the bottom-left having an index value smaller than that of the intra prediction mode of the horizontal direction, the PDPC weighting values may be derived as shown in Equation 17.

$wT16>>(y<<1)>>\text{shift})$ $wL=16>>((x<<1)>>\text{shift})$ $wTL=0$ [Equation 17]

As shown in the embodiment described above, PDPC weighting values may be determined based on the position x and y of the prediction sample.

As another example, a weighting value assigned to each of the PDPC reference samples may be determined by the unit of subblock. Prediction samples included in a subblock may share the same PDPC weighting values.

The size of a subblock, which is a basic unit for determining a weighting value, may be predefined in the encoder and the decoder. For example, a weighting value may be determined for each subblock of a 2×2 or 4×4 size.

Alternatively, the size, the shape, or the number of subblocks may be determined according to the size or the shape of the current block. For example, regardless of the size of a coding block, the coding block may be divided into four subblocks. Alternatively, the coding block may be divided into 4 or 16 subblocks according to the size of the coding block.

Alternatively, the size, the shape, or the number of subblocks may be determined based on the intra prediction mode of the current block. For example, when the intra prediction mode of the current block is in the horizontal direction, N columns (or N rows) are set as one subblock, whereas when the intra prediction mode of the current block is in the vertical direction, N rows (or N columns) may be set as one subblock.

Equations 18 to 20 show examples of determining a PDPC weighting value for a subblock of a 2×2 size. Equation 18 shows a case in which the intra prediction mode of the current block is a DC mode.

$wT=32>>(((y<<\log_2 K))>>\log_2 K)<<1)>>\text{shift})$ $wL=32>>(((x<<\log 2K))>>\log 2K)<<1)>>\text{shift})$ $wTL=(wL>>4)+(wT>>4)$ [Equation 18]

In Equation 18, K may be determined based on the size of a subblock.

Equation 19 shows an example in which the intra prediction mode of the current block is an intra prediction mode directing toward the top-right having an index value larger than that of the intra prediction mode of the vertical direction.

$wT=16>>\log_2 K))>>\log_2 K))<<1)>>\text{shift})$ $wL=16>>(((x<<\log 2K))>>\log 2K))<<1)>>\text{shift})$ $wTL=0$ [Equation 19]

Equation 20 shows an example in which the intra prediction mode of the current block is an intra prediction mode directing toward the bottom-left having an index value smaller than that of the intra prediction mode of the horizontal direction.

$wT=16>>(((y<<\log_2 K))>>\log_2 K)<<1)>>\text{shift})$ $wL=16>>(((x<<\log 2K))>>\log 2K)<<1)>>\text{shift})$ $wTL=0$ [Equation 20]

In Equations 18 to 20, x and y denotes the position of a reference sample within a subblock. The reference sample may be any one among a sample positioned at the top-left of the subblock, a sample positioned at the center of the subblock, and a sample positioned at the bottom-right of the subblock.

Equations 21 to 23 show examples of determining a PDPC weighting value for a subblock of a 4×4 size. Equation 21 shows an example in which the intra prediction mode of the current block is a DC mode.

$$wT=32>>(((y<<2))>>2)<<1)>>\text{shift})$$

$$wL=32>>(((x<<2))>>2)<<1)>>\text{shift})$$

$$wTL=(wL>>4)+(wT>>4) \quad \text{[Equation 21]}$$

Equation 22 shows an example in which the intra prediction mode of the current block is an intra prediction mode directing toward the top-right having an index value larger than that of the intra prediction mode of the vertical direction.

$$wT=16>>(((y<<2))>>2)<<1)>>\text{shift})$$

$$wL=16>>(((x<<2))>>2)<<1)>>\text{shift})$$

$$wTL=0 \quad \text{[Equation 22]}$$

Equation 23 shows an example in which the intra prediction mode of the current block is an intra prediction mode directing toward the bottom-left having an index value smaller than that of the intra prediction mode of the horizontal direction.

$$wT=16>>(((y<<2))>>2)<<1)>>\text{shift})$$

$$wL=16>>(((x<<2))>>2)<<1)>>\text{shift})$$

$$wTL=0 \quad \text{[Equation 23]}$$

In the embodiments described above, it has been described that PDPC weighting values are determined considering the positions of the prediction samples included in a first prediction sample or a subblock. The PDPC weighting values may be determined by further considering the shape of the current block.

For example, in the case of a DC mode, the method of deriving a PDPC weighting value may vary depending on whether the current block is a non-square shape of which the width is greater than the height or a non-square shape of which the height is greater than the width.

Equation 24 shows an example of deriving a PDPC weighting value when the current block is a non-square shape of which the width is greater than the height, and Equation 25 shows an example of deriving a PDPC weighting value when the current block is a non-square shape of which the height is greater than the width.

$$wT=32>>((y<<1)>>\text{shift})$$

$$wL=32>>(x>>\text{shift})$$

$$wTL=(wL>>4)+(wT>>4) \quad \text{[Equation 24]}$$

$$wT>>(y>>\text{shift})$$

$$wL=32>>((x<<1)>>\text{shift})$$

$$wTL=(wL>>4)+(wT>>4) \quad \text{[Equation 25]}$$

When the current block is a non-square shape, the current block may be predicted using a wide-angle intra prediction mode. In this way, even when the wide-angle intra prediction mode is applied, the first prediction sample may be updated by applying the PDPC.

When the wide-angle intra prediction is applied to the current block, the PDPC weighting value may be determined considering the shape of the coding block.

For example, when the current block is a non-square shape of which the width is greater than the height, according to the position of the first prediction sample, there may be a case in which the top reference sample positioned at the top-right of the first prediction sample is closer to the first prediction sample than the left reference sample positioned at the bottom-left of the first prediction sample. Accordingly, in correcting the first prediction sample, the weighting value applied to the top reference sample may be set to have a value larger than the weighting value applied to the left reference sample.

Contrarily, when the current block is a non-square shape of which the height is greater than the width, according to the position of the first prediction sample, there may be a case in which the left reference sample positioned at the bottom-left of the first prediction sample is closer to the first prediction sample than the top reference sample positioned at the top-right of the first prediction sample. Accordingly, in correcting the first prediction sample, the weighting value applied to the left reference sample may be set to have a value larger than the weighting value applied to the top reference sample.

Equation 26 shows an example of deriving a PDPC weighting value when the intra prediction mode of the current block is a wide-angle intra prediction mode having an index larger than 66.

$$wT=16>>(y>>\text{shift})$$

$$wL=16>>((x<<1)>>\text{shift})$$

$$wTL=0 \quad \text{[Equation 26]}$$

Equation 27 shows an example of deriving a PDPC weighting value when the intra prediction mode of the current block is a wide-angle intra prediction mode having an index smaller than 0.

$$wT=16>>((y<<1)>>\text{shift})$$

$$wL=16>>(x>>\text{shift})$$

$$wTL=0 \quad \text{[Equation 27]}$$

The PDPC weighting value may be determined based on the ratio of the current block. The ratio of the current block represents a ratio of width to height of the current block, and may be defined as shown in Equation 28.

$$wh\text{Ratio}=CU\text{width}/CU\text{height} \quad \text{[Equation 28]}$$

According to the intra prediction mode of the current block, the method of deriving the PDPC weighting value may be determined in various ways.

For example, Equations 29 and 30 show an example of deriving a PDPC weighting value when the intra prediction mode of the current block is a DC mode. Specifically, Equation 29 is an example of a case where the current block is a non-square shape of which the width is greater than the height, and Equation 30 is an example of a case where the current block is a non-square shape of which the height is greater than the width.

$$wT=32>>((y<<1)>>\text{shift})$$

$$wL=32>>(((x<<1)>>wh\text{Ratio})>>\text{shift})$$

$$wTL=(wL>>4)+(wT>>4) \quad \text{[Equation 29]}$$

$$wT=32>>(((y<<1)>>1/wh\text{Ratio})>>\text{shift})$$

$$wL=32>>((x<<1)>>\text{shift})$$

$$wTL=(wL>>4)+(wT>>4) \quad \text{[Equation 30]}$$

Equation 31 shows an example of deriving a PDPC weighting value when the intra prediction mode of the current block is a wide-angle intra prediction mode having an index larger than 66.

$$wT=16>>(((y<<1)>>1/whRatio)>>\text{shift})$$

$$wL=16>>((x<<1)>>\text{shift})$$

$$wTL=0 \quad \text{[Equation 31]}$$

Equation 32 shows an example of deriving a PDPC weighting value when the intra prediction mode of the current block is a wide-angle intra prediction mode having an index smaller than 0.

$$wT=16>>(y<<1)>>\text{shift})$$

$$wL=16>>(((x<<1)>>whRatio)>>\text{shift})$$

$$wTL=0 \quad \text{[Equation 32]}$$

A prediction mode may be applied to the current block a plurality of times, or a plurality of prediction modes may be redundantly applied to the current block. Like this, a prediction method using a homogeneous or heterogeneous prediction mode may be referred to as a combined prediction mode (or Multi-hypothesis Prediction Mode).

Information indicating whether the combined prediction mode is applied to the current block may be signaled through a bitstream. For example, the information may be a 1-bit flag.

In the combined prediction mode, a first prediction block may be generated based on the first prediction mode, and a second prediction block may be generated based on the second prediction mode. Then, a third prediction block may be generated based on a weighted sum operation of the first prediction block and the second prediction block. The third prediction block may be set as the final prediction block of the current block.

The combined prediction mode includes at least one among a mode combining a merge mode and a merge mode, a mode combining inter prediction and intra prediction, a mode combining a merge mode and a motion vector prediction mode, and a mode combining a merge mode and intra prediction.

In the mode combining a merge mode and a merge mode, motion compensation prediction may be performed using a plurality of merge candidates. Specifically, a first prediction block may be generated using a first merge candidate, and a second prediction block may be generated using a second merge candidate. A third prediction block may be generated based on a weighted sum operation of the first prediction block and the second prediction block.

Information for specifying the first merge candidate and the second merge candidate may be signaled through a bitstream, respectively. For example, index information merge_idx for specifying the first merge candidate and index information merge_2nd_idx for specifying the second merge candidate may be signaled through a bitstream. The second merge candidate may be determined based on index information merge_2nd_idx and index information merge_idx.

Index information merge_idx specifies any one among merge candidates included in the merge candidate list.

Index information merge_2nd_idx may specify any one among the remaining merge candidates excluding the merge candidate specified by merge_idx. Accordingly, when the value of merge_2nd_idx is smaller than that of merge_idx, a merge candidate of which the index is the value of merge_2nd_idx may be set as the second merge candidate.

When the value of merge_2nd_idx is equal to or greater than the value of merge_idx, a merge candidate having a value obtained by adding 1 to the value of merge_2nd_idx as an index may be set as the second merge candidate.

Alternatively, the second merge candidate may be specified considering the search order of candidate blocks.

Figure 37:
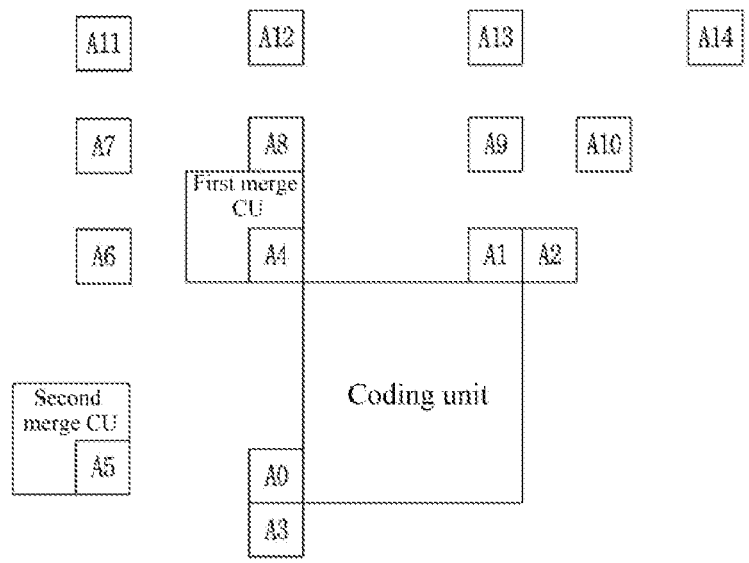
FIG. 37 is a view showing an example in which a second merge candidate is specified considering a search order of candidate blocks.

FIG. 37 is a view showing an example in which a second merge candidate is specified considering the search order of candidate blocks.

In the example shown in FIG. 37, indexes marked on neighboring samples and non-neighboring samples indicate the search order of candidate blocks. For example, candidate blocks may be sequentially searched from position A0 to position A14.

When block A4 is selected as the first merge candidate, a merge candidate derived from a candidate block having a search order next to A4 may be specified as the second merge candidate. For example, a merge candidate derived from A5 may be selected as the second merge candidate. When the candidate block at position A5 cannot be used as a merge candidate, a merge candidate derived from a next candidate block may be selected as the second merge candidate.

The first merge candidate and the second merge candidate may be selected among merge candidates derived from non-neighbor blocks.

Figure 38:
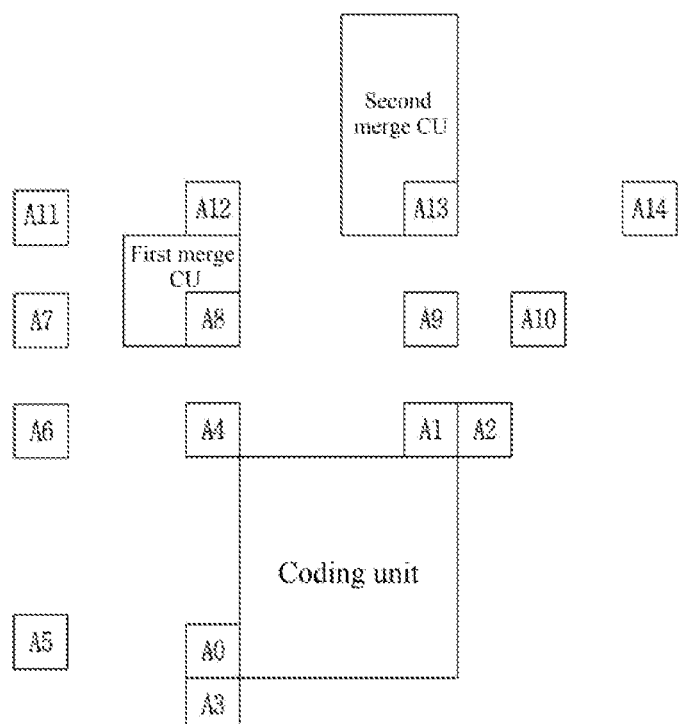
FIG. 38 is a view showing an example in which a first merge candidate and a second merge candidate are selected among merge candidates derived from non-neighboring blocks.

FIG. 38 is a view showing an example in which a first merge candidate and a second merge candidate are selected among merge candidates derived from non-neighboring blocks.

As shown in the example of FIG. 38, merge candidates derived from a first candidate block and a second candidate block that are not adjacent to the current block may be selected as the first merge candidate and the second merge candidate, respectively. At this point, the block line to which the first candidate block belongs and the block line to which the second candidate block belongs may be different. For example, the first merge candidate may be derived from any one among candidate blocks A5 to A10, and the second merge candidate may be derived from any one among candidate blocks A11 to A15.

Alternatively, it may be set such that the first candidate block and the second candidate block are not included in the same line (e.g., row or column).

As another example, the second merge candidate may be specified based on the first merge candidate. At this point, the first merge candidate may be specified by the index information merge_idx signaled from a bitstream. For example, a merge candidate adjacent to the first merge candidate may be specified as the second merge candidate. Here, the merge candidate adjacent to the first merge candidate may mean a merge candidate having an index difference of 1 with respect to the first merge candidate. For example, a merge candidate having an index value of merge_idx+1 may be set as the second merge candidate. At this point, when the value of merge_idx+1 is larger than the maximum index value (or when the index value of the first merge candidate is the maximum index), a merge candidate having an index value of merge_idx−1 or a merge candidate having an index value of a predefined value (e.g., 0) may be set as the second merge candidate.

Alternatively, the merge candidate adjacent to the first merge candidate may mean a merge candidate derived from a candidate block spatially adjacent to a candidate block used for deriving the first merge candidate. Here, the neighboring candidate block of the candidate block may mean a block adjacent to the candidate block in the left, right, top, bottom, or diagonal direction.

As another example, the second merge candidate may be specified based on motion information of the first merge candidate. For example, a merge candidate sharing the same reference picture with the first merge candidate may be selected as the second merge candidate. When there is a plurality of merge candidates sharing the same reference picture with the first merge candidate, a merge candidate having the smallest index among the plurality of merge candidates or a merge candidate having the smallest index difference with respect to the first merge candidate may be selected as the second merge candidate. Alternatively, the second merge candidate may be selected based on index information specifying any one among the plurality of merge candidates.

Alternatively, when the first merge candidate is unidirectional prediction of a first direction, a merge candidate including motion information in a second direction may be set as the second merge candidate. For example, when the first merge candidate has motion information of direction L0, a merge candidate having motion information of direction L1 may be selected as the second merge candidate. When there is a plurality of merge candidates having motion information of direction L1, a merge candidate having the smallest index or a merge candidate having the smallest index difference with respect to the first merge candidate among the plurality of merge candidates may be set as the second merge candidate. Alternatively, the second merge candidate may be selected based on index information specifying any one among the plurality of merge candidates.

As another example, one among the merge candidates derived from neighboring blocks adjacent to the current block may be set as the first merge candidate, and one among the merge candidates derived from non-neighbor blocks not adjacent to the current block may be set as the second merge candidate.

As another example, one among the merge candidates derived from candidate blocks positioned on the top of the current block may be set as the first merge candidate, and one among the merge candidates derived from candidate blocks positioned on the left side may be set as the second merge candidate.

A combined prediction block may be acquired through a weighted sum operation of the first prediction block derived from the first merge candidate and the second prediction block derived based on the second merge candidate. At this point, the weighting value applied to the first prediction block may be set to a value larger than the weighting value applied to the second prediction block.

Alternatively, weighting values may be determined based on motion information of the first merge candidate and motion information of the second merge candidate. For example, weighting values applied to the first prediction block and the second prediction block may be determined based on the difference in the output order of the reference picture and the current picture. Specifically, as the difference in the output order of the reference picture and the current picture increases, the weighting value applied to the prediction block may be set to a smaller value.

Alternatively, weighting values applied to the first prediction block and the second prediction block may be determined considering the sizes or the shapes of the candidate block used for deriving the first merge candidate (hereinafter, referred to as the first candidate block) and the candidate block used for deriving the second merge candidate (hereinafter, referred to as the second candidate block).

For example, a weighting value applied to a prediction block derived from the first candidate block or the second candidate block having a shape similar to that of the current block may be set to a large value. Contrarily, a weighting value applied to a prediction block derived from the first candidate block or the second candidate block having a shape dissimilar to that of the current block may be set to a small value.

Figure 39:
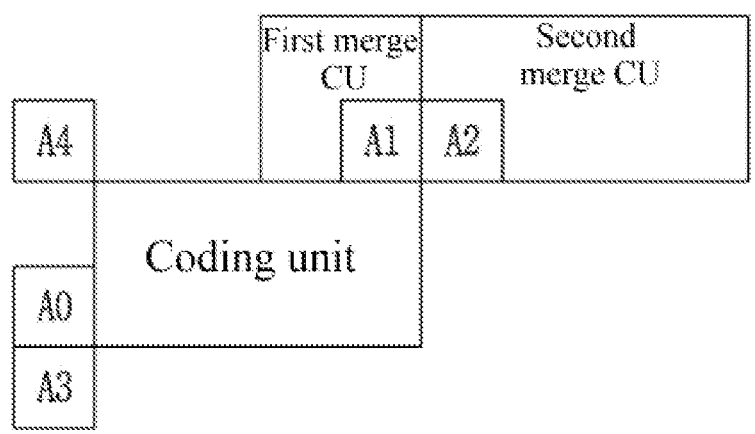
FIG. 39 is a view showing an example in which weighting values applied to prediction blocks are determined based on the shape of candidate blocks.

FIG. 39 is a view showing an example in which weighting values applied to prediction blocks are determined based on the shape of candidate blocks.

It is assumed that the current block is a non-square shape of which the width is greater than the height.

A first prediction block and a second prediction block may be derived based on the first merge candidate and the second merge candidate, and a combined prediction block may be generated based on a weighted sum operation of the first prediction block and the second prediction block. At this point, weighting values applied to the first prediction block and the second prediction block may be determined based on the shapes of the first candidate block and the second candidate block.

For example, in the example shown in FIG. 39, the first candidate block is a square shape, and the second candidate block is a non-square shape of which the width is greater than the height. Since the shape of the second candidate block is the same as that of the current block, the weighting value applied to the second prediction block may be set to be larger than the weighting value applied to the first prediction block. For example, a weighting value of 5/8 may be applied to the second prediction block, and a weighting value of 3/8 may be applied to the first prediction block. Equation 33 shows an example of deriving a combined prediction block based on a weighted sum operation of the first prediction block and the second prediction block.

$$P(x,y)=(3*P_1(x,y)+5*P_2(x,y))>>3 \quad \text{[Equation 33]}$$

P (x, y) denotes a combined prediction block, P1 (x, y) denotes a first prediction block, and P2 (x, y) denotes a second prediction block.

As another example, weighting values applied to the first prediction block and the second prediction block may be determined based on the shape of the current block. For example, when the current block is a non-square shape of which the width is greater than the height, a larger weighting value may be applied to a prediction block generated based on a merge candidate derived based on a candidate block positioned on the top of the current block among the first merge candidate and the second merge candidate. When both the first merge candidate and the second merge candidate are derived from the candidate blocks positioned on the top of the current block, weighting values applied to the first prediction block and the second prediction block may be set equally. Contrarily, when the current block is a non-square shape of which the height is greater than the width, a larger weighting value may be applied to a prediction block generated based on a merge candidate derived based on a candidate block positioned on the left side of the current block among the first merge candidate and the second merge candidate. When both the first merge candidate and the second merge candidate are derived from the candidate blocks positioned on the left side of the current block, weighting values applied to the first prediction block and the second prediction block may be set equally. When the current block is a square shape, weighting values applied to the first prediction block and the second prediction block may be set equally.

As another example, a weighting value applied to each prediction block may be determined based on the distance between the current block and a candidate block. Here, the distance may be derived based on an x-axis coordinate difference, a y-axis coordinate difference from the current block, or a minimum value among them. A weighting value applied to a prediction block derived from a merge candidate having a small distance from the current block may be set to have a value larger than a weighting value applied to a prediction block derived from a merge candidate having a large distance from the current block. For example, in the example shown in FIG. 37, the first merge candidate is derived from a neighboring block adjacent to the current block, and the second merge candidate is derived from a non-neighboring block that is not adjacent to the current block. In this case, since the x-axis distance between the first candidate block and the current block is smaller than the x-axis distance between the second candidate block and the current block, the weighting value applied to the first prediction block may be set to have a value larger than the weighting value applied to the second prediction block.

Alternatively, when both the first merge candidate and the second merge candidate are derived from non-neighbor blocks, a larger weighting value may be assigned to a prediction block derived from a non-neighbor block at a distance closer to the current block among the non-neighbor blocks. For example, in the example shown in FIG. 38, since the y-axis distance between the first candidate block and the current block is smaller than the y-axis distance between the second candidate block and the current block, the weighting value applied to the first prediction block may be set to have a value larger than the weighting value applied to the second prediction block.

In the combined prediction mode combining a merge mode and a merge mode as described above, the merge mode may mean a merge mode based on a translational motion model (hereinafter, referred to as a translational merge mode) or a merge mode based on an affine motion model (hereinafter, referred to as an affine merge mode). That is, motion compensation prediction may be performed by combining a translational merge mode and a translational merge mode or by combining an affine merge mode and an affine merge mode.

For example, when the first merge candidate is an affine merge candidate, the second merge candidate may also be set as an affine merge candidate. Here, the affine merge candidate indicates a case where the motion vector of a block including a reference candidate is an affine motion vector. The second merge candidate may be specified by the various embodiments described above. For example, the second merge candidate may be set as a neighboring merge candidate of the first merge candidate. At this point, when the merge candidate adjacent to the first merge candidate is not encoded using an affine motion model, a merge candidate encoded using an affine motion model may be set as the second merge candidate instead of the merge candidate.

Contrarily, when the first merge candidate is a non-affine merge candidate, the second merge candidate may also be set as a non-affine merge candidate. At this point, when a merge candidate adjacent to the first merge candidate is encoded using an affine motion model, a merge candidate encoded using a translational motion model may be set as the second merge candidate instead of the merge candidate.

Figure 40:
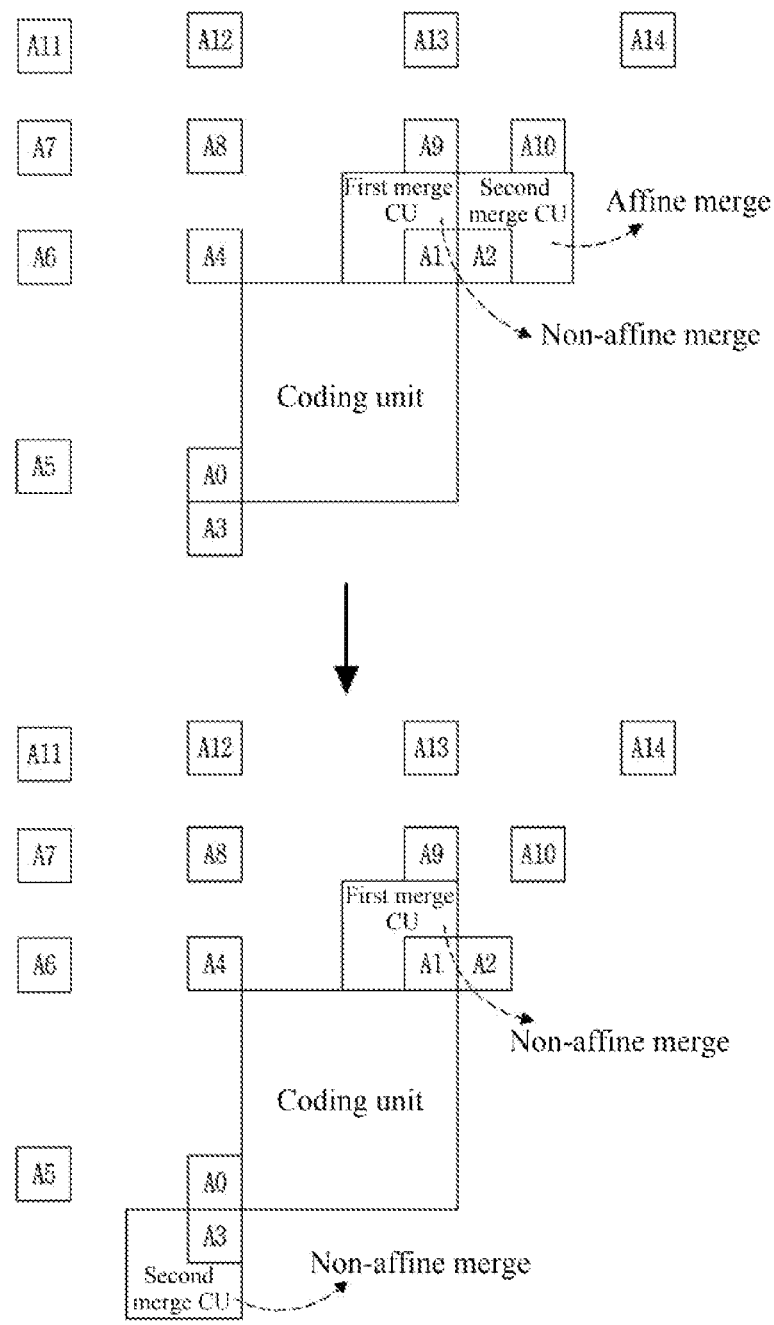
FIG. 40 is a view showing an example of setting a non-affine merge candidate, instead of an affine merge candidate, as a second merge candidate.

FIG. 40 is a view showing an example of setting a non-affine merge candidate, instead of an affine merge candidate, as a second merge candidate.

When the merge candidate at position A1 is specified as the first merge candidate by merge_idx, merge candidate A2 having an index value larger than that of the first merge candidate by 1 may be selected as the second merge candidate. At this point, when the first merge candidate is a non-affine merge candidate and the second merge candidate is an affine merge candidate, the second merge candidate may be re-set. For example, among merge candidates having an index larger than merge_idx+1, a non-affine merge candidate having a smallest difference value with respect to merge_idx+1 may be re-set as the second merge candidate. For example, in the example shown in FIG. 40, it is shown that merge candidate A3 having merge_idx+2 as an index is set as the second merge candidate.

As another example, motion compensation prediction may be performed by combining a translational merge mode and an affine merge mode. That is, any one among the first merge candidate and the second merge candidate may be an affine merge candidate, and the other one may be a non-affine merge candidate.

Integrated motion information may be derived based on the first merge candidate and the second merge candidate, and motion compensation prediction for the current block may be performed based on the integrated motion information. For example, a motion vector of the current block may be derived based on an average operation or a weighted sum operation of the motion vector of the first merge candidate and the motion vector of the second merge candidate. At this point, the weighting value applied to the motion vector of the first merge candidate and the weighting value applied to the motion vector of the second merge candidate may be determined by the embodiments described above.

When the first merge candidate is a non-affine merge candidate and the second affine merge candidate is an affine merge candidate, a motion vector of the current block may be derived by scaling the motion vector of the second merge candidate. Equation 34 shows an example of deriving a motion vector of the current block.

$$(mvX, mvY) = (mc0x, mv0y) + ((mv1x, mv1y) >> M) \quad \text{[Equation 34]}$$

In Equation 34, (mvX, mvY) denotes the motion vector of the current block, (mv0x, mv0y) denotes the motion vector of the first merge candidate, and (mv1x, mv1y) denotes the motion vector of the second merge candidate. M denotes a scaling parameter. M may be predefined in the encoder and the decoder. Alternatively, the value of the scaling parameter M may be determined according to the size of the current block or a candidate block. For example, when the width or the height of the second candidate block is greater than 32, M may be set to 3, and in other cases, M may be set to 2.

In the prediction mode in which a merge mode and a motion vector prediction mode are combined, a first prediction block is generated using motion information derived from a merge candidate, and a second prediction block is generated using a motion vector derived from a motion vector prediction candidate.

In the motion vector prediction mode, a motion vector prediction candidate may be derived from a neighboring block adjacent to the current block or a collocated block in a collocated picture. Thereafter, any one among a plurality of motion vector prediction candidates may be specified, and the specified motion vector prediction candidate may be set as the motion vector predictor of the current block. Thereafter, a motion vector of the current block may be derived by adding the motion vector predictor of the current block and a motion vector difference value.

In the prediction mode in which a merge mode and a motion vector prediction mode are combined, the merge candidate and the motion vector prediction candidate may be derived from the same candidate block. For example, when the merge candidate is specified by merge_idx, a motion vector of a candidate block used for deriving the specified merge candidate may be set as the motion vector predictor. Alternatively, when the motion vector prediction candidate is specified by mvp_flag, a merge candidate derived from a candidate block used for deriving the specified merge candidate may be selected.

Alternatively, the candidate block used for deriving the merge candidate and the candidate block used for deriving the motion vector prediction candidate may be different. For example, when a merge candidate derived from a candidate block positioned on the top of the current block is selected, it may be set to select a motion vector prediction candidate derived from a candidate block positioned on the left side of the current block.

Alternatively, when the merge candidate selected by index information and the motion vector prediction candidate selected by index information are derived from the same candidate block, the motion vector prediction candidate may be replaced with a motion vector prediction candidate derived from a neighboring candidate block adjacent to the candidate block, or the merge candidate may be replaced with a merge candidate derived from a candidate block adjacent to the candidate block.

Figure 41:
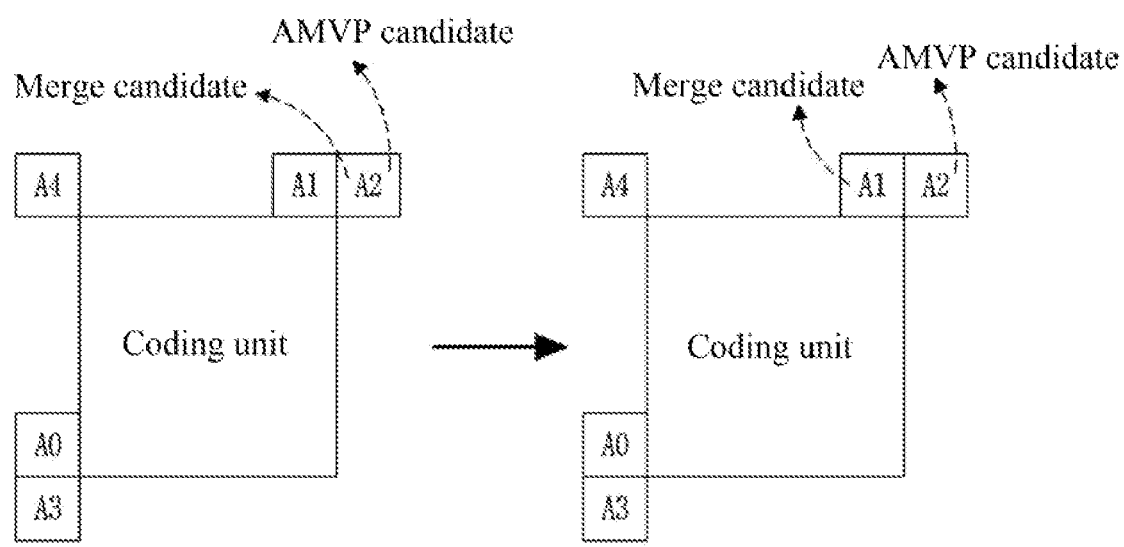
FIG. 41 is a view showing an example in which a merge candidate is replaced.

FIG. 41 is a view showing an example in which a merge candidate is replaced.

In the example shown in FIG. 41 (a), it is shown that a merge candidate and a motion vector prediction candidate derived from the candidate block at position A2 are selected. As shown in the figure, when a merge candidate and a motion vector prediction candidate are derived from the same candidate block, a merge candidate or a motion vector prediction candidate derived from a candidate block adjacent to the candidate block may be used instead of the merge candidate or the motion vector prediction candidate. For example, as shown in the example of FIG. 41 (b), a merge candidate at position A1 may be used instead of the merge candidate at position A2.

A first prediction block may be derived based on the merge candidate of the current block, and a second prediction block may be derived based on the motion vector prediction candidate. Thereafter, a combined prediction block may be derived through a weighted sum operation of the first prediction block and the second prediction block. At this point, the weighting value applied to the second prediction block generated using the motion vector prediction mode may be set to a value larger than the weighting value applied to the first prediction block generated using the merge mode.

A derived residual picture may be derived by subtracting a prediction video from an original video. At this point, when the residual video is changed to the frequency domain, subjective video quality of the video is not significantly lowered although the high-frequency components among the frequency components are removed. Accordingly, when values of the high-frequency components are converted to be small or the values of the high-frequency components are set to 0, there is an effect of increasing the compression efficiency without generating significant visual distortion. By reflecting this characteristic, the current block may be transformed to decompose a residual video into two-dimensional frequency components. The transform may be performed using a transform technique such as Discrete Cosine Transform (DCT) or Discrete Sine Transform (DST).

The DCT decomposes (or transforms) a residual video into two-dimensional frequency components using a cosine transform, and the DST decomposes (or transforms) a residual video into two-dimensional frequency components using a sine transform. As a result of transforming the residual video, the frequency components may be expressed as a basis video. For example, when DCT transform is performed on a block of an N×N size, as many basic pattern components as $N^2$ may be acquired. The size of each of the basic pattern components included in a block of an N×N size may be acquired through the transform. According to a transform technique used therefor, the value of the basic pattern component may be referred to as a DCT coefficient or a DST coefficient.

Transform technique DCT is mainly used to transform a video in which many non-zero low-frequency components are distributed. The transform technique DST is mainly used for videos in which many high-frequency components are distributed.

The residual video may be transformed using a transform technique other than the DCT or the DST.

Hereinafter, transform of a residual video into two-dimensional frequency components will be referred to as two-dimensional video transform. In addition, the size of the basic pattern components acquired as a result of the transform is referred to as a transform coefficient. For example, the transform coefficient may mean a DCT coefficient or a DST coefficient. When both first transform and second transform described below are applied, the transform coefficient may mean the size of a basic pattern component generated as a result of the second transform.

The transform technique may be determined for each block. The transform technique may be determined based on at least one among the prediction encoding mode of the current block, the shape of the current block, and the size of the current block. For example, when the current block is encoded in the intra prediction mode and the size of the current block is smaller than N×N, transform may be performed using the transform technique DST. Contrarily, when the above conditions are not satisfied, transform may be performed using the transform technique DCT.

The two-dimensional video transform may not be performed for some blocks of the residual video. Not performing the two-dimensional video transform may be referred to as a transform skip. When the transform skip is applied, quantization may be applied to residual coefficients that have not been transformed.

After the current block is transformed using DCT or DST, the transformed current block may be transformed again. At this point, the transform based on DCT or DST may be defined as a first transform, and transforming again a block to which the first transform is applied may be defined as a second transform.

The first transform may be performed using any one among a plurality of transform core candidates. For example, the first transform may be performed using any one among DCT2, DCT8, or DCT7.

Different transform cores may be used for the horizontal direction and the vertical direction. Information indicating combination of a transform core of the horizontal direction and a transform core of the vertical direction may be signaled through a bitstream.

Units for performing the first transform and the second transform may be different. For example, the first transform may be performed on an 8×8 block, and the second transform may be performed on a subblock of a 4×4 size among the transformed 8×8 block. At this point, the transform coefficients of the residual regions that has not been performed the second transform may be set to 0.

Alternatively, the first transform may be performed on a 4×4 block, and the second transform may be performed on a region of an 8×8 size including the transformed 4×4 block.

Information indicating whether or not the second transform has been performed may be signaled through a bitstream.

The decoder may perform an inverse transform of the second transform (a second inverse transform), and may perform an inverse transform of the first transform (a first inverse transform) on a result of the inverse transform. As a result of performing the second inverse transform and the first inverse transform, residual signals for the current block may be acquired.

Quantization is for reducing the energy of a block, and the quantization process includes a process of dividing a transform coefficient by a specific constant value. The constant value may be derived by a quantization parameter, and the quantization parameter may be defined as a value between 1 and 63.

When the encoder performs transform and quantization, the decoder may acquire a residual block through inverse quantization and inverse transform. The decoder may acquire a reconstructed block for the current block by adding a prediction block and the residual block.

When a reconstructed block of the current block is acquired, loss of information occurring in the quantization and encoding process may be reduced through in-loop filtering. An in-loop filter may include at least one among a deblocking filter, a sample adaptive offset filter (SAO), and an adaptive loop filter (ALF). Hereinafter, a reconstructed block before the in-loop filter is applied is referred to as a first reconstructed block, and a reconstructed block after the in-loop filter is applied is referred to as a second reconstructed block.

The second reconstructed block may be acquired by applying at least one among the deblocking filter, the SAO, and the ALF to the first reconstructed block. At this point, the SAO or the ALF may be applied after the deblocking filter is applied.

The deblocking filter is for mitigating degradation of video quality (blocking artifact) at the boundary of a block, which occurs as quantization is performed on individual blocks. In order to apply the deblocking filter, a block strength (BS) between the first reconstructed block and a neighboring reconstructed block may be determined.

Figure 42:
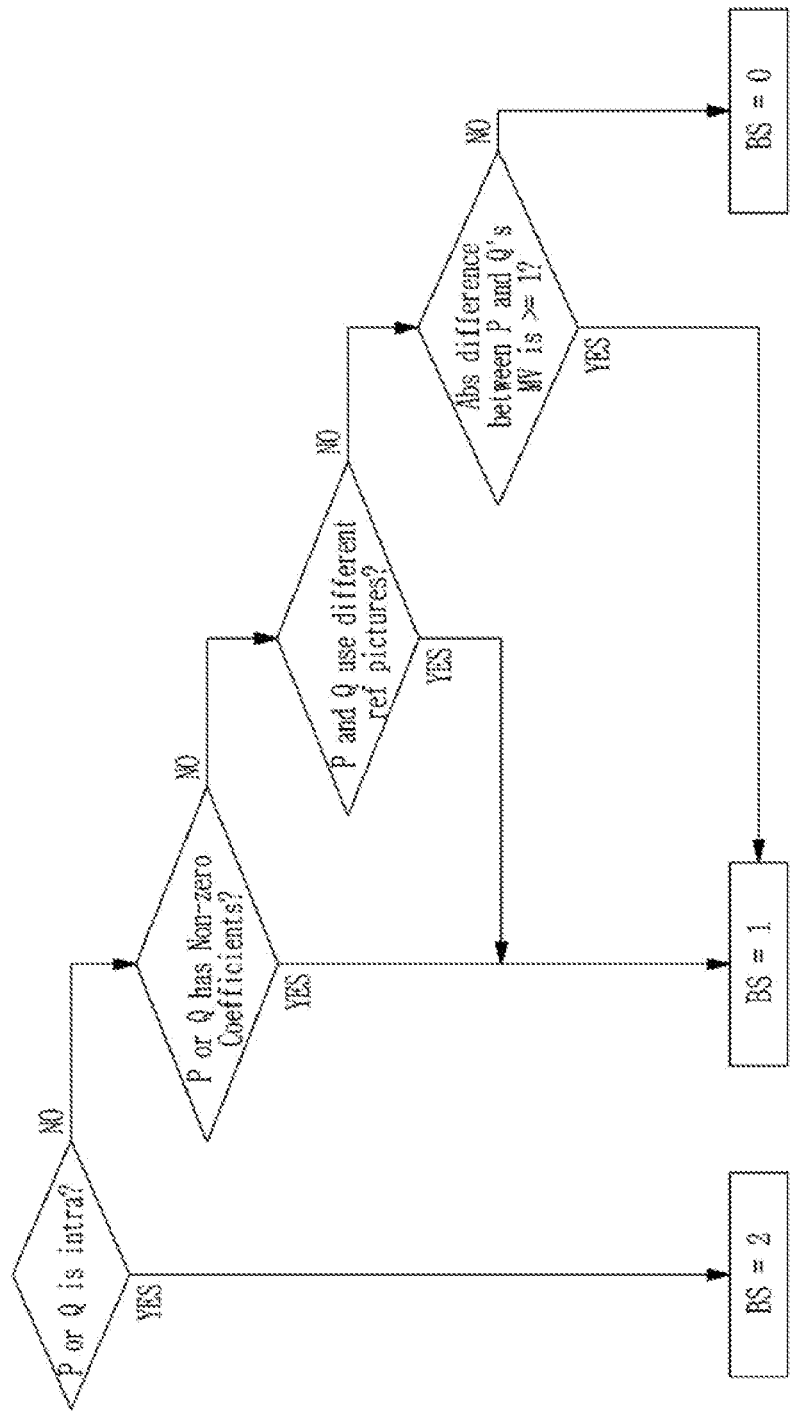
FIG. 42 is a flowchart illustrating a process of determining block strength.

FIG. 42 is a flowchart illustrating a process of determining block strength.

In the example shown in FIG. 42, P denotes a first reconstructed block, and Q denotes a neighboring reconstructed block. Here, the neighboring reconstructed block may be a block adjacent to the left side or the top side of the current block.

In the example shown in FIG. 42, it is shown that the block strength is determined considering the prediction encoding modes of P and Q, whether a non-zero transform coefficient is included, whether inter prediction is performed using the same reference picture, and whether the difference value of motion vectors is larger than or equal to a threshold value.

Whether or not to apply the deblocking filter may be determined based on the block strength. For example, when the block strength is 0, filtering may not be performed.

The SAO is for mitigating a ringing phenomenon (ringing artifact) that occurs as quantization is performed in the frequency domain. The SAO may be performed by adding or subtracting an offset determined considering the pattern of the first reconstructed video. The method of determining the offset includes an edge offset (EO) or a band offset (BO). EO denotes a method of determining an offset of a current sample according to the pattern of surrounding pixels. BO denotes a method of applying a common offset to a set of pixels having similar brightness values in a region. Specifically, pixel brightness may be divided into 32 equal sections, and pixels having similar brightness values may be set as one set. For example, four adjacent bands among 32 bands may be set as one group, and the same offset value may be applied to the samples belonging to the four bands.

The ALF is a method of generating a second reconstructed video by applying a filter having a predefined size/shape to the first reconstructed video or a reconstructed video to which a deblocking filter has been applied. Equation 35 shows an example of applying the ALF.

$$R'(i, j) = \sum_{k=-\frac{N}{2}}^{\frac{N}{2}} \sum_{l=-\frac{N}{2}}^{\frac{N}{2}} f(k, l) \cdot R(i+k, j+l) \qquad \text{[Equation 35]}$$

Any one among predefined filter candidates may be selected by the unit of a picture, a coding tree unit, a coding block, a prediction block, or a transform block. Each of the filter candidates may be different in either the size or the shape.

Figure 43:
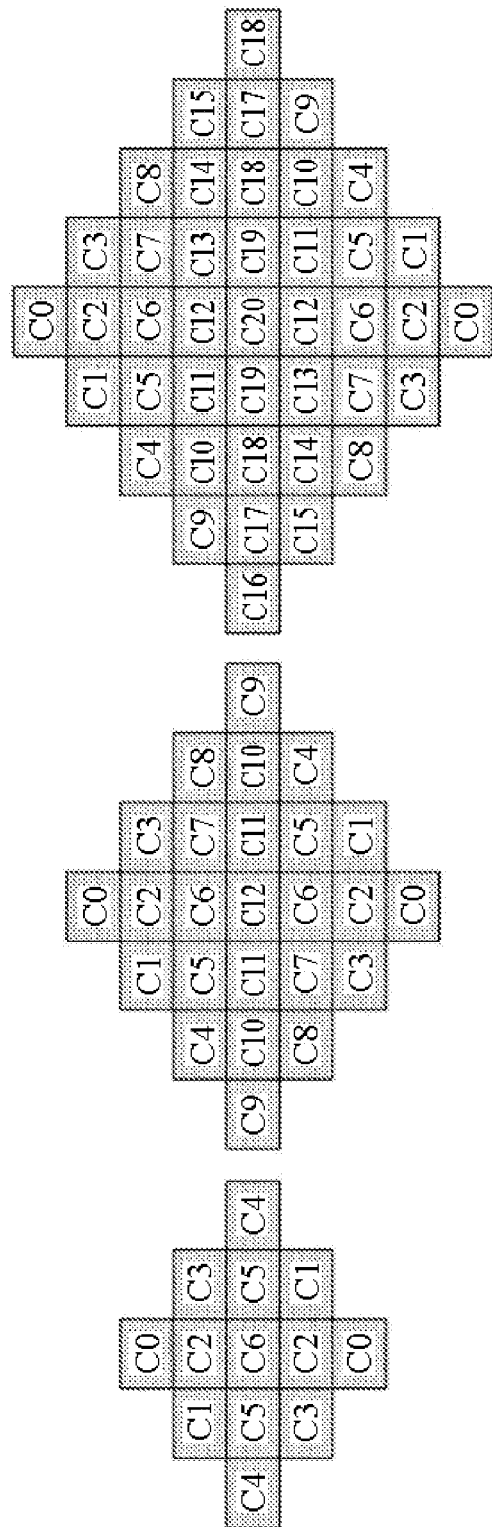
FIG. 43 is a view showing predefined filter candidates.

FIG. 43 is a view showing predefined filter candidates.

As shown in the example of FIG. 42, at least one among 5×5, 7×7 and 9×9 diamond shapes may be selected.

Only a diamond shape of a 5×5 size may be used for a chroma component.

Applying the embodiments described above focusing on a decoding process or an encoding process to an encoding process or a decoding process is included in the scope of the present disclosure. Changing the embodiments described in a predetermined order in an order different from the described order is also included in the scope of the present disclosure.

Although the embodiments above have been described based on a series of steps or flowcharts, this does not limit the time series order of the present disclosure, and may be performed simultaneously or in a different order as needed. In addition, each of the components (e.g., units, modules, etc.) constituting the block diagram in the embodiments described above may be implemented as a hardware device or software, or a plurality of components may be combined to be implemented as a single hardware device or software. The embodiments described above may be implemented in the form of program commands that can be executed through various computer components and recorded in a computer-readable recording medium. The computer-readable recording medium may include program commands, data files, data structures and the like independently or in combination. The computer-readable recording medium includes, for example, magnetic media such as a hard disk, a floppy disk and a magnetic tape, optical recording media such as a CD-ROM and a DVD, magneto-optical media such as a floptical disk, and hardware devices specially configured to store and execute program commands, such as a ROM, a RAM, a flash memory and the like. The hardware devices described above can be configured to operate using one or more software modules to perform the process of the present disclosure, and vice versa.

INDUSTRIAL APPLICABILITY

The present disclosure can be applied to an electronic device that encodes and decodes a video.

What is claimed is:

1. A video decoding method, comprising:
generating a merge candidate list for a first block;
selecting one among merge candidates included in the merge candidate list; and
performing motion compensation for the first block based on motion information of the selected merge candidate;
wherein an inter-region merge candidate included in an inter-region motion information list is added to the merge candidate list based on the number of spatial merge candidates and temporal merge candidates included in the merge candidate list;
the merge candidates comprise a first merge candidate and a second merge candidate, and the first merge candidate and the second merge candidate are included in the merge candidate list for the first block; and
a first prediction block is generated using the first merge candidate, a second prediction block is generated using a second merge candidate, and the prediction block for the first block is generated based on a weighted sum operation of the first prediction block and the second prediction block.

2. The method according to claim 1, wherein the inter-region motion information list includes an inter-region merge candidate derived based on motion information of a block decoded before the first block.

3. The method according to claim 1, wherein when the first block is included in a merge processing area, a temporary merge candidate derived based on motion information of the first block is added to a temporary motion information list, and when all blocks included in the merge processing area are decoded, the temporary merge candidate is added in the inter-region motion information list.

4. The method according to claim 1, wherein based on determination regarding whether one inter-region merge candidate included in the inter-region motion information list is the same as at least one merge candidate included in the merge candidate list, it is determined whether to add the one inter-region merge candidate to the merge candidate list.

5. The method according to claim 4, wherein the determination is performed by comparing at least one merge candidate of which the index value is smaller than or equal to a threshold value with the one inter-region merge candidate.

6. The method according to claim 4, wherein when it is determined that there is a merge candidate the same as the one inter-region merge candidate, the one inter-region merge candidate is not added to the merge candidate list, and based on a result of determining whether another inter-region merge candidate included in the inter-region motion information list is the same as at least one merge candidate included in the merge candidate list, it is determined whether to add the another inter-region merge candidate to the merge candidate list, and no determination regarding whether the another inter-region merge candidate is the same as the merge candidate that is the same as the one inter-region merge candidate is performed.

7. The method according to claim 1, wherein when an inter-region merge candidate the same as motion information of the first block exists in the merge candidate list, an index assigned to the inter-region merge candidate in the inter-region motion information list is updated to a maximum value.

8. The method according to claim 4, wherein the determination is performed by comparing at least one merge candidate of which the index value is larger than a threshold value with the one inter-region merge candidate.

9. The method according to claim 4, wherein the determination is performed by comparing a merge candidate derived from a block at a specific position with the one inter-region merge candidate, wherein the specific position includes at least one of a top-right neighboring block or a bottom-left neighboring block of the first block.

10. The method according to claim 1, wherein performing motion compensation for the first block comprises:
performing motion compensation prediction for the first block using a plurality of merge candidates.

11. The method according to claim 1, wherein index information merge_idx of the first merge candidate and index information merge_2nd_idx of the second merge candidate are obtained by analyzing a bitstream.

12. The method according to claim 11, wherein
when a value of index information merge_2nd_idx is equal to or greater than a value of index information merge_idx, a value of an index of the second merge candidate is obtained by adding 1 to the value of index information merge_2nd_idx.

13. A video encoding method, comprising:
generating a merge candidate list for a first block;
selecting one among merge candidates included in the merge candidate list; and
performing motion compensation for the first block based on motion information of the selected merge candidate;
wherein an inter-region merge candidate included in an inter-region motion information list is added to the merge candidate list based on the number of spatial merge candidates and temporal merge candidates included in the merge candidate list;
the merge candidates comprise a first merge candidate and a second merge candidate, and the first merge candidate and the second merge candidate are included in the merge candidate list for the first block; and
a first prediction block is generated using the first merge candidate, a second prediction block is generated using a second merge candidate, and the prediction block for the first block is generated based on a weighted sum operation of the first prediction block and the second prediction block.

14. The method according to claim 13, wherein the inter-region motion information list includes an inter-region merge candidate derived based on motion information of a block encoded before the first block.

15. The method according to claim 13, wherein when the first block is included in a merge processing area, a temporary merge candidate derived based on motion information of the first block is added to a temporary motion information list, and when all blocks included in the merge processing area are encoded, the temporary merge candidate is added in the inter-region motion information list.

16. The method according to claim 13, wherein based on determination regarding whether one inter-region merge candidate included in the inter-region motion information list is the same as at least one merge candidate included in the merge candidate list, it is determined whether to add the one inter-region merge candidate to the merge candidate list.

17. The method according to claim 16, wherein the determination is performed by comparing at least one merge candidate of which the index value is smaller than or equal to a threshold value with the one inter-region merge candidate.

18. The method according to claim 13, wherein index information merge_idx of the first merge candidate and index information merge_2nd_idx of the second merge candidate are signaled through a bitstream, respectively.

19. A video decoding apparatus, comprising a memory and a processor, wherein
the memory is configured to store a computer program capable of running in the processor; and
the processor is configured to run the computer program to execute a video decoding method, the method comprising:
generating a merge candidate list for a first block;
selecting one among merge candidates included in the merge candidate list; and
performing motion compensation for the first block based on motion information of the selected merge candidate, wherein
an inter-region merge candidate included in an inter-region motion information list is added to the merge candidate list based on the number of spatial merge candidates and temporal merge candidates included in the merge candidate list;
the merge candidates comprise a first merge candidate and a second merge candidate, and the first merge candidate and the second merge candidate are included in the merge candidate list for the first block; and
a first prediction block is generated using the first merge candidate, a second prediction block is generated using a second merge candidate, and the prediction block for the first block is generated based on a weighted sum operation of the first prediction block and the second prediction block.

20. A video encoding apparatus, comprising a memory and a processor, wherein
the memory is configured to store a computer program capable of running in the processor; and
the processor is configured to run the computer program to execute the video encoding method of claim 13.

* * * * *